United States Patent [19]
Duluk, Jr. et al.

[11] Patent Number: 5,574,835
[45] Date of Patent: Nov. 12, 1996

[54] BOUNDING BOX AND PROJECTIONS DETECTION OF HIDDEN POLYGONS IN THREE-DIMENSIONAL SPATIAL DATABASES

[75] Inventors: Jerome F. Duluk, Jr.; David B. Kasle, both of Mountain View, Calif.

[73] Assignee: Silicon Engines, Inc., Palo Alto, Calif.

[21] Appl. No.: 552,212

[22] Filed: Nov. 2, 1995

Related U.S. Application Data

[63] Continuation of Ser. No. 58,919, May 6, 1993, abandoned, which is a continuation-in-part of Ser. No. 43,365, Apr. 6, 1993, abandoned.

[51] Int. Cl.$^6$ .................................................. G06T 15/40
[52] U.S. Cl. ............................................................ 395/121
[58] Field of Search ................... 395/119–121, 141–143, 395/134

[56] References Cited

U.S. PATENT DOCUMENTS

| | | | |
|---|---|---|---|
| 4,594,673 | 6/1986 | Holly | 395/121 |
| 4,694,404 | 9/1987 | Meagher | 395/121 |
| 4,847,789 | 7/1989 | Kelly et al. | 395/121 |
| 4,888,583 | 12/1989 | Ligocki et al. | 395/120 |
| 4,890,242 | 12/1989 | Sinha et al. | 395/119 |
| 5,123,084 | 6/1992 | Prevost et al. | 395/120 |
| 5,133,052 | 7/1992 | Bier et al. | 395/155 |
| 5,289,567 | 2/1994 | Roth | 395/133 |
| 5,293,467 | 3/1994 | Buchner et al. | 395/122 |
| 5,295,235 | 3/1994 | Newman | 395/133 |
| 5,299,139 | 3/1994 | Baisuck et al. | 364/491 |
| 5,315,537 | 5/1994 | Blacker | 364/570 |
| 5,319,743 | 6/1994 | Dutta et al. | 395/141 X |
| 5,338,200 | 8/1994 | Olive | 395/119 X |
| 5,347,619 | 9/1994 | Erb | 395/141 X |
| 5,369,734 | 11/1994 | Suzuki et al. | 395/121 |

OTHER PUBLICATIONS

"Computer Graphics Principles and Practice", Second Edition, Addison–Wesley Publishing Company, by James D. Foley et al., Chapter 15, Visible–Surface Determination (Chapter submitted in USSN 08/058,919).

"Design and Analysis of Spatial Data Structures" by Hana Samet, Addison–Wesley Publishing Company (entire book submitted in USSN 08/058,919).

Warnock, A Hidden Surface Algorithm for Computer Generated Halftone Pictures, Univerity of Utah Doctoral Thesis, 1969.

Samet et al, Hierarchical Data Structures and Algorithms for Computer Graphics, IEEE Computer Graphics & Applications, Jul. 1988, pp. 59–69.

*Primary Examiner*—Heather R. Herndon
*Assistant Examiner*—Anton W. Fetting
*Attorney, Agent, or Firm*—Flehr, Hohbach, Test, Albritton & Herbert

[57] ABSTRACT

An image is generated from a database of three-dimensional object data where each the objects is formed from at least one polygon having at least one edge. Successively determinations are made as to whether a particular one of the object polygons designated as the test polygon is not visible to an observer located at a predetermined location by virtue of being hidden by other objects in the database. If the test polygon is determined to be not visible, then it does not need to be rendered by an image renderer and may be discarded. The decision is made by successively selecting one of the three-dimensional object in the database. After an object is selected, each of the object polygon is selected to determining whether the polygon is occulted by another object. This determination is performed by determining the exterior region of the object as the union of bounding boxes of exterior polygons, determining the interior region of the object as the union of bounding boxes of interior polygons, and testing for overlap between the projected bounding box of the polygon and the projected bounding boxes of the exterior polygons and the projected bounding boxes of the interior polygons. The test polygon is determined to possible be visible or to be not visible based on overlaps between the projected bounding boxes of the test polygon, the interior polygons, the exterior polygons, and coordinate values. Polygons that are not visible are discarded while polygons that may be visible are retained.

9 Claims, 38 Drawing Sheets

FIGURE 7.
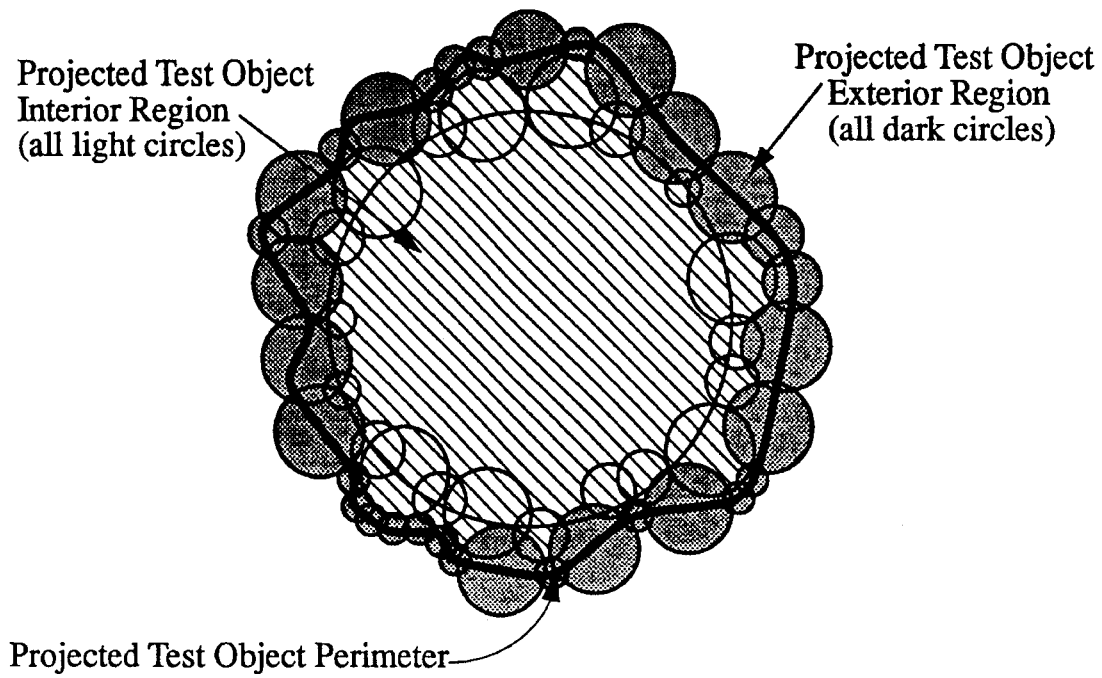
FIGURE 8.
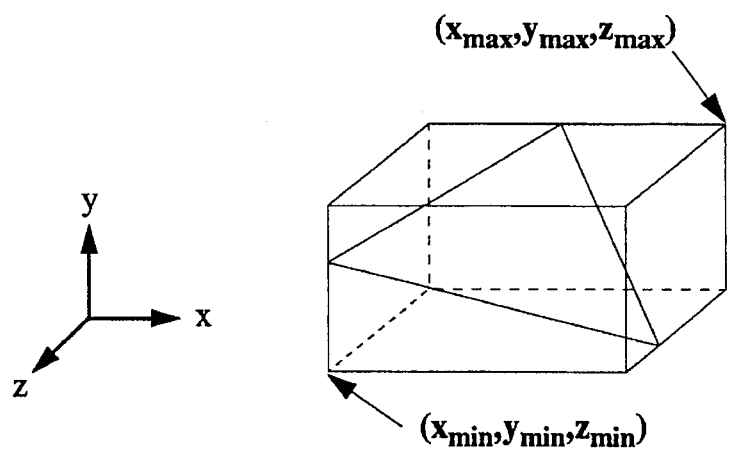
FIGURE 9.
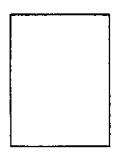
no intersection
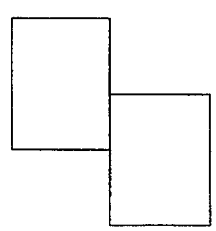
equality intersection only
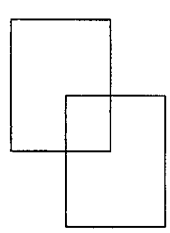
equality intersection and inequality intersection FIGURE 10.
a)
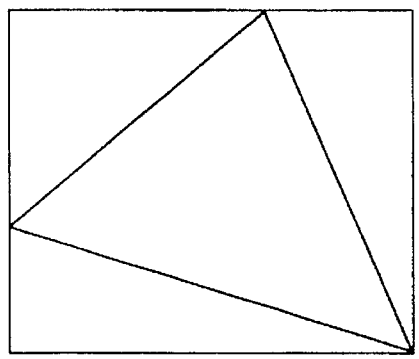
b)
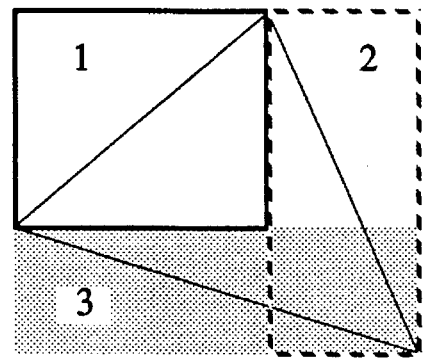

Test Object A

Test Object A

Test Object A

Test Object A

Test Object A

Test Object A

BOUNDING BOX AND PROJECTIONS DETECTION OF HIDDEN POLYGONS IN THREE-DIMENSIONAL SPATIAL DATABASES

This is a continuation of application Ser. No. 08/058,919 filed May 6, 1993, abandoned, which is a continuation-in-part of Ser. No. 08/043,365, filed Apr. 6, 1993, abandoned.

FIELD OF THE INVENTION

The field of this invention is three-dimensional computer graphics, and more specifically, the detection and removal of hidden polygons in three-dimensional spatial databases.

BACKGROUND OF THE INVENTION

Spatial databases in computer graphics

In the field of three-dimensional computer graphics, a three-dimensional scene is most often stored or communicated between devices in the form a spatial database. The database stores a set of three-dimensional objects and their relative positions and orientations. Generally, each three-dimensional object is represented in the database by a set of planar convex polygons which approximate the object's surface. The polygons are most often triangles or quadrilaterals. The database may define objects through their inclusion in a data structure such as a display list used in the PHIGS standard or by sets of calls to software routines that describe objects or polygons, such as those used in the Silicon Graphics GL language. The task of generating a two-dimensional view of the three-dimensional scene is called rendering.

Steps in rendering three-dimensional graphics

A three-dimensional graphics renderer is a device that translates a scene containing a database of three-dimensional objects into a two-dimensional view, for display on a computer screen or other two-dimensional medium. The renderer device can be special purpose hardware, software running on a general purpose CPU, or a hardware-software combination. Hardware renderers improve system performance by replacing slower software, thereby speeding up the process. If the performance of the renderer is sufficient, real time animation on a computer screen is possible.

Rendering is a multi-step process, and one way of listing the steps is as follows:

1) transformation to eye coordinates
2) view volume filtering (optional)
3) perspective projection and translation
4) back-face culling (optional)
5) depth complexity reduction (optional)
6) rasterization and writing to the frame buffer
7) display or store two-dimensional image Certainly a different set of steps could be made, or other steps could be added, or these steps could be split into finer steps. The present invention focuses on step 5, Depth Complexity Reduction (DCR). DCR is a process which detects and eliminates polygons that are hidden behind other polygons or objects from a scene. If the number of polygons that are hidden is significant, performing DCR can significantly speed up the subsequent rasterization and display steps of the rendering process.

Transformation to Eye Coordinates

Every two-dimensional projection of a three-dimensional scene is generated assuming a particular location for an observer. The two-dimensional scene is then calculated as it would be seen from the observer's frame of reference. The calculation is simplified if a coordinate system is adopted in which the observer is located at the origin, looking down the z axis in the positive z direction. This kind of coordinate system is called an eye coordinate system. Spatial databases are frequently stored in generalized coordinates, which may have as their origin a location other than that of the observer. All objects that may be displayed must have their points expressed in eye coordinates. Eye coordinates can be derived from generalized coordinates through a coordinate transformation. This changes the original coordinates of each object, polygon, line, or point to the coordinate system in which the observer is located at the origin. The surface of each object is constructed out of planar polygons; each vertex of every polygon is represented by a vector that must be transformed. The transformation is performed by multiplying each vector with an appropriate matrix for rotation or translation or scaling.

View Volume Filtering

View volume filtering is the process of eliminating all objects or polygons that are completely outside of the field of view. This reduces computation in subsequent rendering steps. The field of view is defined by a frustum, as illustrated in FIG. 1. Any object or polygon that is at least partly contained in the truncated pyramid (i.e. a frustum) between the front clipping plane and the back clipping plane is retained for possible rendering. This step is listed as optional because subsequent steps could be performed on otherwise discarded polygons; these polygons would not affect the final rendered scene. This process is typically performed on objects that are expressed in eye coordinates.

Perspective projection and translation

Perspective projection is the process of mapping points from a three-dimensional object (in eye coordinates) onto a two-dimensional display screen. The two-dimensional display screen is also called the viewing plane, and it can be anywhere in relation to the front and back clipping planes. In eye coordinates, the observer is at (0, 0, 0) and the display screen is centered at $(0, 0, z_s)$. A point $(x_e, y_e, z_e)$ in three-dimensional eye coordinates maps into the point $(x_s, y_s)$ in two-dimensional screen coordinates as illustrated in FIG. 2. The mapping equations are given by:

$$x_s = x_e \times \frac{z_s}{z_e} \quad \text{(EQ 1)}$$

and $$y_s = y_e \times \frac{z_s}{z_e} \quad \text{(EQ 2)}$$

Thus, a single division and two multiplications are required for mapping each individual point into screen coordinates.

Perspective translation is similar to perspective projection, but differs in that the z coordinate (as expressed in the eye coordinate system) is preserved. Thus, the point $(x_e, y_e, z_e)$ in three-dimensional eye coordinates maps into the point $(x_s, y_s, z_e)$ in three-dimensional perspective translated coordinates as illustrated in FIG. 3. Perspective translated coordinates are useful because they not only reveal how an object on the viewing plane appears to the observer, but also how distant the object is from the observer in the z axis. The latter piece of information determines which objects or polygons appear "in front" and which appear "behind" from observer's perspective. Therefore the z coordinate is necessary for eliminating hidden objects or polygons or hidden portions of objects or polygons. Perspective translated coordinates are used in subsequent steps, because they reveal both perceived superimposition of polygons in the xy viewing plane and relative distances of the polygons from the observer.

In this document, the prefix "Projected" will denote a geometric entity (such as a point, polygon or object) which is perspective projected into the two-dimensional viewing plane. Geometric entities without the Projected prefix are assumed to be three-dimensional perspective translated. Every three-dimensional perspective translated geometric entity has a corresponding two-dimensional Projection, which is derived from the three-dimensional geometric entity by simply removing the z coordinate from each point and retaining the x and y coordinates. For example, every polygon (in three dimensions) has a corresponding Projected polygon (in two dimensions).

Stereo viewing requires two sets of eye coordinates (for the observer's two separate eyes.) Therefore the perspective projection or translation process must be performed twice, once for each set of coordinates.

Back-face culling

If an object's surface is closed (such as a sphere), then a large fraction of the polygons that make up the object are facing away from the observer. These polygons, as illustrated in FIG. 4, are hidden from view, and need not be rendered. Back-face culling is the process of finding and removing backwards facing polygons. A standard method of identifying backwards facing polygons is illustrated in FIG. 5. It is assumed that all polygons are convex and that, after perspective translation, front facing polygons are drawn in a counter clockwise fashion and back facing polygons are drawn clockwise. This requires objects to be designed such that, for each polygon, all vertices are listed in counter clockwise fashion when the object is rotated so the polygon is oriented toward the observer. When meshes are used for storing data (such as triangle meshes or quadrilateral meshes), special care must be taken when defining the order of vertices for particular polygons within a mesh.

Given three consecutive points of a polygon, two consecutive vector displacements can be generated (from point one to point two and from point two to point three.) The z component of the cross product of these two vectors determines the direction the polygon is facing. A negative z component of the cross product indicates the polygon is front facing and a positive z component indicates the polygon is back facing. A z component of zero indicates the polygon is being viewed edge-on. The cross product is given by:

$$\left| \begin{bmatrix} \hat{i} & \hat{j} & \hat{k} \\ (x_2 - x_1) & (y_2 - y_1) & (z_2 - z_1) \\ (x_3 - x_2) & (y_3 - y_2) & (z_3 - z_2) \end{bmatrix} \right|$$

where $\hat{i}$, $\hat{j}$, and $\hat{k}$ are the unit vectors for the x, y, and z axes respectively in the eye coordinate system. The z component of this determinant is:

$$\hat{k}[(x_2-x_{-1})(y_3-y_2)-(x_3-x_2)(y_2-y_1)]$$

The polygon is back facing and need not be rendered if $$[(x_2-x_1)(y_3-y_2)-(x_3-x_2)(y_2-y_1)]>0 \quad \text{(EXPRESSION 1)}$$

Notice that this operation must be performed after perspective translation in order to avoid errors caused by parallax. Also, this back-face culling step is listed as optional, and may, in practice, be turned off for particular objects during the rendering process. It must be turned off when either the object is not a closed surface, or the object was not properly designed to allow back-face culling.

Depth Complexity Reduction

A screen pixel is a small picture element in the viewing plane that usually corresponds directly to one independently controllable area unit on the final two-dimensional picture or computer screen. A renderer must often recompute the color value of a given screen pixel multiple times, because there may be many polygons that intersect the volume subtended by the screen pixel. The average number of times a screen pixel needs to be rendered, for a particular scene, is called the depth complexity of scene. Simple scenes have a depth complexity near unity, while complex scenes can have a depth complexity of ten or twenty. The real world has a depth complexity very much greater, and as images become more realistic, renderers will be required to process scenes of increasing depth complexity.

In general, renderers must remove hidden lines and surfaces from the rendered scene. This can be done in either the pixel domain (using a z-buffer, as described in the next subsection), the polygon domain, or in the object domain. Hidden surface removal in the polygon or object domain is computationally expensive because objects can be irregular shapes, including concave surfaces and surfaces with holes. Hence, most renderers can only eliminate entire objects if they are behind simple surfaces, such as a wall or a building.

The present invention performs partial hidden surface removal in the polygon domain by providing a unique method for detecting polygons that are completely occulted by other polygons or objects. The invention does not provide complete hidden surface removal, and hence, it requires some form of additional hidden surface removal in the pixel domain. The Depth Complexity Reduction method described here eliminates complete polygons that are hidden in a scene rather than hidden portions of polygons that make up a surface. However, since the depth complexity of a scene can be reduced by an order of magnitude for complex scenes, total system performance can be dramatically improved by use of this invention.

Other methods of detecting visible portions of a scene and removing invisible portions of a scene have been suggested in the literature, such as list-priority methods (e.g., depth-sort or Binary Space-Partition Trees), scan-line methods, and area subdivision methods (e.g., the method developed by Warnock or the method developed by Weiler and Atherton). These methods are summarized in chapter 15, pages 649 through 720, of the book "Computer Graphics: Principles and Practice (2nd Edition)", by James Foley, Andries van Dam, Steven Feiner, and John Hughes, published by Addison Wesley Publishing Co., ISBN 0-201-12110-7, and incorporated herein by reference. None these methods achieves the same function as the invention described here.

Rasterization and Writing to the Frame Buffer

The rasterization portion of a renderer processes polygons one at a time. At this point in the process, each polygon is already in screen coordinates, and must now be converted to a set of pixel color values, which are then stored into the frame buffer. The display screen is segmented into an array of screen pixels, each row referred to as a raster line. Rasterization splits a polygon into raster lines that coincide with raster lines within the display screen, and then into individual rasterized polygon pixels. Shading, lighting, and color of the polygon are taken into account when the color value of each rasterized polygon pixel is computed.

For each rasterized polygon pixel, the z coordinate of the intersection of the original polygon and the volume subtended by the screen pixel is computed. Generally, this is done by interpolating the z coordinates of the perspective translated vertices of the polygon. This is the z coordinate of the rasterized polygon pixel. Many rasterized polygons could affect the same screen pixel, but only that polygon which closest to the observer affects the final value of the pixel (assuming no transparent or translucent objects). Thus, it is necessary to use the z coordinates of the rasterized polygon pixels to determine which one affects the final rendered scene. Hence, hidden surface removal is performed in the pixel domain on a pixel-by-pixel basis.

Each screen pixel corresponds to a z-buffer memory location, which stores the z coordinate of the rasterized polygon pixel that is currently closest to the observer. When a new rasterized polygon pixel is generated, its z coordinate is compared to the value stored in the appropriate z-buffer memory location. If the new z coordinate is smaller (and therefore the new rasterized polygon pixel is closer to the observer), the new rasterized polygon pixel overwrites the old one; otherwise the new rasterized polygon pixel is discarded.

The rasterizing step can also provide image anti-aliasing and many other features to enhance image quality. However, renderers must process every pixel within each polygon to be rasterized, and therefore it is important to eliminate as many polygons as possible before the rasterization step.

Display or Store Two-Dimensional Image

Once all of the objects in the scene have been rasterized and all pixels have been written to the frame buffer, the resulting image is displayed on a computer screen, or stored for later viewing or transferred to another medium such as film.

A BRIEF DESCRIPTION OF THE FIGURES

FIG. 1: An example of a view volume frustum. Any polygon that is not wholly or partially contained within the shaded volume is not rendered.

FIG. 2: Perspective projection.

FIG. 3: Perspective translation.

FIG. 4: Back-face culling. Polygons in a closed surface that are facing away from the observer are invisible, and need not be rendered.

FIG. 5: A standard method of discriminating between front facing and back facing polygons: clockwise vs. counterclockwise polygon culling.

FIG. 6: A Projected Test Object and a Projected Test Polygon in four different positions.

FIG. 7: A Test Object with Interior and Exterior each made up of multiple areas.

FIG. 8: A three-dimensional triangle Bounding Box.

FIG. 9: Equality intersection and inequality intersection of two-dimensional Projected Bounding Boxes.

FIG. 10: The region containing a perspective projected triangle consisting of a) a single Projected Bounding Box, and b) the union of three Projected Bounding Boxes containing the three edges.

FIG. 11: Classify some object polygons and their Bounding Boxes as Exterior and their Bounding Boxes as Exterior (i.e. on the perimeter).

FIG. 12: Classify some object edges and their Bounding Boxes as Exterior (i.e. on the perimeter).

FIG. 13: A simple object composed of triangles and quadrilaterals. The object is shown perspective projected as it would be seen by an observer and as it would be rendered on a CRT screen.

FIG. 14: The same object as shown in FIG. 13. The Exterior Region, shaded light gray, is composed of Projected Bounding Boxes of polygons that contain Exterior Edges.

FIG. 15: The same object as shown in FIG. 13. The Exterior Region, shaded light gray, is composed of Projected Bounding Boxes of Exterior Edges.

FIG. 16: Define the Interior Region by definition 1.

FIG. 17: Define the Interior Region by definition 2.

FIG. 18: Define the Interior Region by definition 3.

FIG. 19: Define the Interior Region by definition 4.

FIG. 20: Define the Interior Region by definition 5.

FIG. 21: Define the Interior Region by definition 6.

FIG. 22: The same object as shown in FIG. 13. The Projected Bounding Boxes of Exterior Edges are shaded light gray and the union of the Projected Bounding Boxes of Interior Polygons as defined by definition 1 is shaded dark gray.

FIG. 23: The same object as shown in FIG. 13. The Projected Bounding Boxes of Exterior Edges are shaded light gray and the union of the Projected Bounding Boxes of Interior Polygons as defined by definition 2 is shaded dark gray.

FIG. 24: The same object as shown in FIG. 13. The Projected Bounding Boxes of Exterior Edges are shaded light gray and the union of the Projected Bounding Boxes of Interior Polygons as defined by definition 3 is shaded dark gray.

FIG. 25: A simple object composed of triangles. The object is shown perspective projected as it would be seen by an observer and as it would be rendered on a CRT screen. This is the same object as shown in FIG. 13, but the quadrilaterals have been converted into pairs of triangles.

FIG. 26: The same object as shown in FIG. 25. The Projected Bounding Boxes of Exterior Edges are shaded light gray and the union of the Projected Bounding Boxes of Interior Polygon edges as defined by definition 4 is shaded dark gray.

FIG. 27: The same object as shown in FIG. 25. The Projected Bounding Boxes of Exterior Edges are shaded light gray and the union of the Projected Bounding Boxes of Interior Polygon edges as defined by definition 5 is shaded dark gray.

FIG. 28: The same object as shown in FIG. 25. The Projected Bounding Boxes of Exterior Edges are shaded light gray and the union of the Projected Bounding Boxes of Interior Polygon edges as defined by definition 6 is shaded dark gray.

FIG. 29: Classify Exterior/Interior/Ambiguous Regions within an object.

FIG. 30: Determine if an object occults a polygon.

FIG. 31: The same object as shown in FIG. 25. Polygons B, C and D are more distant from the observer than Test Object A. The Projected Bounding Box of polygon B intersects with several of the Projected Bounding Boxes of Test Object A's Interior Edges and none of Test Object A's Exterior Edges, so polygon B is totally occulted and need not be rendered. The Projected Bounding Box of polygon C intersects with several of the Projected Bounding Boxes of Test Object A's Interior Edges and also some of Test Object A's Exterior Edges, so although polygon C is totally occulted, this cannot be detected by a method based on Bounding Boxes. The Projected Bounding Box of polygon D intersects with none of the Projected Bounding Boxes of any of Test Object A's edges, so polygon D is not occulted and must be rendered.

FIG. 32: Determine if an object occults a polygon and mark parts of the object that may be occulted.

FIG. 33: See if Test Object Bounding Box is occulted by the Test Polygon.

FIG. 34: Determine if object occults triangle by determining if the triangle's edges are occulted.

FIG. 35: Determine if object occults Test Triangle edge.

FIG. 36: Determine if object occults triangle by determining if the triangle's edges are occulted and mark parts of object that may be occulted.

FIG. 37: Determine if object occults Test Triangle edge and mark parts of object that may be occulted.

FIG. 38: See if Test Object Bounding Box is behind Test Edge.

FIG. 39: Determine if a given polygon is occulted by any object in the database

FIG. 40: Determine if a given object occults any polygons from other objects in the database.

FIG. 41: Determine if a given object occults any polygons from other objects in the database and if any of its polygons are occulted FIG. 42: Find and delete all occulted polygons by unidirectional object/polygon comparison.

FIG. 43: Find and delete all occulted polygons by bidirectional object/object comparison.

FIG. 44: A hardware implementation of the invention employing a general purpose computer.

FIG. 45: A hardware implementation of the invention employing a parallel multiprocessor computer.

FIG. 46: A hardware implementation of the invention employing special purpose hardware.

GLOSSARY OF SPECIAL TERMS

The special terms employed in the description of the invention are defined here. Since the method makes simultaneous and extensive use of both two-dimensional and three-dimensional spatial concepts, the special terms let reader know whether two-dimensional or three-dimensional items are being discussed. In general, if the word "Projected" precedes a term, a two-dimensional perspective projected item on the viewing plane is being discussed; otherwise, a three-dimensional perspective translated item is being discussed. When these terms appear in the text, they are capitalized to remind the reader of their explicit meaning.

Shape: A three-dimensional volume, such as a sphere or right parallelepiped, which bounds some perspective translated three-dimensional graphics geometrical entity.

Projected Shape: A two-dimensional area, such as a circle or rectangle, which bounds the two-dimensional perspective projection of some three-dimensional graphics geometrical entity. There is a one-to-one correspondence between a Shape and a Projected Shape: a Shape bounds geometrical entity which has been perspective translated and a Projected Shape bounds the same geometrical entity which has been perspective projected onto the viewing plane. The x and y coordinates for each point are identical for a Shape and its corresponding Projected Shape. The only difference between a Shape and its corresponding Projected Shape is that each point of the Shape includes a z coordinate, expressed in the eye coordinate system.

Projected Polygon: A two-dimensional viewing plane projection of a three-dimensional polygon which is part of a surface of an object.

Test Polygon: A planar three-dimensional polygon which is being tested to see if it is occulted (hidden from view). The Test Polygon is in perspective translated coordinates.

Projected Test Polygon: A version of the Test Polygon which was been projected onto the viewing plane, and is, hence, a two-dimensional polygon in perspective projected coordinates. Each vertex of the Projected Test Polygon is simply the corresponding vertex of the Test Polygon without the z coordinate information.

Test Object: A three-dimensional object, in perspective translated coordinates, which may be occulting the Test Polygon.

Projected Test Object: The two-dimensional perspective projection of the Test Object.

Perimeter: The set of outer-most edges of the Projected Test Object. The Perimeter lies in the viewing plane and forms a continuous piecewise straight line around the Projected Test Object.

Projected Exterior Region: A Projected Shape or union of Projected Shapes which approximates and includes the Perimeter. The Projected Exterior Region can include Projected Shapes which do not touch the Perimeter. The Projected Exterior Region is two-dimensional.

Exterior Region: A three-dimensional volume made from a Shape of union of Shapes, where each Shape has a one-to-one correspondence to a Projected Shape in the Projected Exterior Region.

Projected Exterior Polygon: A perspective projected polygon which is part of the Projected Exterior Region. A Projected Exterior Polygon is two-dimensional and lies on the viewing plane.

Exterior Polygon: A Perspective translated polygon which has a one-to-one correspondence with a Projected Exterior Polygon. An Exterior Polygon is a three-dimensional planar polygon.

Projected Exterior Edge: A perspective projected polygon edge which is part of the Projected Exterior Region. A polygon which includes a Projected Exterior Edge is not necessarily a Projected Exterior Polygon. A Projected Exterior Edge is a two-dimensional line segment and lies on the viewing plane.

Exterior Edge: A Perspective translated polygon edge which has a one-to-one correspondence with a Projected Exterior Edge. An Exterior Edge is a three-dimensional line segment.

Bounding Box: the smallest three-dimensional axially aligned right parallelepiped which bounds an object, polygon or polygon edge. The minimum and maximum x, y and z coordinates of a Bounding Box are equal to the minimum and maximum x, y and z coordinates of the object, polygon or polygon edge contained by the Bounding Box.

Projected Bounding Box: A two-dimensional axially aligned rectangle in the viewing plane which bounds a Projected Object, Projected Polygon or Projected Edge. The minimum and maximum x and y coordinates of a Projected Bounding Box are equal to the minimum and maximum x and y coordinates of the object, polygon or polygon edge contained by the Projected Bounding Box.

Augmented Bounding Box: a type of three-dimensional Bounding Box which is used only with the edge of a polygon. A polygon edge Augmented Bounding Box has the same x and y dimensions as The Bounding Box of the polygon edge, but the minimum z coordinate is equal to the minimum z coordinate of the set of all polygons which contain the edge, and the maximum z coordinate is equal to the maximum z coordinate of the set of all polygons which contain the edge. In other words, a polygon edge Augmented Bounding box is the smallest axially aligned right parallelepiped that completely contains the polygon edge in the xy plane and whose minimum z coordinate is equal to the minimum z coordinate of the set of all polygons of which the edge is a part, and whose maximum z coordinate is equal to the maximum z coordinate of the set of all polygons of which the edge is a part.

Projected Exterior Bounding Box: A two-dimensional axially aligned rectangle in the viewing plane which bounds a Projected Exterior Polygon or Projected Exterior Edge. A Projected Exterior Bounding Box is a particular type of Projected Shape in the Projected Exterior Region. When all Projected Shapes are rectangles, the Projected Exterior Region for a Test Object is the union of all its Projected Exterior Bounding Boxes.

Exterior Bounding Box: In the case of an Exterior Polygon, this is the three-dimensional Bounding Box which contains the Exterior Polygon. In the case of an Exterior Edge, this is the three-dimensional Augmented Bounding Box which contains the Exterior Edge. An Exterior Bounding Box is a particular type of Shape in the Exterior Region. A Projected Exterior Bounding Box is simply the Exterior Bounding Box without z coordinate information. When all Shapes are right parallelepipeds, the Exterior Region for a Test Object is the union of all its Exterior Bounding Boxes.

Projected Interior Region: A Projected Shape or union of Projected Shapes which approximates the inner area of the Projected Test Object. The Projected Interior Region may overlap the Projected Exterior Region, but not extend beyond it. The Projected Interior Region is two-dimensional.

Interior Region: A three-dimensional volume made from a Shape or union of Shapes, where each Shape has a one-to-one correspondence to a Projected Shape in the Projected Interior Region.

Projected Interior Polygon: A perspective projected polygon which is part of the Projected Interior Region. A Projected Interior Polygon is two-dimensional and lies on the viewing plane.

Interior Polygon: A perspective translated polygon which has a one-to-one correspondence with a Projected Interior Polygon. An Interior Polygon is a three-dimensional planar polygon.

Projected Interior Edge: A perspective projected edge of a polygon which is part of the Projected Interior Region. A polygon which includes a Projected Interior Edge is not necessarily a Projected Interior Polygon. A Projected Interior Edge is a two-dimensional line segment and lies on the viewing plane.

Interior Edge: A perspective translated edge of a polygon which has a one-to-one correspondence with a Projected Interior Edge. An Interior Edge is a three-dimensional line segment.

Projected Interior Bounding Box: A two-dimensional axially aligned rectangle in the viewing plane which bounds a Projected Interior Polygon or Projected Interior Edge. A Projected Interior Bounding Box is a particular type of Projected Shape in the Projected Interior Region. When all Projected Shapes are rectangles, the Projected Interior Region for a Test Object is the union of all its Projected Interior Bounding Boxes.

Interior Bounding Box: In the case of an Interior Polygon, this is the three-dimensional Bounding Box which contains the Interior Polygon. In the case of an Interior Edge, this is the three-dimensional Augmented Bounding Box which contains the Interior Edge. An Interior Bounding Box is a particular type of Shape in the Interior Region. Projected Interior Bounding Box is simply the Interior Bounding Box without z coordinate information. When all Projected Shapes are rectangles, the Interior Region for a Test Object is the union of all its Interior Bounding Boxes.

Projected Ambiguous Region: A Projected Shape or union of Projected Shapes which cannot be classified as part of the Projected Interior Region, but would reduce performance if classified as part of the Projected Exterior Region. The Projected Ambiguous Region may overlap both the Projected Exterior Region and Projected Internal Region, and can also extent beyond the Projected Exterior Region. The Projected Ambiguous Region is two-dimensional.

Ambiguous Region: A three-dimensional volume made from a Shape of union of Shapes, where each Shape has a one-to-one correspondence to a Projected Shape in the Projected Ambiguous Region.

Projected Ambiguous Polygon: A perspective projected polygon which is part of the Projected Ambiguous Region. A Projected Ambiguous Polygon is two-dimensional and lies on the viewing plane.

Ambiguous Polygon: A perspective translated polygon which has a one-to-one correspondence with a Projected Ambiguous Polygon. An Ambiguous Polygon is a three-dimensional planar polygon.

Projected Ambiguous Edge: A perspective projected edge of a polygon which is part of the Projected Ambiguous Region. A polygon which includes a Projected Ambiguous Edge is not necessarily a Projected Ambiguous Polygon. A Projected Ambiguous Edge is a two-dimensional line segment and lies on the viewing plane.

Ambiguous Edge: A perspective translated edge of a polygon which has a one-to-one correspondence with a Projected Ambiguous Edge. An Ambiguous Edge is a three-dimensional line segment.

Projected Ambiguous Bounding Box: A two-dimensional axially aligned rectangle in the viewing plane which bounds a Projected Ambiguous Polygon or Projected Ambiguous Edge. A Projected Ambiguous Bounding Box is a particular type of Projected Shape in the Projected Ambiguous Region. When all Projected Shapes are rectangles, the Projected Ambiguous Region for a Test Object is the union of all its Projected Ambiguous Bounding Boxes.

Ambiguous Bounding Box: In the case of an Ambiguous Polygon, this is the three-dimensional Bounding Box which contains the Ambiguous Polygon. In the case of an Ambiguous Edge, this is the three-dimensional Augmented Bounding Box which contains the Ambiguous Edge. An Ambiguous Bounding Box is a particular type of Shape in the Ambiguous Region. Projected Ambiguous Bounding Box is simply the Ambiguous Bounding Box without z coordinate information. When all Projected Shapes are rectangles, the Ambiguous Region for a Test Object is the union of all its Ambiguous Bounding Boxes.

DESCRIPTION OF A PREFERRED EMBODIMENT

Overview

Figure 1:
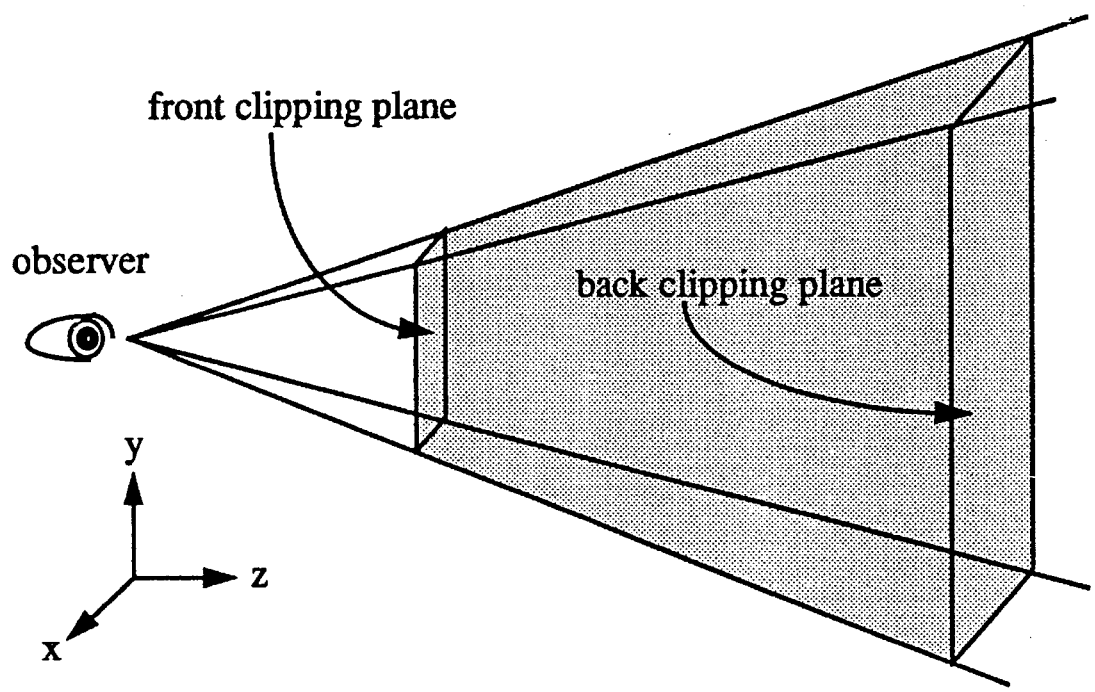
Figure 2:
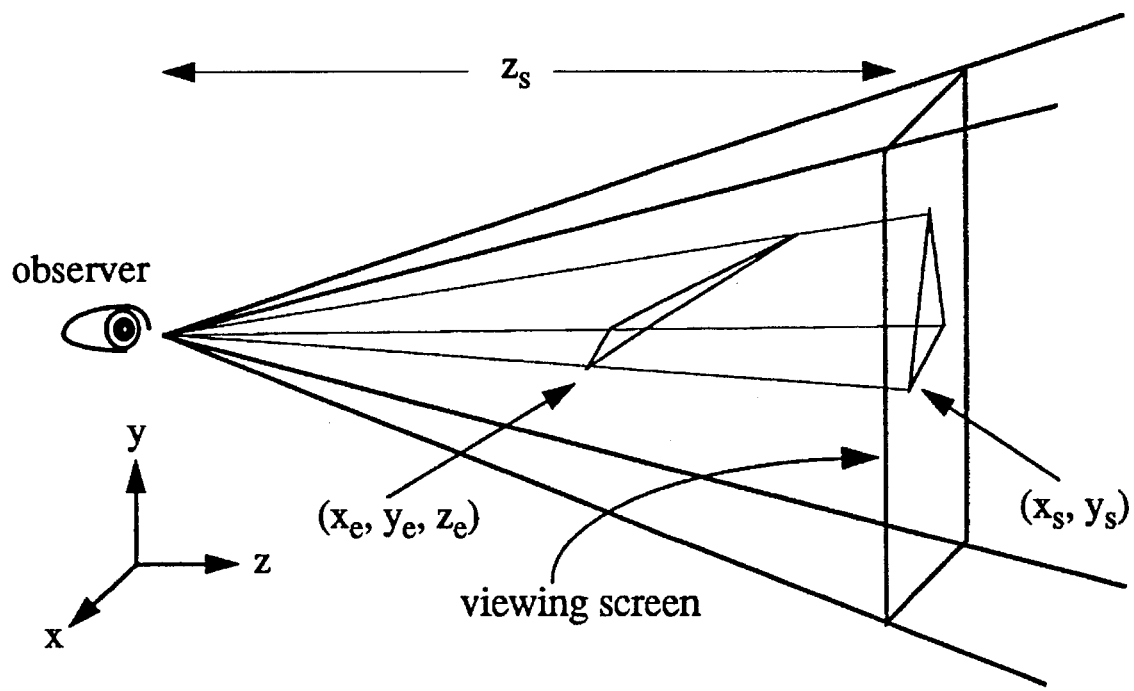
Figure 3:
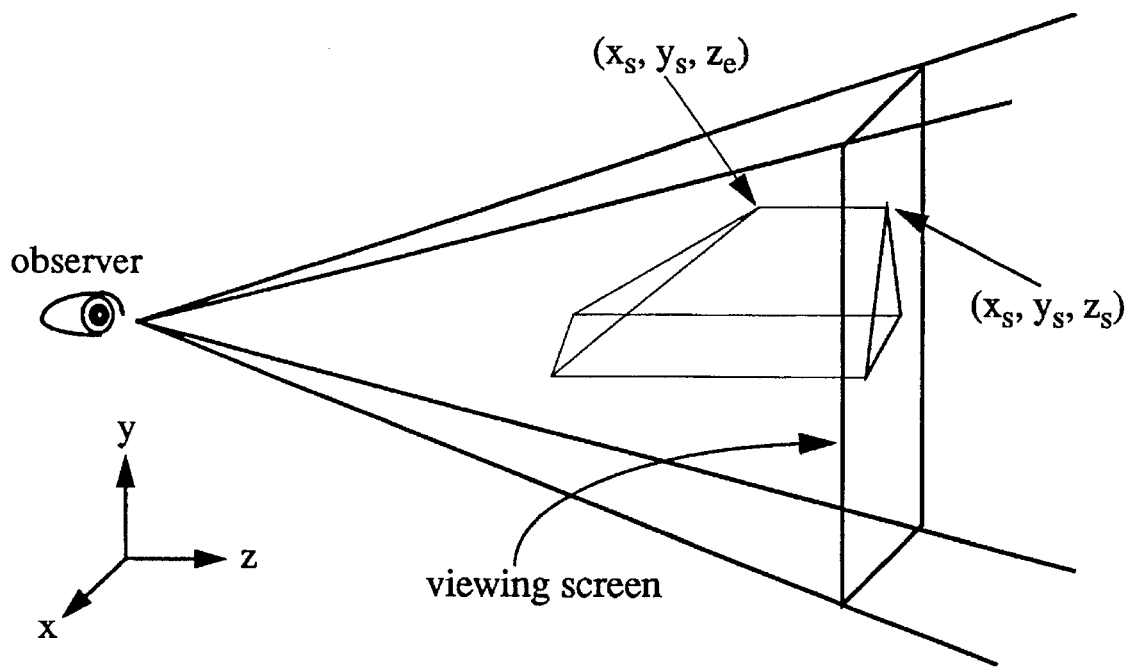
Figure 4:
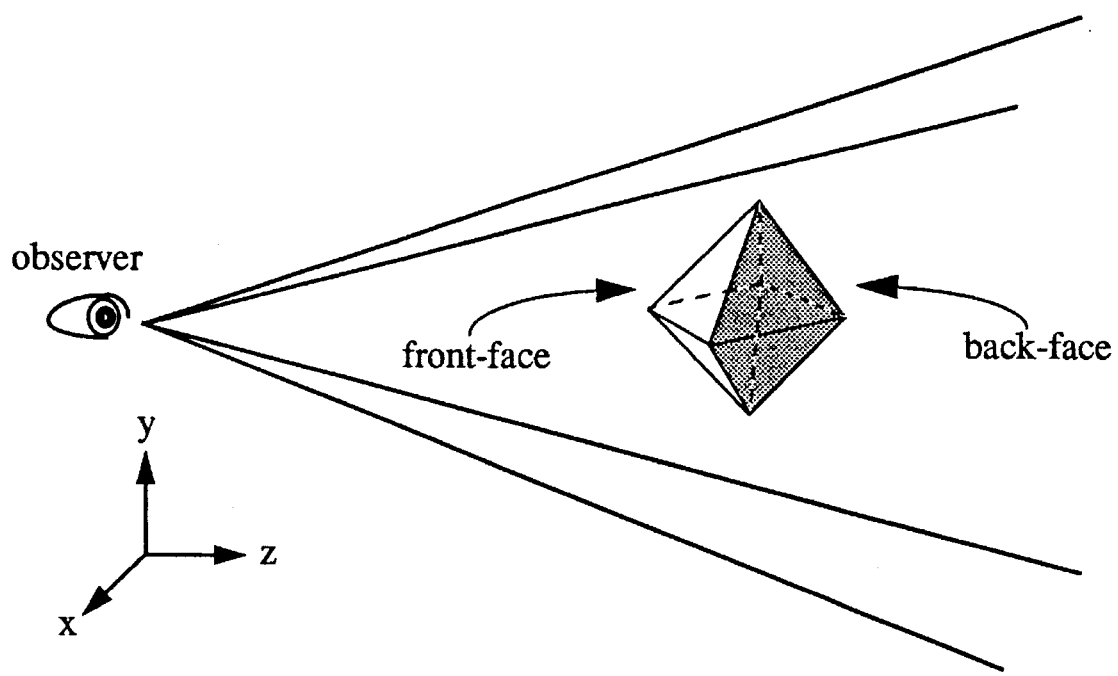
Figure 5:
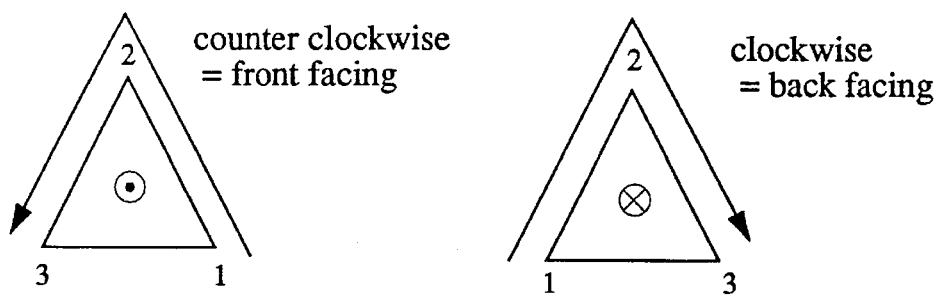
Figure 6:
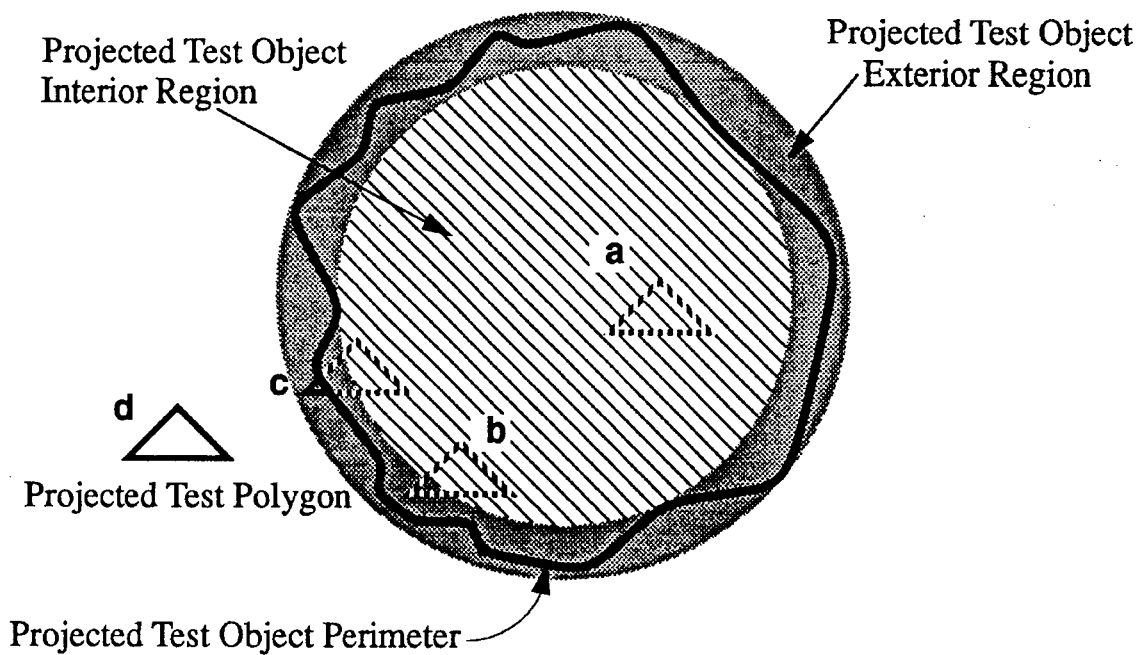

The method and apparatus described here has numerous possible variations, but the essential idea is described here in the simplified overview. The present invention, given a perspective translated object made up of planar polygons (referred to as the Test Object) and a separate perspective translated planar polygon from a different object (referred to as the Test Polygon, determines whether the Test Object completely occults the Test Polygon. In this case the Test Polygon is invisible to the observer by virtue of being hidden by the Test Object and does not need to rendered. The perspective projections of the Test Object and Test Polygon are referred to as the Projected Test Object and the Projected Test Polygon. FIG. 6 shows one Projected Test Object and four Projected Test Polygons, labelled a, b, c, and d. For the Projected Test Object pictured, only the perspective projected perimeter is shown, even though the Test Object is made up of polygons.

The primary objective here is to determine: 1) in the xy viewing plane, does the Projected Test Polygon lie entirely within the area bounded by the perimeter of the Projected Test Object; and 2) in xyz perspective translated coordinates, does all of the Test Polygon lie behind that portion of the Test Object that subtends the same area as the Test Polygon in the xy plane. Secondary objectives are disclosed in later sections.

It is apparent from FIG. 6 that it would be computationally expensive to determine whether a Projected Test Polygon lies within the perimeter of the Projected Test Object. This computation can be simplified by approximating the region inside the perimeter of the Projected Test Object with a set of simple Projected Shapes whose union approximates the inside area of the Projected Test Object. Area approximations are made for both the perimeter and inner area of the Projected Test Object, and these area approximations can be any Projected Shape or union of Projected Shapes, but simpler Shapes result in easier computations. In this simplified overview, the Shape used is a circle, but in the full explanation of the invention, rectangles (in two dimensions) or right parallelepipeds (in three-dimensions) are used.

In this first example, the Projected Test Object is approximated with circles. The inner area, called the Projected Interior Region, is where a Test Polygon is definitely occulted, provided it is behind the Test Object. The outer area, called the Projected Exterior Region, is an approximation of the perimeter, and Projected Test Polygons lying in this region may or may not be occulted. Thus, if a Projected Test Polygon lies completely within the Projected Interior Region, and is behind the Test Object, it can be discarded and need not sent to the rasterizer. The Projected Test Polygon can also be approximated with its own Area Approximation (for example, a bounding circle or rectangle), which further simplifies the computation. In FIG. 6, assuming the Test Polygon is behind the Test Object, a Projected Test Polygon in position a is occulted and can be discarded, while Projected Test Polygons in positions b, c, and d are not discarded. Note that for position b, the Test Polygon will be rendered even though it is actually occulted. This type of error is acceptable if the majority of occulted polygons are removed and the resulting rendered picture is unaltered.

The particular Area Approximations in the example of FIG. 6 are not satisfactory because: 1) it is not easy to compute the Area Approximations due to the need to optimally match the circles to the Projected Test Object (this may need to be done for every frame in an animation sequence); and 2) it does not work well for objects that have either highly concave projections or projections with holes.

The example of FIG. 6 is very simple, but not very useful. In the second example, shown in FIG. 7, multiple circles are used to build both the Projected Interior Region and Projected Exterior Regions of the Test Object. Once again, any Projected Shape can be used, and a circle was chosen for this example. The basis for generating these bounding circles could be individual polygons, individual line segments, or groups of combinations of polygons and line segments. Once the basis for generating the bounding circles has been chosen, and all the various Projected Shapes generated, they must be categorized as part of the Projected Interior Region or the Projected Exterior Region. FIG. 7 shows an example of how the Shapes are categorized as either Interior or Exterior. Notice Interior may overlap with Exterior. Thus, for a Test Polygon to be occulted and discarded, 1) the Test Polygon must be behind the Test Object; 2) the Projected Test Polygon must intersect some of the Projected Interior Region of the Test Object; and 3) the Projected Test Polygon must not intersect any part of the Projected Exterior Region of the Test Object.

In general, for the invention to function properly, the Projected Exterior Region must contain the perimeter of the Projected Test Object and must form a contiguous hull around the Projected Test Object. The invention is most efficient in detecting hidden polygons when the area of the Projected Exterior Region is as small as possible; ideally the Projected Exterior Region is simply the line that forms the perimeter of the Projected Test Object. Also, the Projected Interior Region must be contained within the bounds of the Projected Exterior Region, but the two regions may overlap provided the Projected Interior Region does not have any points or area outside of the outer perimeter of the Projected Exterior Region.

In addition, there may be a third type of region, called the Ambiguous Region, which need not be contiguous. The Projected Ambiguous Region may overlap both the Projected Interior and Projected Exterior Regions of the Test Object. Typically, Ambiguous Regions are generated when the classification of Shapes into Exterior or Interior results in some Projected Interior Shapes that protrude beyond the outer perimeter of the Projected Exterior Region. When this happens, the protruding Shape can either be reclassified as Exterior, or given the special classification of Ambiguous. Shapes defined as Ambiguous are ignored when Test Polygons are processed.

Suppose the Test Polygon is more distant from the observer than the Test Object, so that the Test Object may occult the Test Polygon depending on the relative sizes and positions of the Test Object and the Test Polygon. Suppose also the Projected Test Polygon has some area of overlap with the Projected Interior Region of the Test Object. In order to have some portion of the Test Polygon visible to the observer under these circumstances, the Projected Test Polygon must cross the perimeter of the Projected Test Object at some point. The Projected Exterior Region of the Test Object forms a contiguous hull around the Projected Test Object that includes the perimeter, so in order to have some portion of the Test Polygon visible to the observer under these circumstances, the Projected Test Polygon must cross the Projected Exterior Region. Conversely, if the Projected Test Object does not have any area of overlap with the Projected Exterior Region, then the Test Polygon must be completely occulted. Therefore criteria may be established for determining if a Test Object completely occults a Test Polygon using the Interior and Exterior Regions and their two-dimensional counterparts, namely the Projected Interior and Projected Exterior Regions.

Stated more rigorously the occulting criteria are as follows:

OCCULTING CRITERIA

1) The Projected Test Polygon shares some area with the Projected Interior Region of the Test Object in the xy viewing plane (i.e., they intersect).
2) The Projected Test Polygon shares no area in common with the Projected Exterior Region of the Test Object in the xy viewing plane (i.e., they do not intersect).
3) That area of the Projected Test Object that overlaps in the xy viewing plane with the Projected Test Polygon corresponds to a portion of the three-dimensional perspective translated Test Object whose maximum z coordinate is less than the minimum z coordinate of the vertices of the three-dimensional perspective translated Test Polygon.

The first two conditions insure that the Projected Test Polygon is contained within the inner area of the Projected Test Object in the xy viewing plane, and the third condition insures that the Test Polygon is "behind" the Test Object from the perspective of the observer.

Implementation of the Occulting Criteria with Bounding Boxes

The evaluation of condition 1 and condition 2 of the occulting criteria may prove difficult, insofar as the task of determining if two Projected entities intersect can be computationally complex. This task proves much simpler if the two entities are described or approximated by sets of Shapes. A simple and effective Shape is the Bounding Box. There are two types of Bounding Boxes: two-dimensional, referred to as Projected Bounding Boxes, and three-dimensional, referred to simply as Bounding Boxes. Every object, whether it be a set of polygons, a single polygon, or a polygon edge, can be contained within a Bounding Box. A Bounding Box is the smallest axially aligned right parallelepiped (in three dimensions) that completely contains the object in question. The two-dimensional perspective projection in the viewing plane of any object is contained within a Projected Bounding Box. A Projected Bounding Box is the smallest axially aligned rectangle (in two dimensions) that completely contains the projection of the object in the xy viewing plane. The Bounding Box of a three-dimensional perspective translated object is defined by its minimum and maximum x and y screen coordinates and its minimum and maximum z coordinates (as expressed in eye coordinate space). The Projected Bounding Box of a Projected object is defined by its minimum and maximum x and y screen coordinates. An example of a Bounding Box for a triangle is shown in FIG. 8. It should be noted that the Bounding Box of a perspective translated object has the same x and y coordinates as the Projected Bounding Box of the same object.

An Augmented Bounding Box is another type of three-dimensional Bounding Box which is used only with the edge of a polygon. A polygon edge Augmented Bounding Box has the same x and y dimensions as The Bounding Box of the polygon edge, but the minimum z coordinate is equal to the minimum z coordinate of the set of all polygons which contain the edge, and the maximum z coordinate is equal to the maximum z coordinate of the set of all polygons which contain the edge. In other words, a polygon edge Augmented Bounding box is the smallest axially aligned right parallelepiped that completely contains the polygon edge in the xy plane and whose minimum z coordinate is equal to the minimum z coordinate of the set of all polygons of which the edge is a part, and whose maximum z coordinate is equal to the maximum z coordinate of the set of all polygons of which the edge is a part.

A pair of Bounding Boxes share area or have points in common if they intersect. There are two types of intersection. The first type of intersection, called inequality intersection, occurs when one Bounding Box has either a minimum value or a maximum value that is greater than the minimum value and less than the maximum value of the other Bounding Box for each of the coordinate axes. In other words, an inequality intersection occurs when a pair of Projected Bounding Boxes share some common area or a pair of Bounding Boxes share some common volume. A second type of intersection, called equality intersection, occurs when two Bounding Boxes have any points at all in common. In other words, an equality intersection occurs when a pair of Projected Bounding Boxes share a common point, line segment or area or a pair of Bounding Boxes share a common point, line segment, area or volume. Both types of intersection are illustrated for the two-dimensional case in FIG. 9. It should be noted that two objects may intersect if the Bounding Boxes that contain them intersect.

It is computationally simple to determine if two Bounding Boxes have an inequality intersection and therefore share an area or volume in common. A pair of Projected Bounding Boxes have an inequality intersection if none of the following conditions are met:

1) the maximum x value of the first Projected Bounding Box is less than or equal to the minimum x value of the second Projected Bounding Box
2) the minimum x value of the first Projected Bounding Box is greater than or equal to the maximum x value of the second Projected Bounding Box
3) the maximum y value of the first Projected Bounding Box is less than or equal to the minimum y value of the second Projected Bounding Box
4) the minimum y value of the first Projected Bounding Box is greater than or equal to the maximum y value of the second Projected Bounding Box If any of these conditions are met, then the Projected Bounding Boxes do not have an inequality intersection. A pair of Bounding Boxes have an inequality intersection if none of the following conditions are met:

1) the maximum x value of the first Bounding Box is less than or equal to the minimum x value of the second Bounding Box
2) the minimum x value of the first Bounding Box is greater than or equal to the maximum x value of the second Bounding Box
3) the maximum y value of the first Bounding Box is less than or equal to the minimum y value of the second Bounding Box
4) the minimum y value of the first Bounding Box is greater than or equal to the maximum y value of the second Bounding Box
5) the maximum z value of the first Bounding Box is less than or equal to the minimum z value of the second Bounding Box
6) the minimum z value of the first Bounding Box is greater than or equal to the maximum z value of the second Bounding Box If any of these conditions are met, then the Bounding Boxes do not have an inequality intersection.

It is equally simple to determine if two Projected Bounding Boxes have an equality intersection. A pair of Projected Bounding Boxes have an equality intersection if none of the following conditions are met:

1) the maximum x value of the first Projected Bounding Box is less than the minimum x value of the second Projected Bounding Box
2) the minimum x value of the first Projected Bounding Box is greater than the maximum x value of the second Projected Bounding Box
3) the maximum y value of the first Projected Bounding Box is less than the minimum y value of the second Projected Bounding Box
4) the minimum y value of the first Projected Bounding Box is greater than the maximum y value of the second Projected Bounding Box If any of these conditions are met, then the Projected Bounding Boxes do not have an equality intersection. A pair of three-dimensional perspective translated Bounding Boxes have an equality intersection if none of the following conditions are met:

1) the maximum x value of the first Bounding Box is less than the minimum x value of the second Bounding Box
2) the minimum x value of the first Bounding Box is greater than the maximum x value of the second Bounding Box
3) the maximum y value of the first Bounding Box is less than the minimum y value of the second Bounding Box
4) the minimum y value of the first Bounding Box is greater than the maximum y value of the second Bounding Box
5) the maximum z value of the first Bounding Box is less than the minimum z value of the second Bounding Box
6) the minimum z value of the first Bounding Box is greater than the maximum z value of the second Bounding Box If any of these conditions are met, then the Bounding Boxes do not have an equality intersection.

Determining whether the three occulting criteria are met is computationally simpler if Bounding Boxes and Projected Bounding Boxes are used to approximate the Test Polygon and the Exterior and Interior Regions of the Test Object. The Test Polygon is replaced by a region that contains it, consisting of one or more Bounding Boxes, and the Test Polygon two-dimensional perspective projection, referred to as the Projected Test Polygon, is replaced by the Projected Bounding Box or Boxes that contain it. The Exterior Region of the Test Object becomes the union of a set of Bounding Boxes that collectively contain the object perimeter and which form a contiguous hull around the object. For example, the Exterior Region could be defined as the set of Bounding Boxes that contain the polygon edges that make up the perimeter of the object as seen by the observer. All such edges are designated as Exterior Edges, and their Bounding Boxes are referred to as Exterior Bounding Boxes. The Projected Exterior Region would then be defined as the set of Projected Bounding Boxes that contain the Projected Exterior Edges. The Projected Interior Region becomes the union of a set of Projected Bounding Boxes that occupy some or all of the area inside the perimeter formed by the Projected Bounding Boxes that make up the Projected Exterior Region. For example, the Projected Interior Region could be defined as the set of Projected Bounding Boxes that contain all Projected non-Exterior Polygon edges that satisfy the condition that their Projected Bounding Boxes do not intersect with any Exterior Region Projected Bounding Box in the xy viewing plane. All such edges are designated as Interior Edges, and their Bounding Boxes are referred to as Interior Bounding Boxes. The three-dimensional Interior Region is then the union of the set of Bounding Boxes (corresponding to the Interior Projected Bounding Boxes) of all Interior Polygon edges. It is assumed that all objects are in perspective translated or perspective projected coordinates; thus each three-dimensional Bounding Box has a corresponding two-dimensional Projected Bounding Box, which is simply the Bounding Box without the z dimension. The Projected Bounding Box can be obtained from the Bounding Box simply by dropping the z coordinate from each vertex point. It should also be noted that it is possible for Bounding Boxes not to intersect in three dimensions while the corresponding Projected Bounding Boxes may still intersect in the xy viewing plane. In this example, any polygon edge that was neither Interior nor Exterior would be classified as Ambiguous.

the occulting criteria are still valid when Bounding Boxes are used to represent the different regions of an object provided the Projected Interior Region does not extend beyond the outer perimeter of the Projected Exterior Region. The three conditions that determine if the Test Polygon is occulted then become:

BOUNDING BOX OCCULTING CRITERIA

1) The two-dimensional region containing the perspective projected Test Polygon, consisting of one or more Projected Bounding Boxes, intersects with at least one of the Interior Region Projected Bounding Boxes.
2) The Test Polygon Projected Bounding Box or Boxes intersect with none of the Exterior Region Projected Bounding Boxes.
3) Each Interior or Exterior Bounding Box of the Test Object whose corresponding Projected Bounding Box intersects with the Test Polygon Projected Bounding Box or Boxes have vertices that all have smaller z coordinates than the minimum z coordinate of the vertices of the Test Polygon Bounding Box or Boxes.

Defining regions with Bounding Boxes

Possible Test Polygon containing region definitions

Bounding Boxes may be used to define the region containing the Test Polygon in a number of ways. Two possible Test Polygon containing region definitions are as follows:

1) Test Polygon containing region: the Bounding Box that contains the Test Polygon. Projected Test Polygon containing region: the Projected Bounding Box that contains the perspective projected Test Polygon.
2) (For triangles only) Test Triangle containing region: the union of Bounding Boxes that contain the edges of the Test Triangle. Projected Test Triangle containing region: the union of Projected Bounding Boxes that contain the perspective projected edges of the Test Triangle.

In the case of a triangle, these two definitions produce identical containing regions. FIG. 10 illustrates both definitions of the containing region in two dimensions. It should be noted that in definition 2, each edge of the triangle may be evaluated separately for occultation. If all three edges are individually occulted, the whole triangle is also occulted. This is true even if the different edges of the triangle are occulted by different objects rather than a single object.

Possible Test Object Exterior Region and Projected Exterior Region definitions

The Exterior Region of the Test Object includes the perimeter (as it is perceived by the observer) of the Test Object. Therefore the edges of polygons that are on the perimeter of the Test Object must be identified. There are two methods of identifying these edges, which are referred to as "perimeter" edges. If back-face culling has been performed, a perimeter edge is distinguished by the fact that it is associated with a single polygon and is shared with no other polygon from the same object. In the absence of back-face culling, a perimeter edge is distinguished by the fact that it is shared between a front facing polygon and a back facing polygon from the same object.

Bounding Boxes may be used to define the Exterior Region and Projected Exterior Region of the Test Object in a number of ways. Two possible Exterior Region definitions are as follows:

1) Exterior Region: the union of the set of Bounding Boxes that contain all those polygons whose Projected edges make up the perimeter of the object as seen by the observer. Projected Exterior Region: the union of the set of Projected Bounding Boxes that contain the perspective projections of the same polygons.

2) Exterior Region: the union of the set of Bounding Boxes that contain all those polygon edges whose Projected edges make up the perimeter of the object as seen by the observer. Projected Exterior Region: the union of the set of Projected Bounding Boxes that contain the perspective projections of the same polygon edges.

Figure 11:
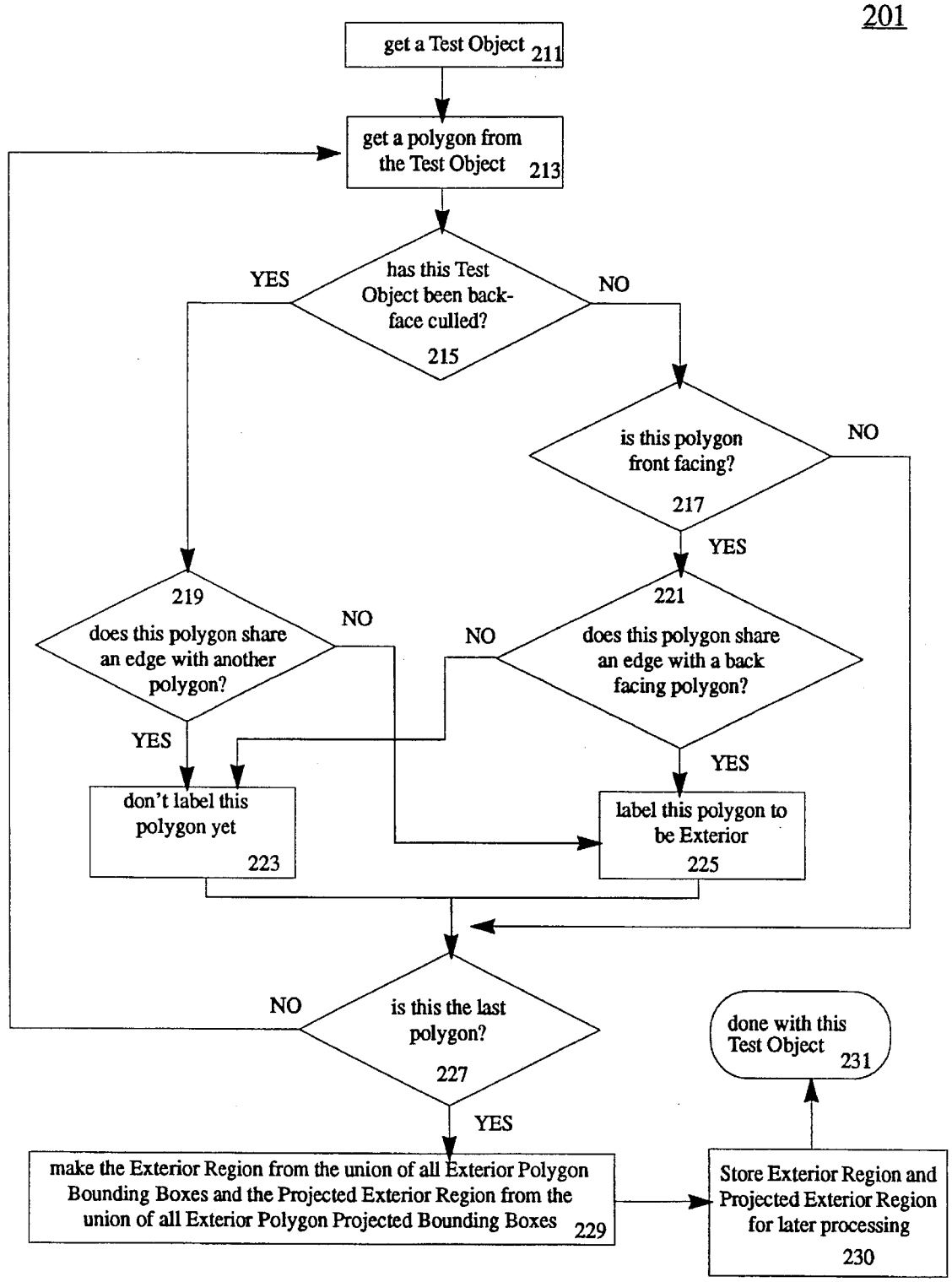

A flowchart that implements definition 1 of the Exterior Region and Projected Exterior Region is shown in FIG. 11. The means for carrying out a function shown here cycles through a loop, examining a polygon from the Test Object 213 to see which of the polygons have one or more edges on the object's perimeter. A perimeter edge is distinguished by the fact that it occurs in only one polygon 219, or, in the absence of back-face culling, it is shared between a forward facing polygon and a backward facing polygon 221. Each front facing polygon possessing an edge that fulfills one of these conditions is labeled Exterior 225. The process is repeated until the last polygon has been examined 227. The Exterior Region is then defined as the union of the set of Bounding Boxes of all polygons that posses an Exterior Edge and the Projected Exterior Region is defined as the union of the set of Projected Bounding Boxes of all polygons that posses an Exterior Edge 229. The resulting Exterior Region and Projected Exterior Region are stored 230 for later use by the invention in detecting occulted polygons, at which point the process is complete 231.

Figure 12:
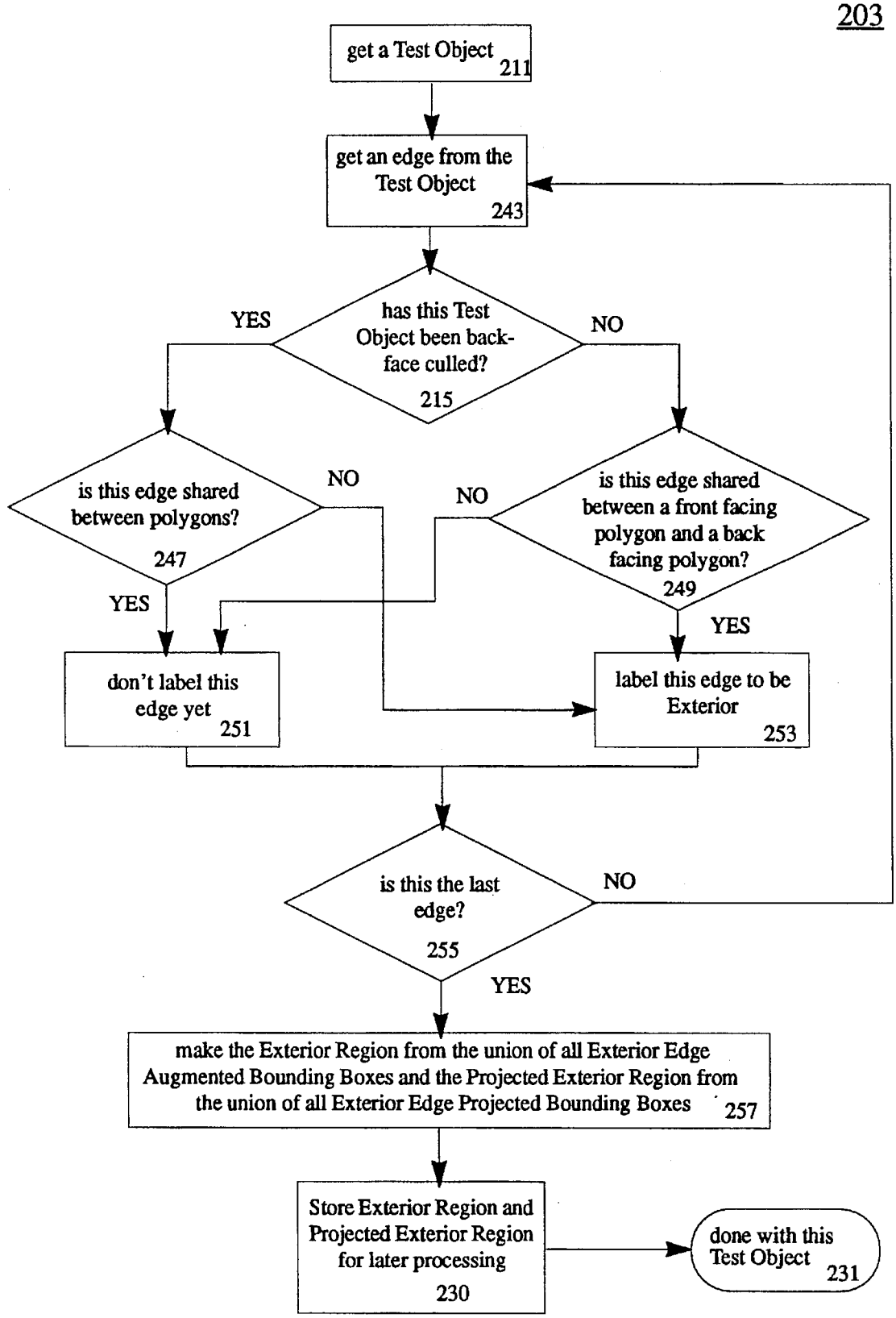

A flowchart that implements definition 2 of the Exterior Region and Projected Exterior Region is shown in FIG. 12. The means for carrying out a function shown here cycles through a loop, examining an edge from the Test Object 243 to see which of the edges are on the object's perimeter. A perimeter edge is distinguished by the fact that it occurs in only one polygon 247, or, in the absence of back-face culling, it is shared between a forward facing polygon and a backward facing polygon 249. Each edge that fulfills one of these conditions is labeled Exterior 253. The process is repeated until the last edge has been examined 255. The Exterior Region is then defined as the union of the Augmented Bounding Boxes of all Exterior Edges and the Projected Exterior Region is defined as the union of the Projected Bounding Boxes of all Projected Exterior Edges 257. The resulting Exterior Region and Projected Exterior Region are stored 230 for later use by the invention in detecting occulted polygons, at which point the process is complete 231.

Figure 13:
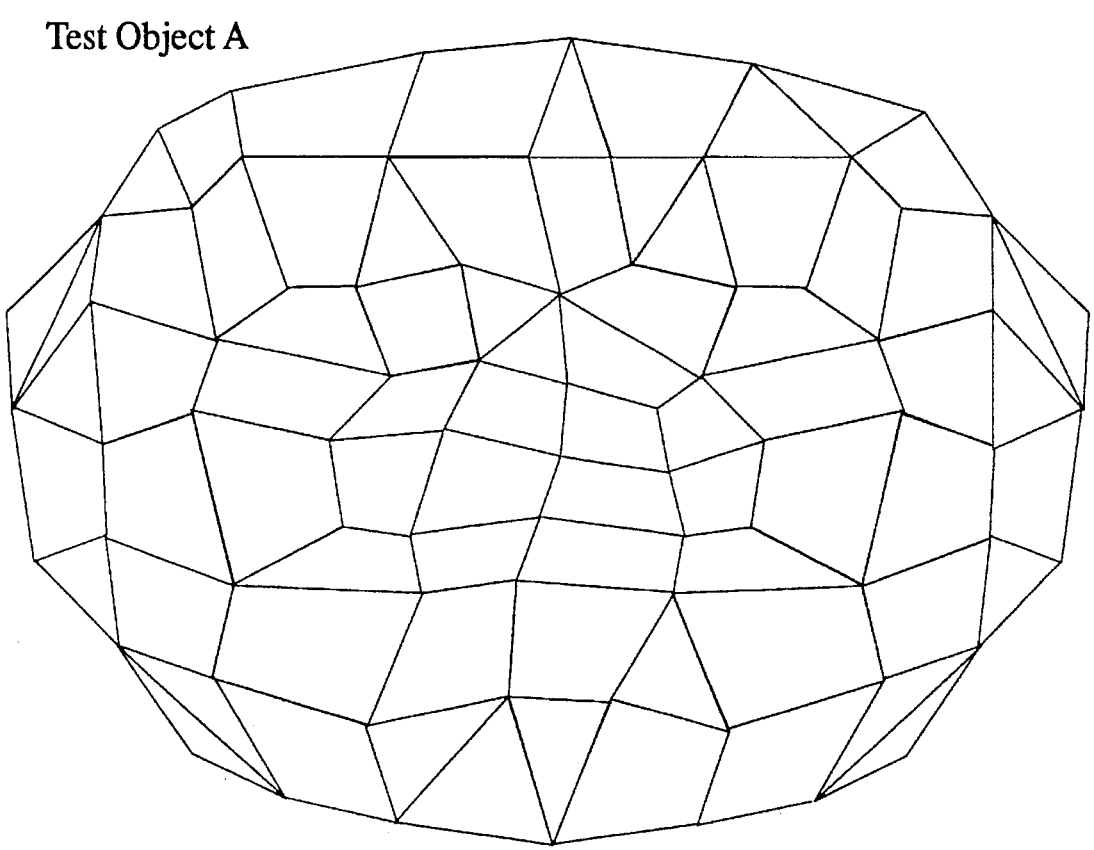
Figure 14:
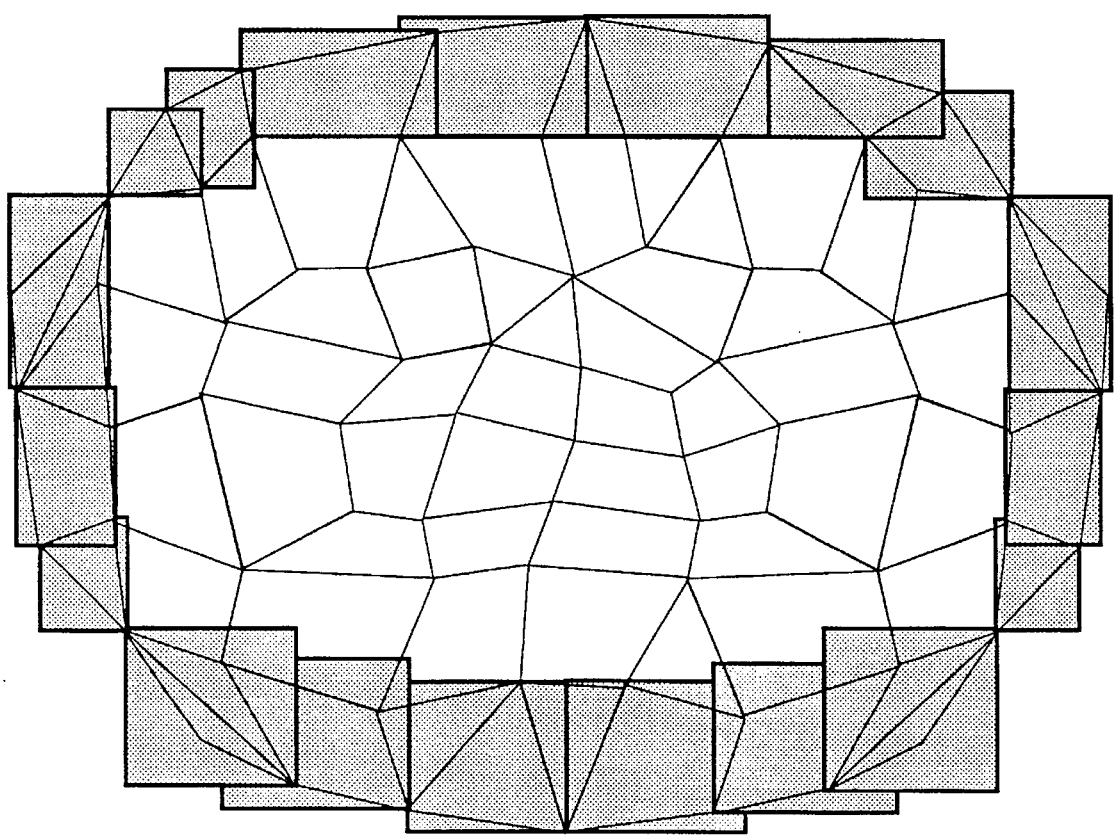
Figure 15:
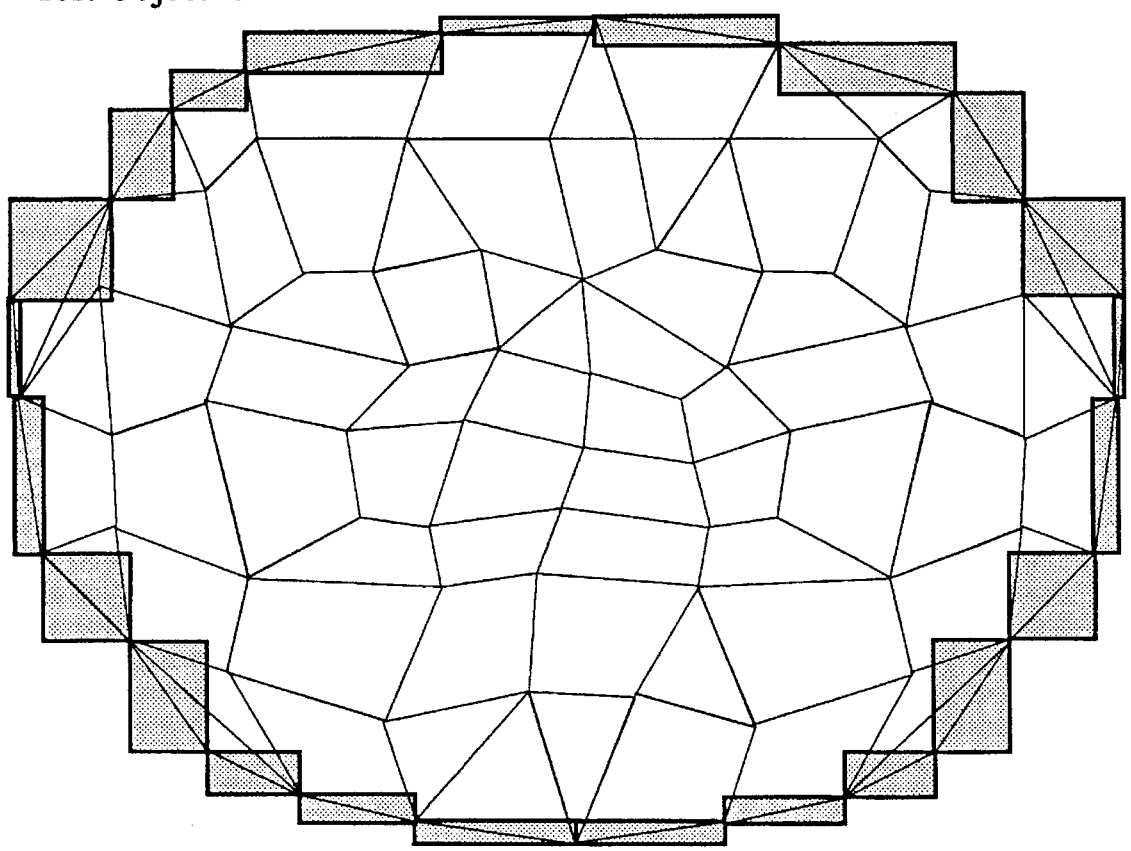

Consider the perspective projected object shown in FIG. 13, designated Test Object A, which is shown as it would be seen by an observer and as it would be rendered on the xy viewing plane of a CRT screen. Test Object A is composed of planar convex polygons. The Projected Exterior Regions as defined by definition 1 is illustrated in FIG. 14. The Projected Exterior Region as defined by definition 2 is illustrated in FIG. 15.

Possible Test Object Interior Region and Projected Interior Region definitions

Bounding Boxes may be used to define the Interior Region and Projected Interior Region of the Test Object in a number of ways. Some possible definitions are as follows:

1) Interior Region: the union of the set of Bounding Boxes that contain all those polygons that satisfy the condition that no Interior Bounding Box has an equality intersection with an Exterior Bounding Box in the xy viewing plane. Projected Interior Region: the union of the set of Projected Bounding Boxes that contain the perspective projections of the same polygons.

2) Interior Region: the union of the set of Bounding Boxes that contain all those polygons that satisfy the condition that no Interior Bounding Box has an inequality intersection with an Exterior Bounding Box in the xy viewing plane. Projected Interior Region: the union of the set of Projected Bounding Boxes that contain the perspective projections of the same polygons.

3) Interior Region: the union of the set of Bounding Boxes that contain all those polygons that satisfy the condition that no Interior Bounding Box has an inequality intersection with more than one Exterior Bounding Box in the xy viewing plane. Projected Interior Region: the union of the set of Projected Bounding Boxes that contain the perspective projections of the same polygons.

4) Interior Region: the union of the set of Bounding Boxes that contain all those polygon edges that satisfy the condition that no Interior Bounding Box has an equality intersection with an Exterior Bounding Box in the xy viewing plane. Projected Interior Region: the union of the set of Projected Bounding Boxes that contain the perspective projections of the same polygon edges (this works best if the Test Object is composed exclusively of triangles).

5) Interior Region: the union of the set of Bounding Boxes that contain all those polygon edges that satisfy the condition that no Interior Bounding Box has an inequality intersection with an Exterior Bounding Box in the xy viewing plane. Projected Interior Region: the union of the set of Projected Bounding Boxes that contain the perspective projections of the same polygon edges (this works best if the Test Object is composed exclusively of triangles).

6) Interior Region: the union of the set of Bounding Boxes that contain all those polygon edges that satisfy the condition that no Interior Bounding Box has an inequality intersection with more than one Exterior Bounding Box in the xy viewing plane. Projected Interior Region: the union of the set of Projected Bounding Boxes that contain the perspective projections of the same polygon edges (this works best if the Test Object is composed exclusively of triangles).

All of the above definitions (1 through 6) define the Interior Region in terms of its relation to the Exterior Region. Therefore the Interior Region definition will vary according to the choice of the Exterior Region definition.

Figure 16:
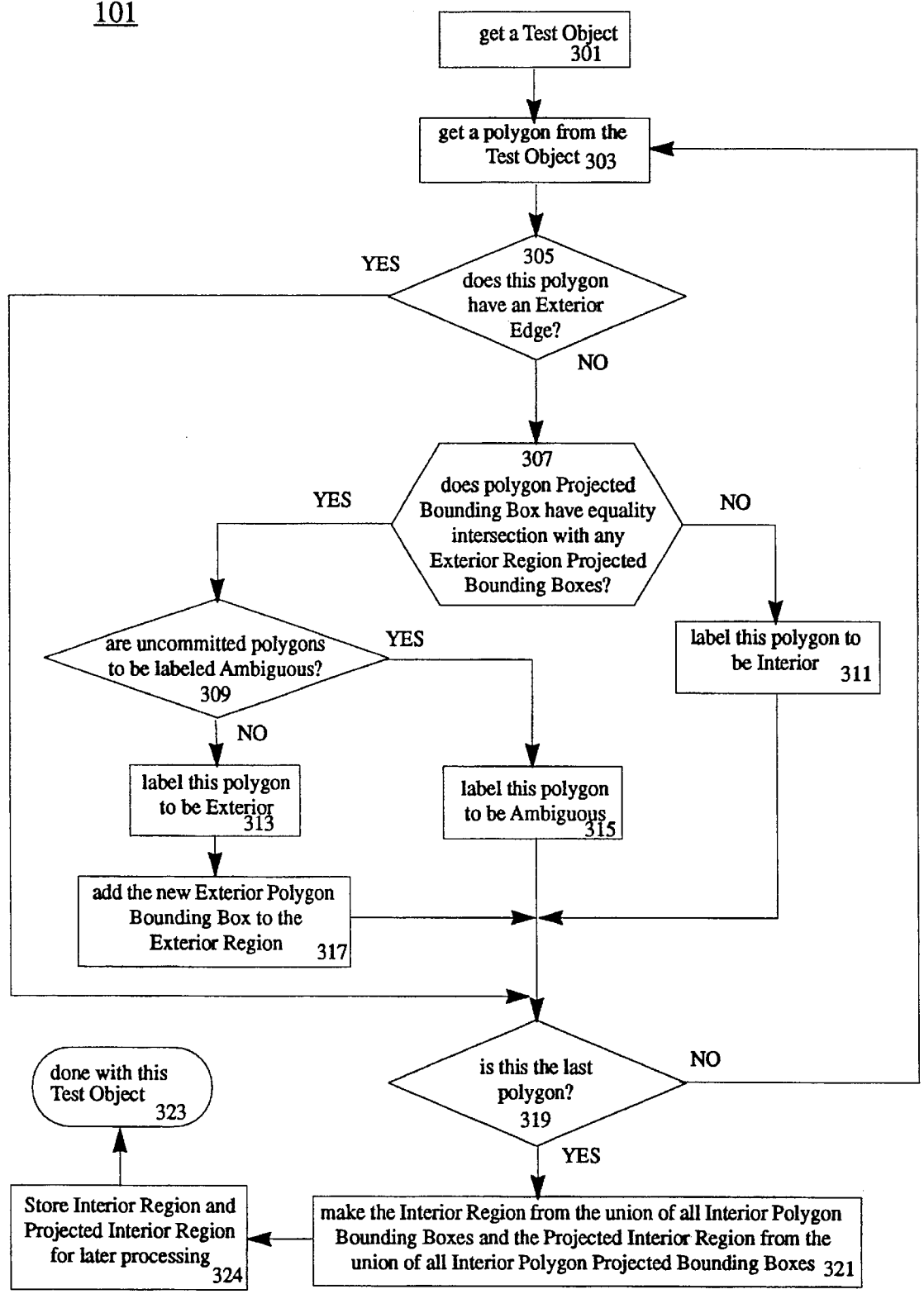

A flowchart that implements definition 1 of the Interior Region and Projected Interior Region is shown in FIG. 16.

The means for carrying out a function shown here cycles through a loop, examining a polygon from the Test Object 303 to see if the polygon has an Exterior Edge 305. The polygon is sorted 307 into one of two categories: 1) Interior Polygons 311, whose Bounding Boxes do not have an equality intersection with the Exterior Region, and 2) Ambiguous Polygons 315, whose Bounding Boxes do have an equality intersection with the Exterior Region. It is possible to implement the invention using only Exterior and Interior Regions, leaving out the Ambiguous Region. In this case, anything that would have been part of the Ambiguous Region becomes part of the Exterior Region. If the Ambiguous label is not being used 309, polygons whose Bounding Boxes do have an equality intersection with the Exterior Region are classified as Exterior 313. The process is repeated until the last polygon has been examined 319. The Interior Region is then defined as the union of all Interior Polygon Bounding Boxes and the Projected Interior Region is defined as the union of all Interior Polygon Projected Bounding Boxes 321. The resulting Interior Region and Projected Interior Region are stored 324 for later use by the invention in detecting occulted polygons, at which point the process is complete 323.

Figure 17:
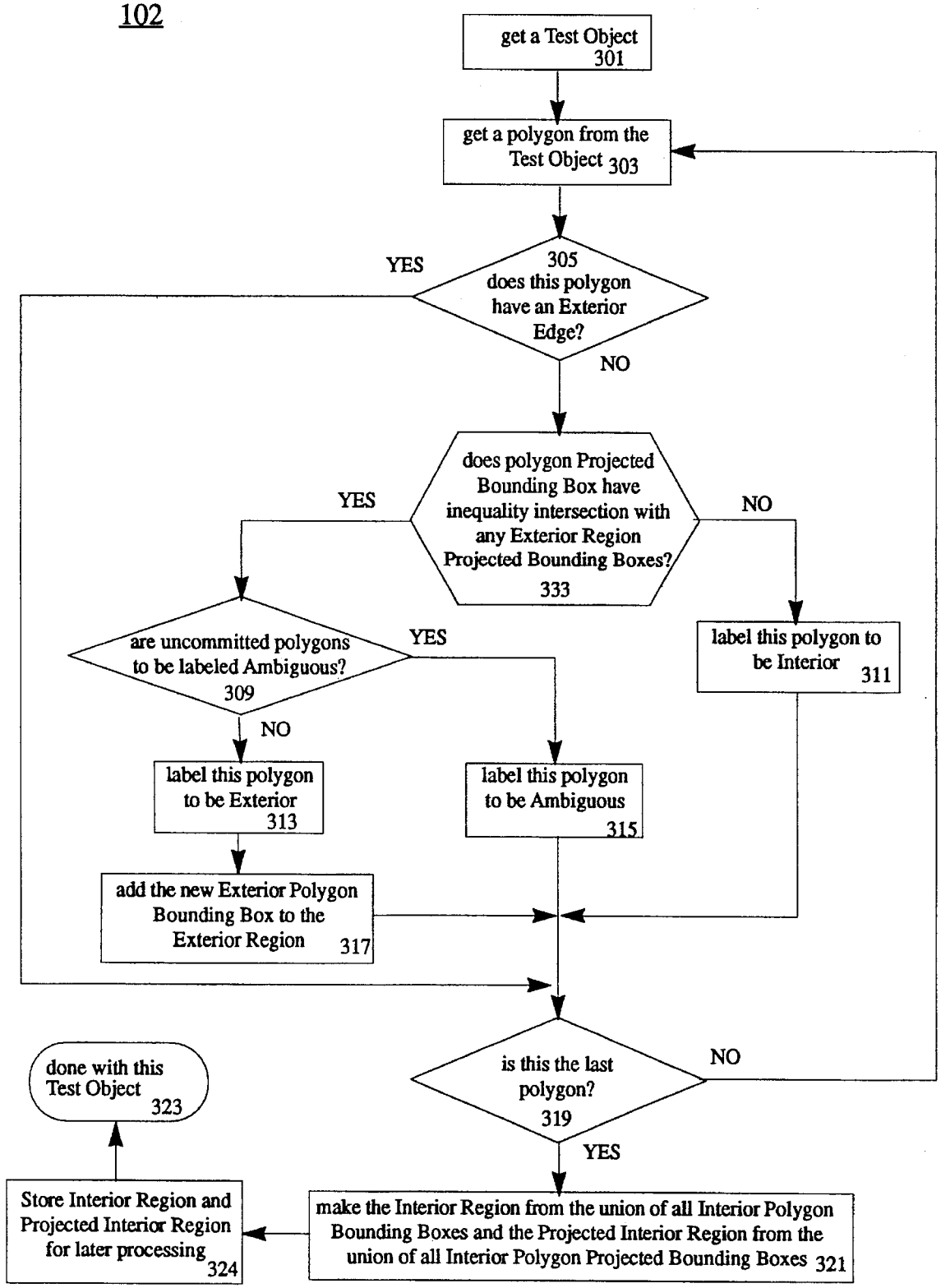

A flowchart that implements definition 2 of the Interior Region and Projected Interior Region is shown in FIG. 17. The means for carrying out a function shown here cycles through a loop, examining a polygon from the Test Object 303 to see if the polygon has an Exterior Edge 305. The polygon is sorted 333 into one of two categories: 1) Interior Polygons 311, whose Bounding Boxes do not have an inequality intersection with the Exterior Region, and 2) Ambiguous Polygons 315, whose Bounding Boxes do have an equality intersection with the Exterior Region. If the Ambiguous label is not being used 309, polygons whose Bounding Boxes do have an inequality intersection with the Exterior Region are classified as Exterior 313. The process is repeated until the last polygon has been examined 319. The Interior Region is then defined as the union of all Interior Polygon Bounding Boxes and the Projected Interior Region is defined as the union of all Interior Polygon Projected Bounding Boxes 321. The resulting Interior Region and Projected Interior Region are stored 324 for later use by the invention in detecting occulted polygons, at which point the process is complete 323.

Figure 18:
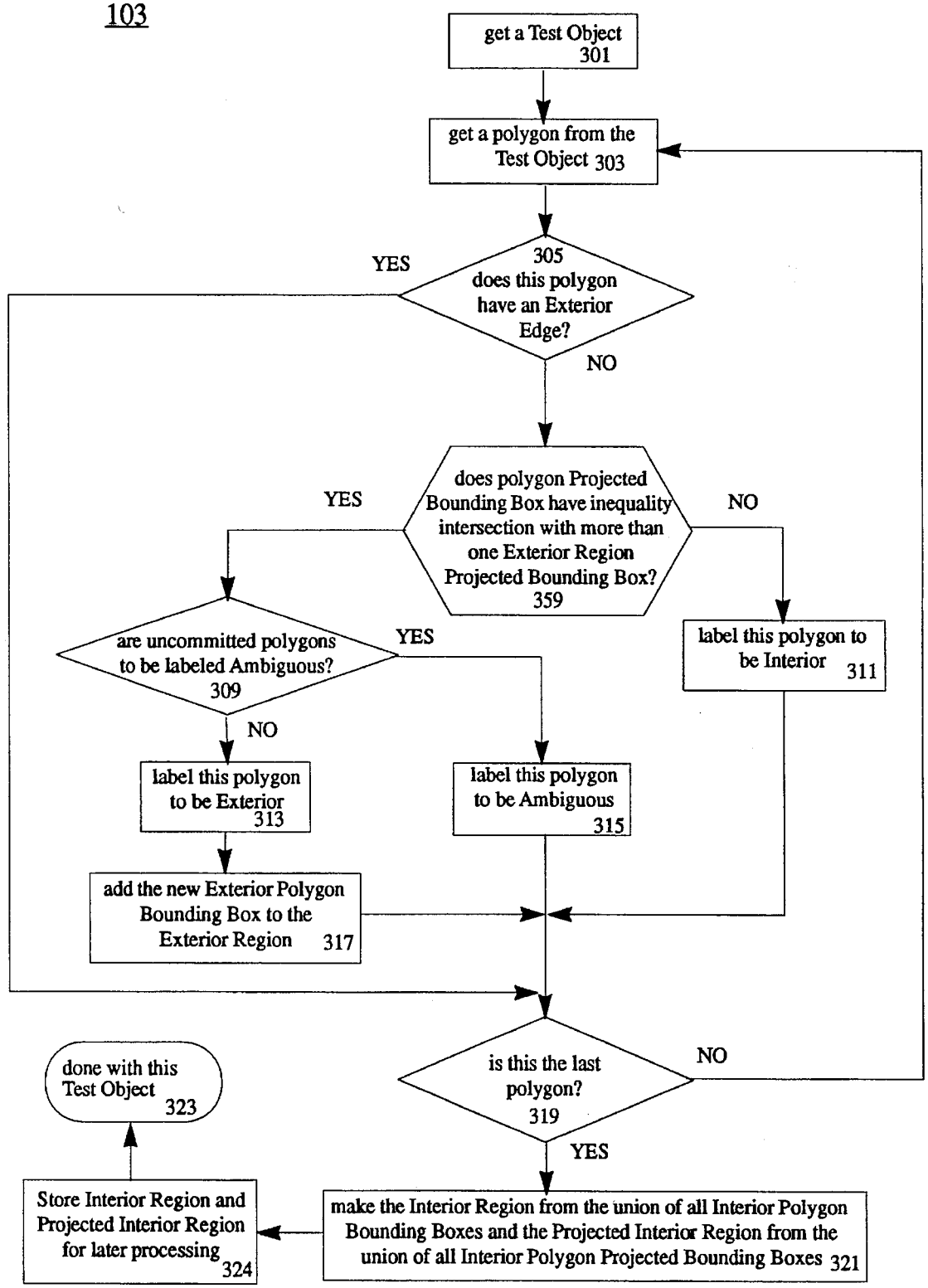

A flowchart that implements definition 3 of the Interior Region and Projected Interior Region is shown in FIG. 18. The means for carrying out a function shown here cycles through a loop, examining a polygon from the Test Object 303 to see if the polygon has an Exterior Edge 305. The polygon is sorted 333 into one of two categories: 1) Interior Polygons 311, whose Bounding Boxes have no more than one inequality intersection with the Exterior Region, and 2) Ambiguous Polygons 315, whose Bounding Boxes have two or more inequality intersections with the Exterior Region. If the Ambiguous label is not being used 309, polygons whose Bounding Boxes have two or more inequality intersections with the Exterior Region are classified as Exterior 313. The process is repeated until the last polygon has been examined 319. The Interior Region is then defined as the union of all Interior Polygon Bounding Boxes and the Projected Interior Region is defined as the union of all Interior Polygon Projected Bounding Boxes 321. The resulting Interior Region and Projected Interior Region are stored 324 for later use by the invention in detecting occulted polygons, at which point the process is complete 323.

Figure 19:
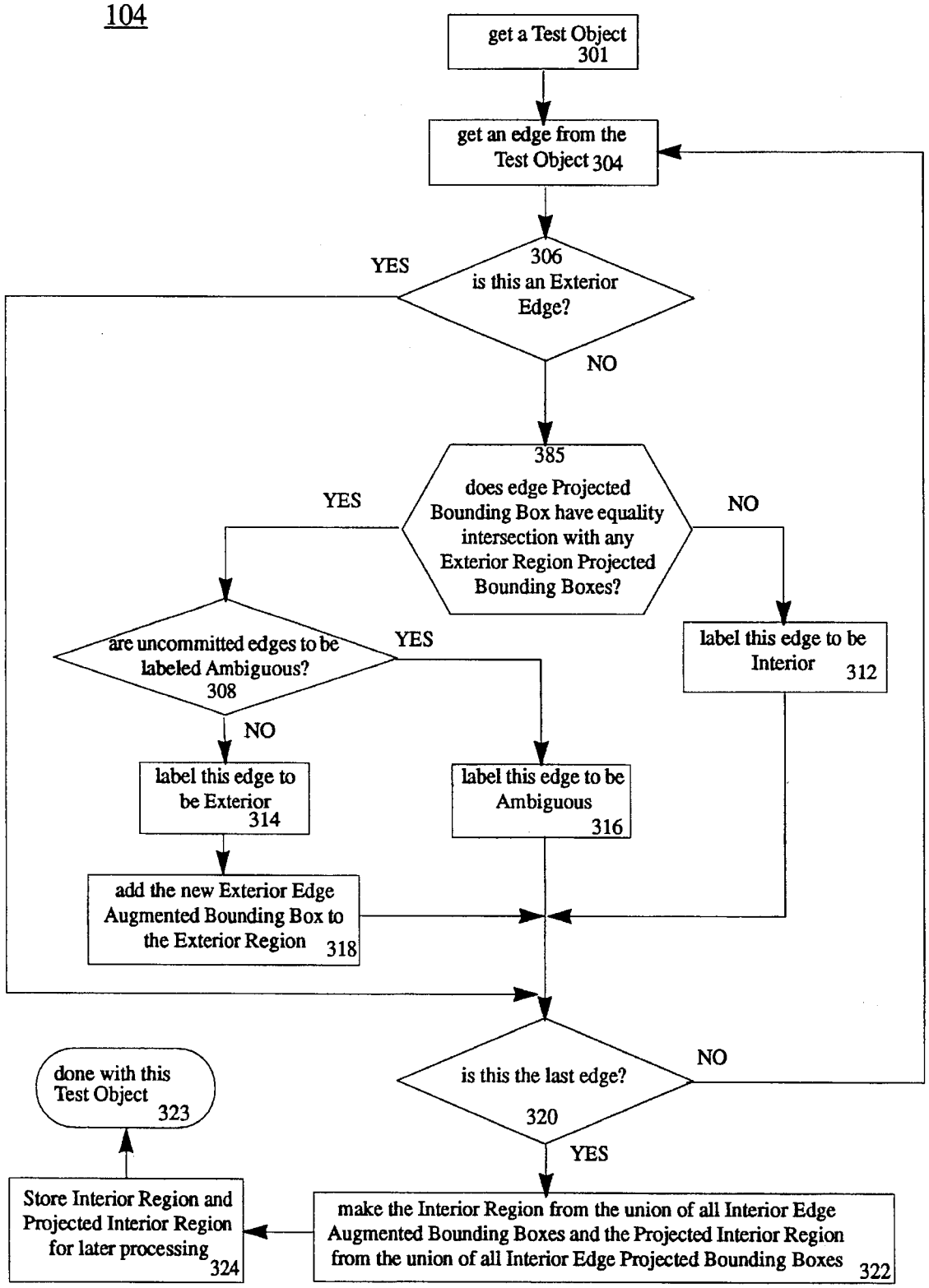

A flowchart that implements definition 4 of the Interior Region and Projected Interior Region is shown in FIG. 19. The means for carrying out a function shown here cycles through a loop, examining an edge from the Test Object 304 to see if the edge is Exterior 306. The edge is sorted 385 into one of two categories: 1) Interior Edges 312, whose Bounding Boxes do not have an equality intersection with the Exterior Region, and 2) Ambiguous Edges 316, whose Bounding Boxes do have an equality intersection with the Exterior Region. If the Ambiguous label is not being used 309, edges whose Bounding Boxes do have an equality intersection with the Exterior Region are classified as Exterior 314. The process is repeated until the last edge has been examined 320. The Interior Region is then defined as the union of all Interior Edge Augmented Bounding Boxes and the Projected Interior Region is defined as the union of all Interior Edge Projected Bounding Boxes 322. The resulting Interior Region and Projected Interior Region are stored 324 for later use by the invention in detecting occulted polygons, at which point the process is complete 323.

Figure 20:
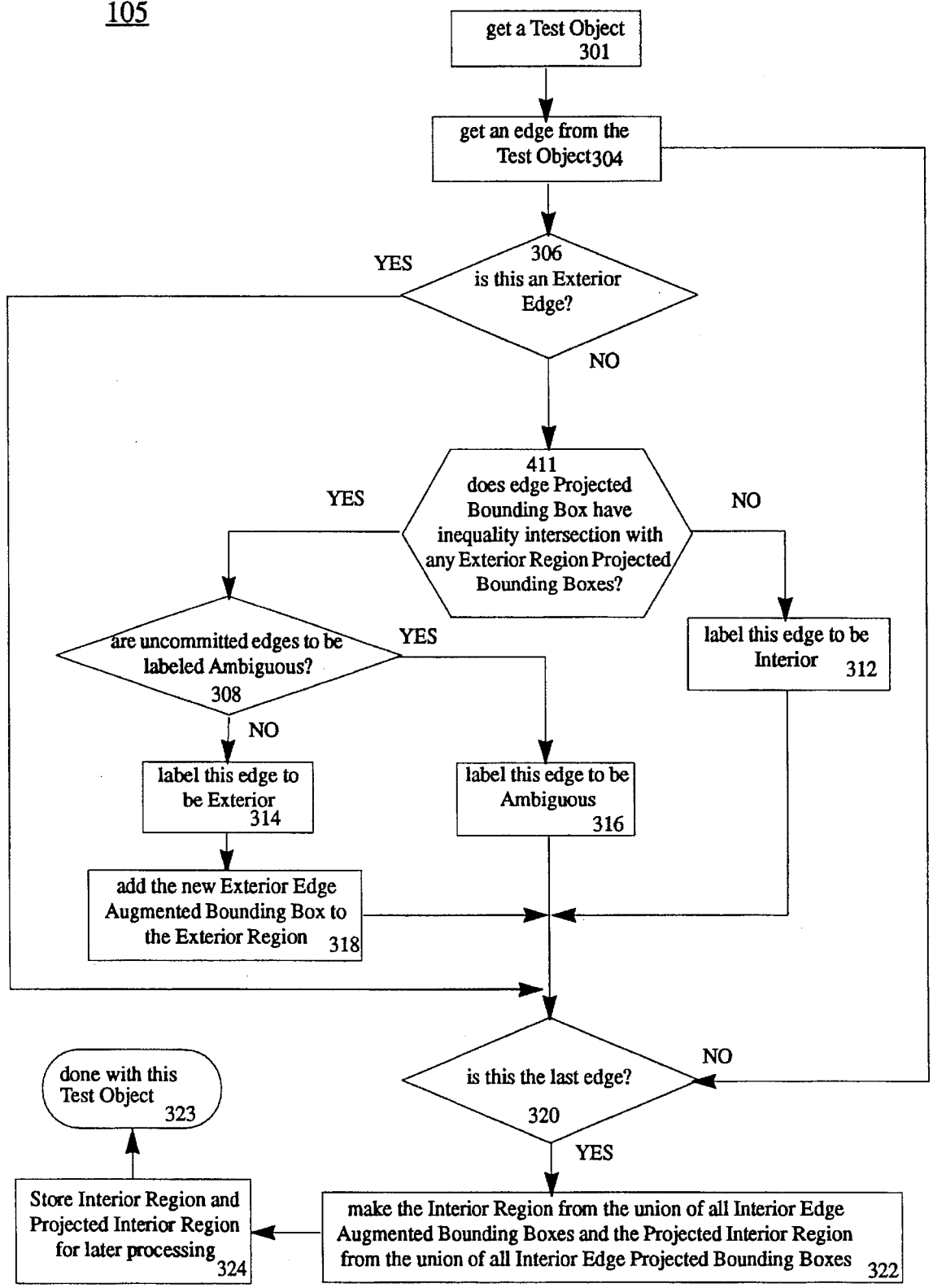

A flowchart that implements definition 5 of the Interior Region and Projected Interior Region is shown in FIG. 20. The means for carrying out a function shown here cycles through a loop, examining an edge from the Test Object 304 to see if the edge is Exterior 306. The edge is sorted 411 into one of two categories: 1) Interior Edges 312, whose Bounding Boxes do not have an inequality intersection with the Exterior Region, and 2) Ambiguous Edges 316, whose Bounding Boxes do have an inequality intersection with the Exterior Region. If the Ambiguous label is not being used 309, edges whose Bounding Boxes do have an inequality intersection with the Exterior Region are classified as Exterior 314. The process is repeated until the last edge has been examined 320. The Interior Region is then defined as the union of all Interior Edge Augmented Bounding Boxes and the Projected Interior Region is defined as the union of all Interior Edge Projected Bounding Boxes 322. The resulting Interior Region and Projected Interior Region are stored 324 for later use by the invention in detecting occulted polygons, at which point the process is complete 323.

Figure 21:
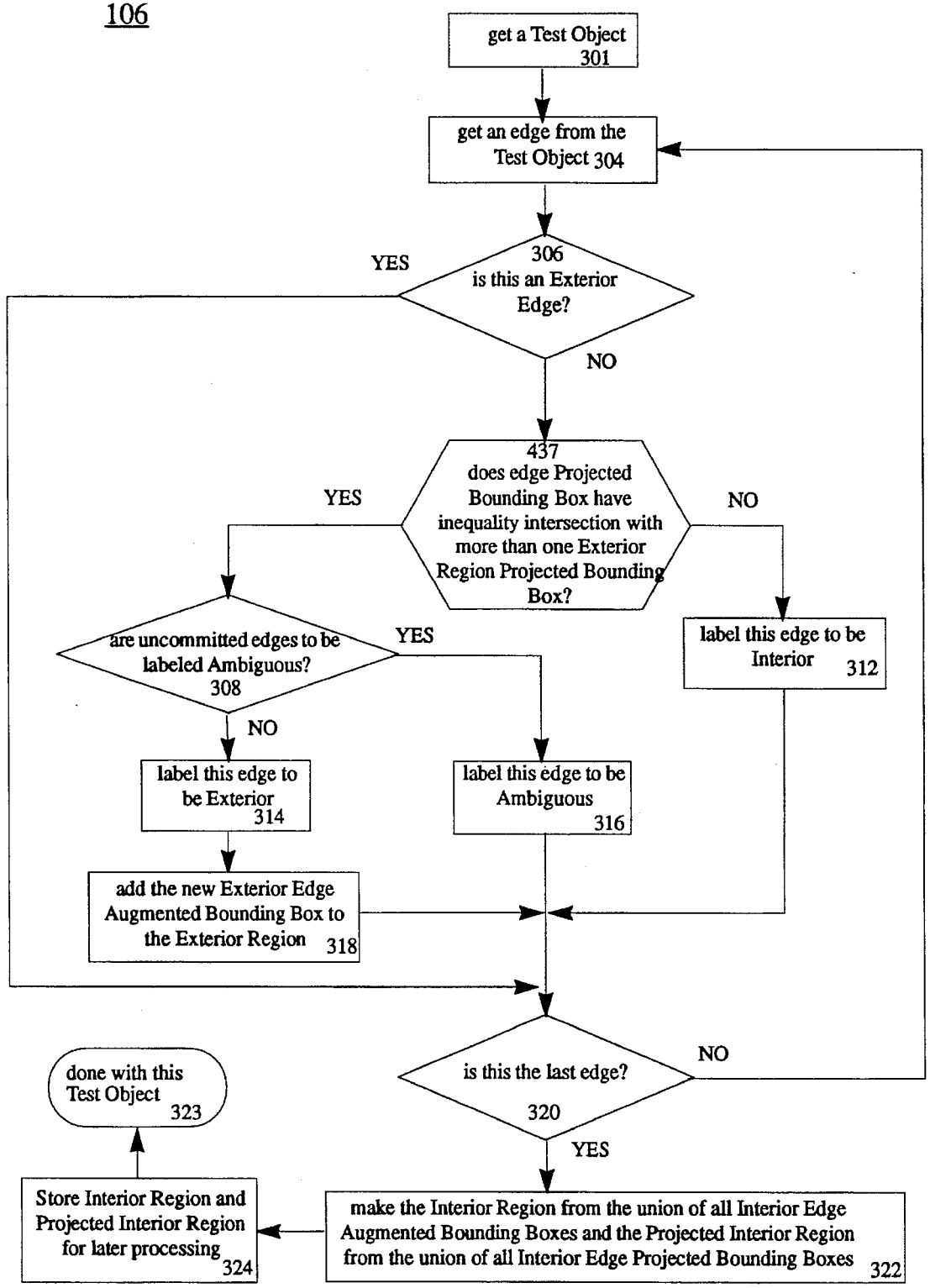

A flowchart that implements definition 6 of the Interior Region and Projected Interior Region is shown in FIG. 21. The means for carrying out a function shown here cycles through a loop, examining an edge from the Test Object 304 to see if the edge is Exterior 306. The edge is sorted 411 into one of two categories: 1) Interior Edges 312, whose Bounding Boxes have no more than one inequality intersection with the Exterior Region, and 2) Ambiguous Edges 316, whose Bounding Boxes have two or more inequality intersections with the Exterior Region. If the Ambiguous label is not being used 309, edges whose Bounding Boxes have two or more inequality intersections with the Exterior Region are classified as Exterior 314. The process is repeated until the last edge has been examined 320. The Interior Region is then defined as the union of all Interior Edge Augmented Bounding Boxes and the Projected Interior Region is defined as the union of all Interior Edge Projected Bounding Boxes 322. The resulting Interior Region and Projected Interior Region are stored 324 for later use by the invention in detecting occulted polygons, at which point the process is complete 323.

Figure 22:
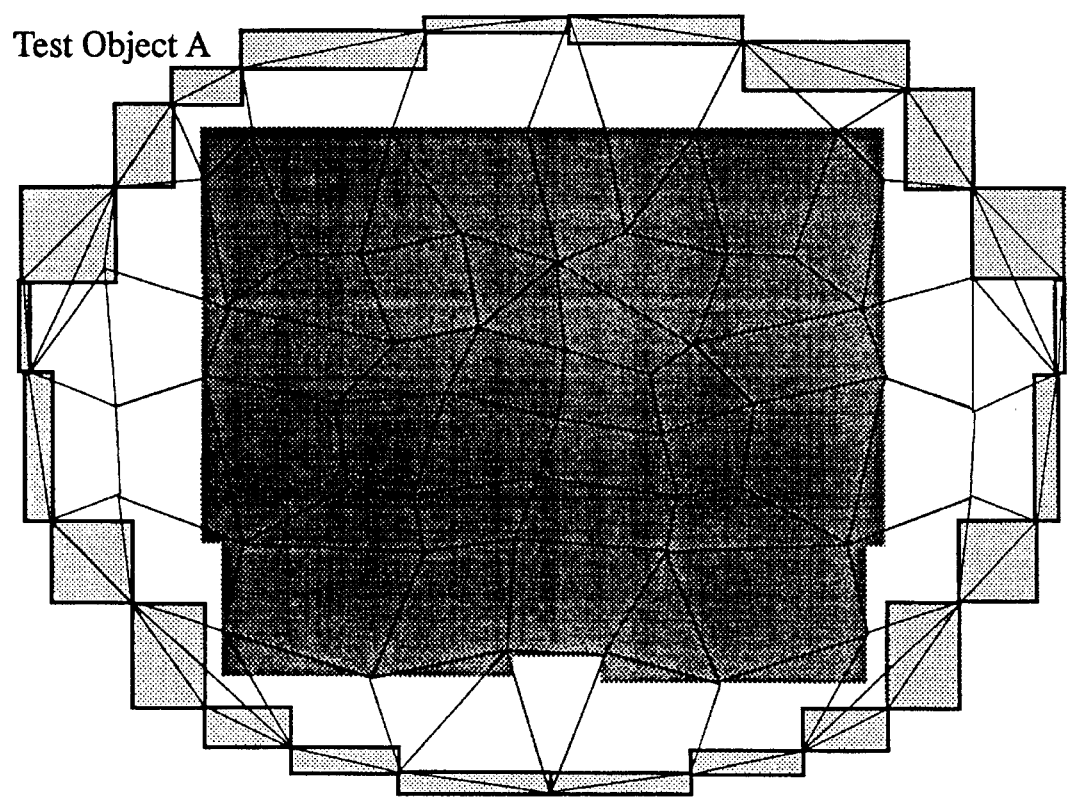
Figure 23:
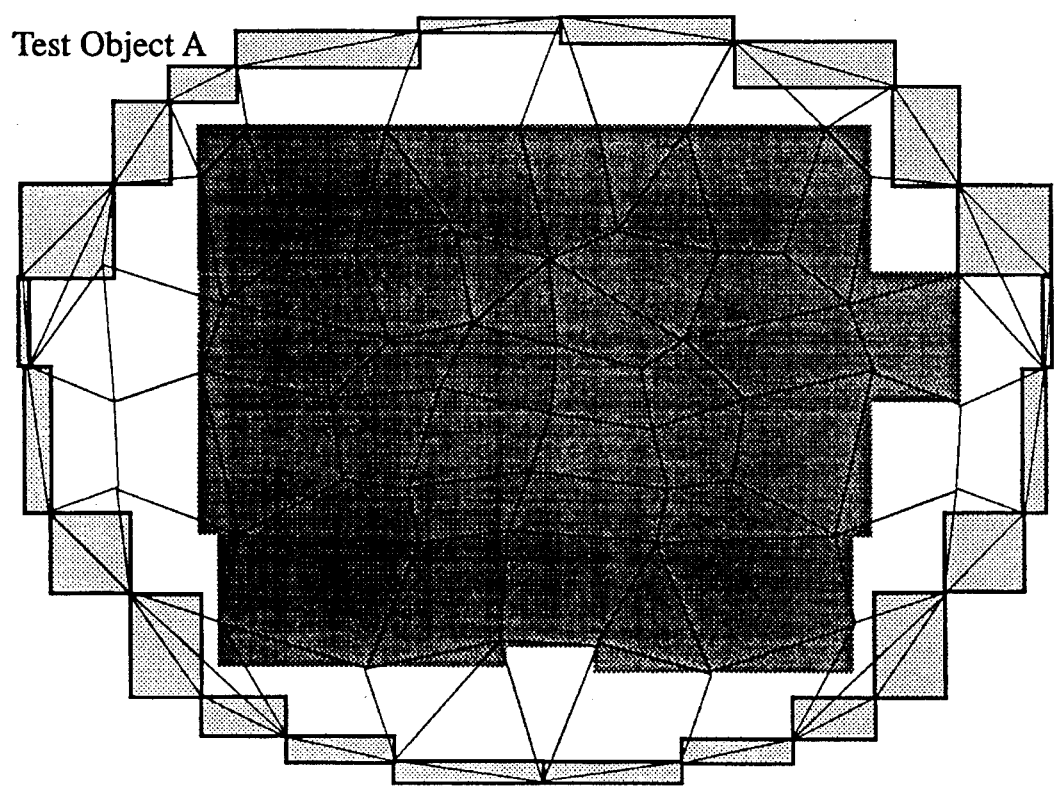
Figure 24:
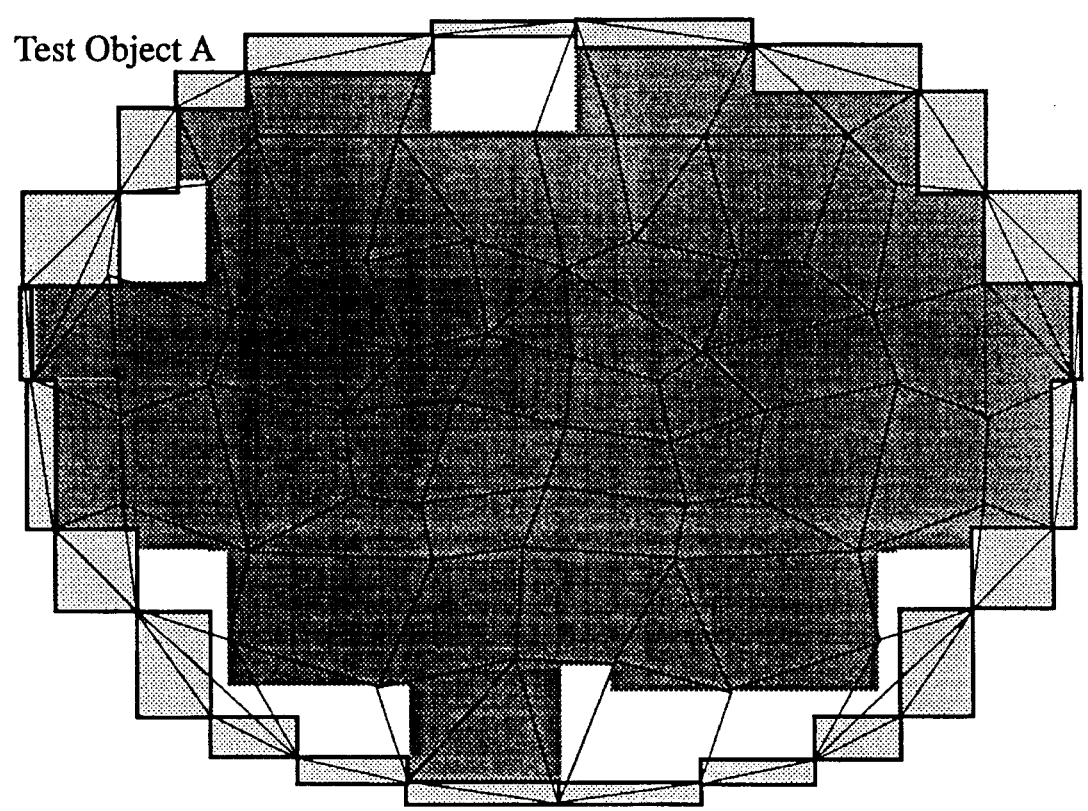
Figure 25:
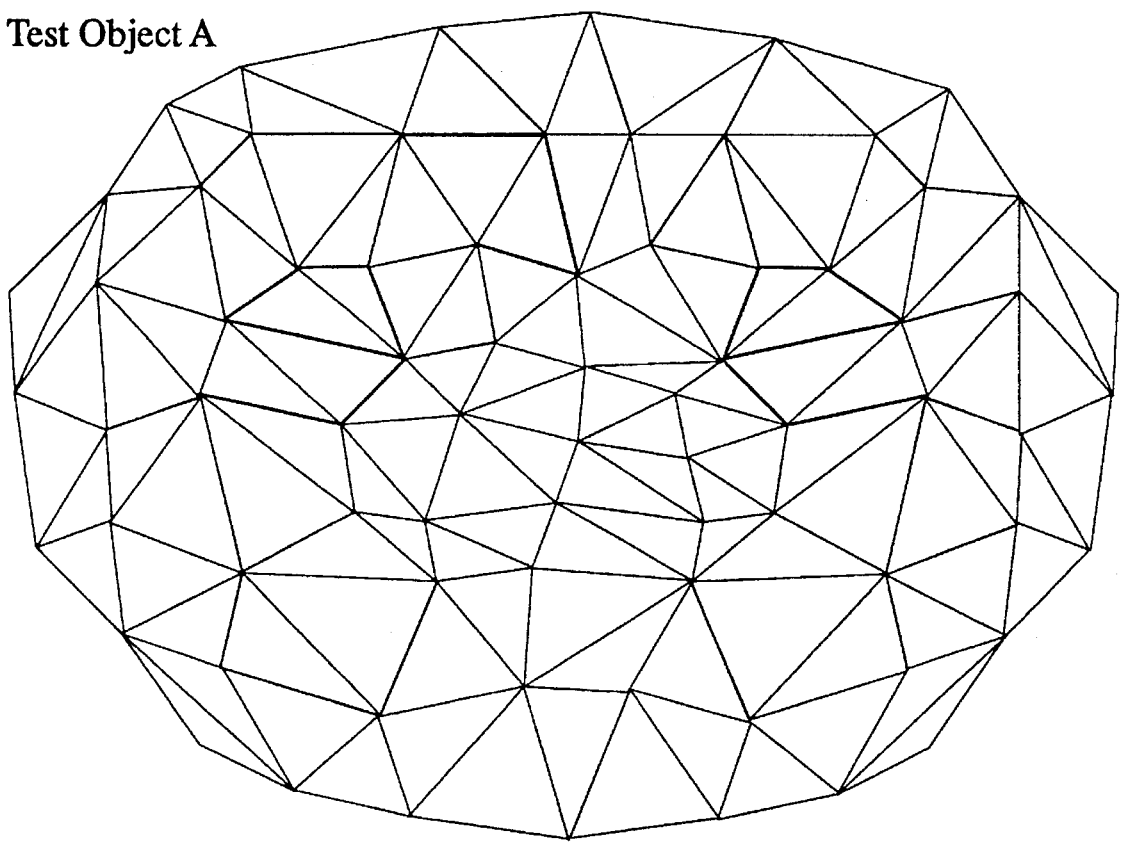

The Interior Region resulting from definition 1 for the object of FIG. 13 is illustrated in FIG. 22, assuming that the Exterior Region is defined by the set of Bounding Boxes that contain all those polygon edges that make up the perimeter of the object. The Interior Region resulting from definition 2 is illustrated in FIG. 23. The Interior Region resulting from definition 3 is illustrated in FIG. 24. Consider the object illustrated in FIG. 25 which is composed of planar triangles.

Figure 26:
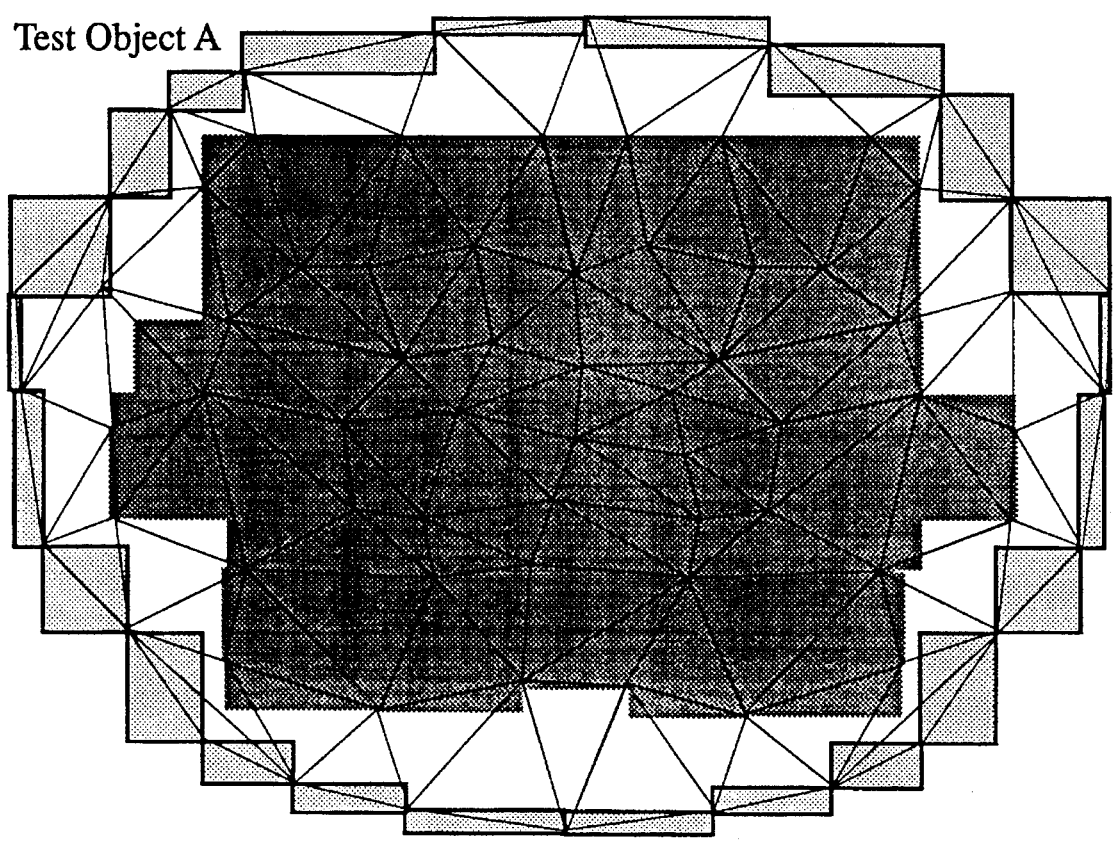
Figure 27:
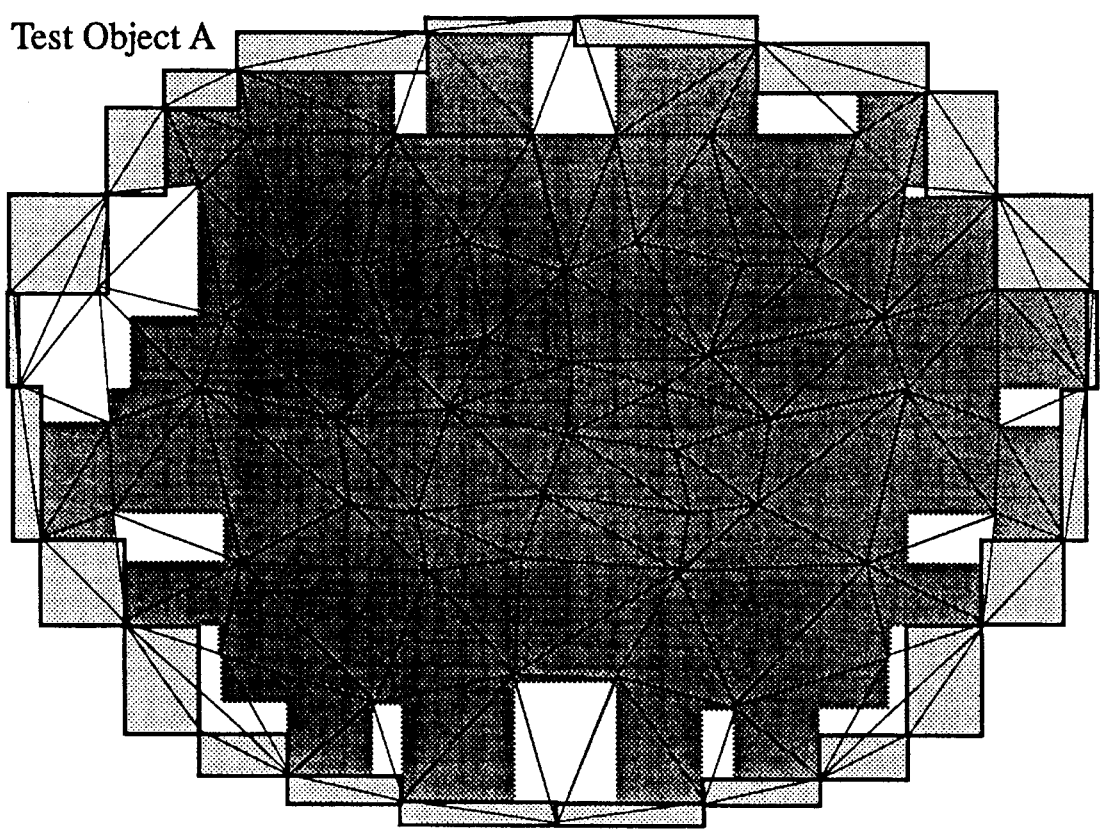
Figure 28:
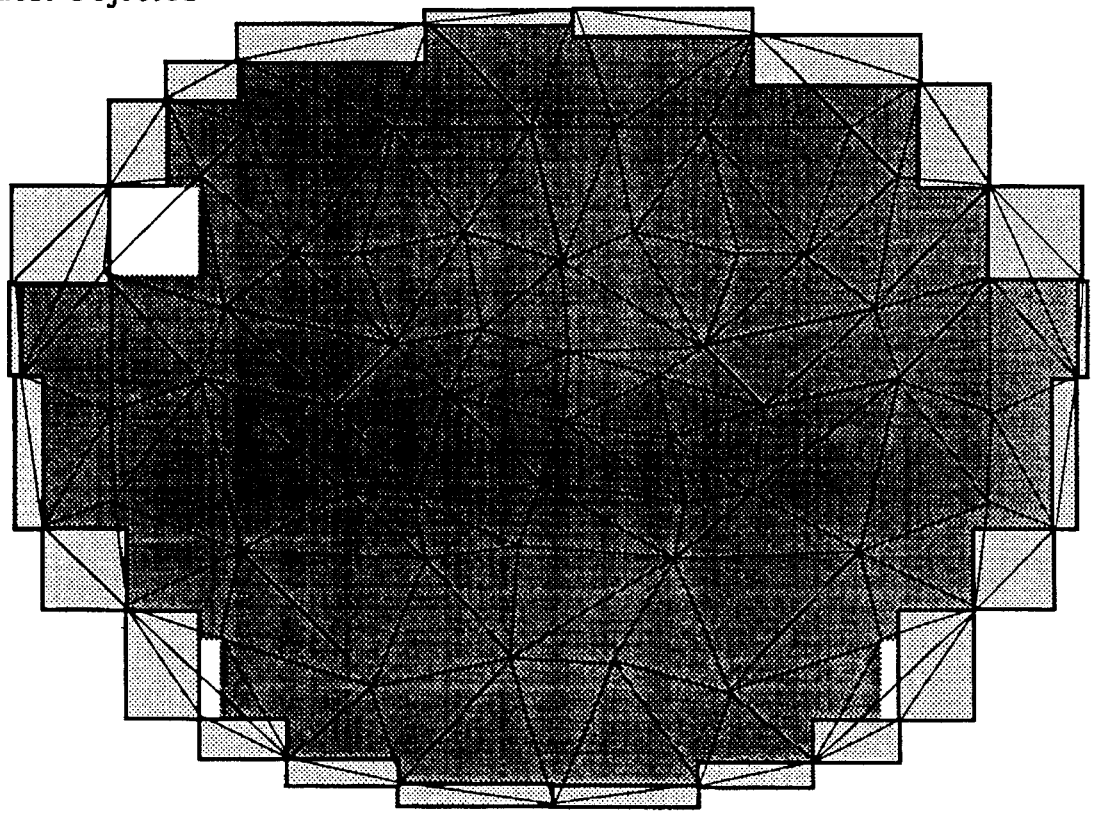

The Interior Region resulting from definition 4 for this object is illustrated in FIG. 26, assuming that the Exterior Region is defined by the set of Bounding Boxes that contain all those polygon edges that make up the perimeter of the object. The Interior Region resulting from definition 5 for this object is illustrated in FIG. 27. The Interior Region resulting from definition 6 for this object is illustrated in FIG. 28.

Test object uncommitted regions: Ambiguous or Exterior

If the Bounding Boxes of polygons are used to define the Interior Region of the Test Object (as is the case of definitions 1, 2 and 3), there may be some polygons that are part of the Test Object but whose Bounding Boxes are neither part of the Exterior Region nor part of the Interior Region. Similarly, if the Bounding Boxes of polygon edges are used to define the Interior Region of the Test Object (as is the case of definitions 4, 5 and 6), there may be some polygon edges that are part of the Test Object but whose Bounding Boxes are neither part of the Exterior Region nor part of the Interior Region. These unclassified Bounding Boxes may be categorized as Ambiguous, and they may be ignored for purposes of determining whether the Test Object completely occults the Test Polygon. Another alternative is to reclassify the previously mentioned Bounding Boxes as part of the Exterior Region. The latter alternative is less desirable because it degrades the performance of the occultation detection invention.

The concept of an Ambiguous Region is significant because it enhances performance. Any edge or polygon whose Bounding Box possesses points outside the perimeter of the Exterior Region cannot be classified as Interior, because this could cause a non-occulted polygon to be classified by the invention as occulted. Any such polygon or edge could be classified as Exterior, but the larger the Exterior Region area, the worse the performance of the invention. Therefore the classification of Ambiguous prevents incorrect occultation classifications without sacrificing performance.

It is possible to sort and classify Interior and Ambiguous Regions concurrently. This is illustrated in box 315 of FIG. 16, FIG. 17 and FIG. 18, and in box 316 of FIG. 19, FIG. 20, and FIG. 21.

DETAILED DESCRIPTION OF THE INVENTION

Implementing classification of object regions

Figure 29:
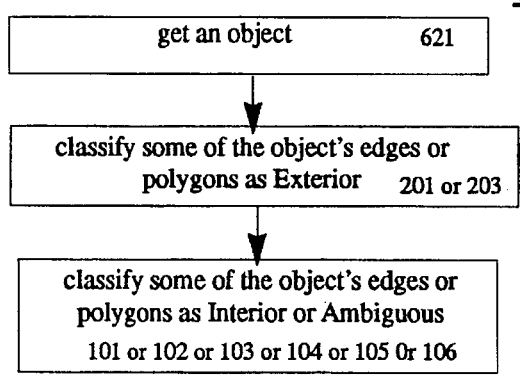

A flowchart that shows a possible implementation of the complete classification of the Exterior Region 201 or 203, Interior Region and Ambiguous Region 101 or 102 or 103 or 104 or 105 or 106 is shown in FIG. 29. Other implementations are possible.

Implementation of the invention for a single Test Object and a single Test Polygon when the Test Polygon is represented by a single Bounding Box that contains it.

Figure 30:
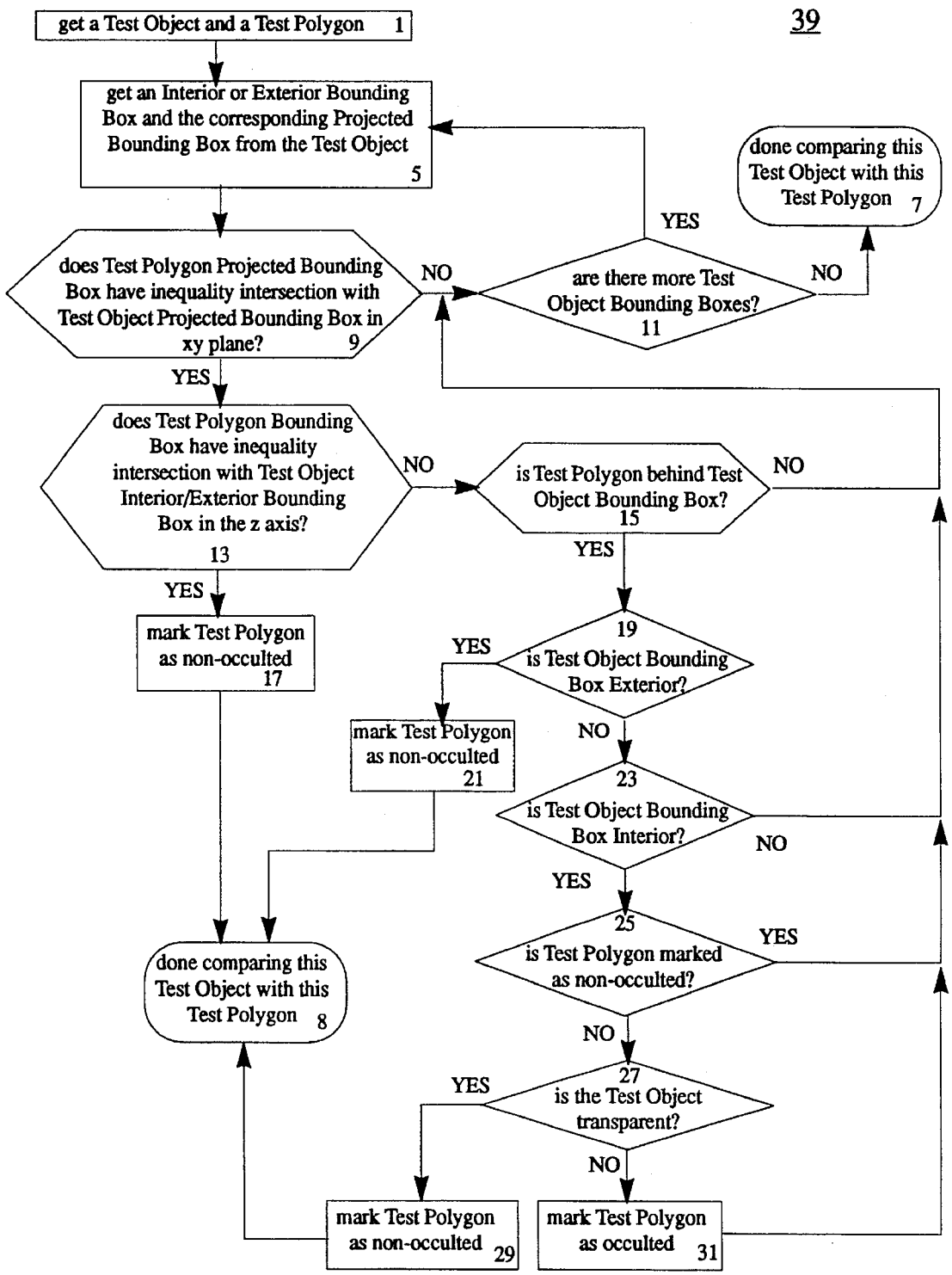

A flowchart that shows an implementation of the invention for determining if a Test Object completely occults a Test Polygon is shown in FIG. 30 for the case that the Test Polygon is represented by a single Bounding Box that contains it. Other implementations are also possible. This figure shows one of many possible implementations. The flowchart cycles through a loop, obtaining a Bounding Box and the corresponding Projected Bounding Box that is part of either the Interior or Exterior Region of the Test Object 5. Note that the Test Object Bounding Box could be either a Test Object Polygon Bounding Box or a Test Edge Augmented Bounding Box depending on how the Exterior and Interior Regions are defined. The flowchart compares the Test Polygon's Projected Bounding Box with the current Test Object Projected Bounding Box. If an intersection exists in the xy viewing plane 9, then a test is performed to determine whether the Test Polygon's Bounding Box also intersects the current Test Object Bounding Box in the z (depth) axis 13 or whether the Test Polygon is behind or in front of the Test Object Bounding Box 15. If there are intersections in both the xy viewing plane and the z axis, the Test Polygon is marked as non-occulted 21. If the Test Object Bounding Box is behind an Exterior Region Bounding Box from the Test Object 19, then the Test Polygon is marked as non-occulted 21. If the Test Object Bounding Box is behind an Interior Region Bounding Box from the Test Object 23 and the Test Polygon has not yet been marked as non-occulted 25 and the Test Object is not transparent 27 then the Test Polygon is marked as occulted 31. If the Test Object is transparent, then the Test Polygon is marked as non-occulted 29. The process of comparing Bounding Boxes from the Test Object's Interior and Exterior Regions with the Test Polygon Bounding Box until either the Test Polygon is found to be non-occulted 8 or there are no more Test Object Bounding Boxes left 7. The Test Polygon is completely occulted by the Test Object if it is only marked as occulted at the end of processing. The Test Object cannot be said to completely occult the Test Polygon if it is unmarked or marked as non-occulted.

Figure 31:
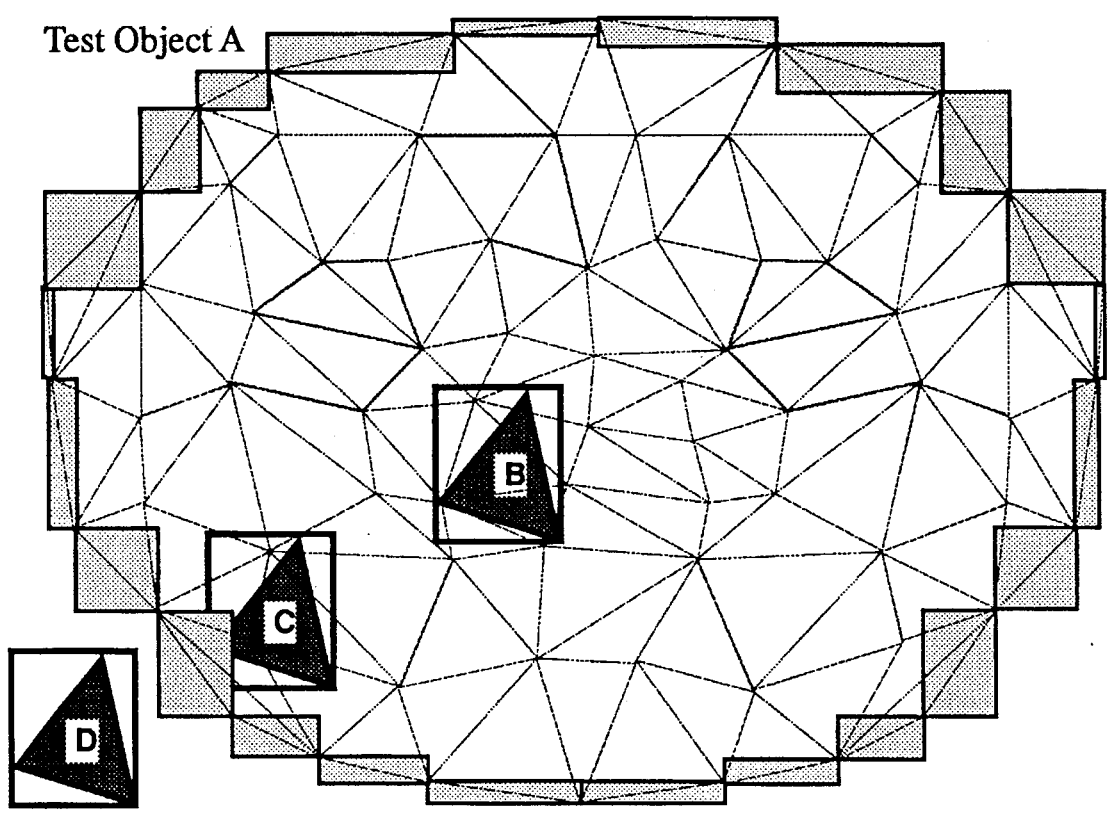

The operation of this implementation of the invention is illustrated in FIG. 31 for a perspective projected Test Object, designated Test Object A and three perspective projected planar Test Polygons, designated polygon B, polygon C and polygon D. In this example polygons B, C and D are assumed to be more distant from the observer than any of the polygons of Test Object A in eye coordinate space. The Projected Bounding Box of polygon B intersects with several of the Projected Bounding Boxes of Test Object A's Interior Region and none of the Projected Bounding Boxes of Test Object A's Exterior Region, so polygon B is totally occulted and need not be rendered. The Projected Bounding Box of polygon C intersects with several of the Projected Bounding Boxes of Test Object A's Interior Region and also some of the Projected Bounding Boxes of Test Object A's Exterior Region, so although polygon C is totally occulted, the occultation cannot be detected by this invention. The Projected Bounding Box of polygon D intersects with none of the Projected Bounding Boxes of any of Test Object A's Interior or Exterior Regions, so polygon D is not occulted and must be rendered.

Figure 32:
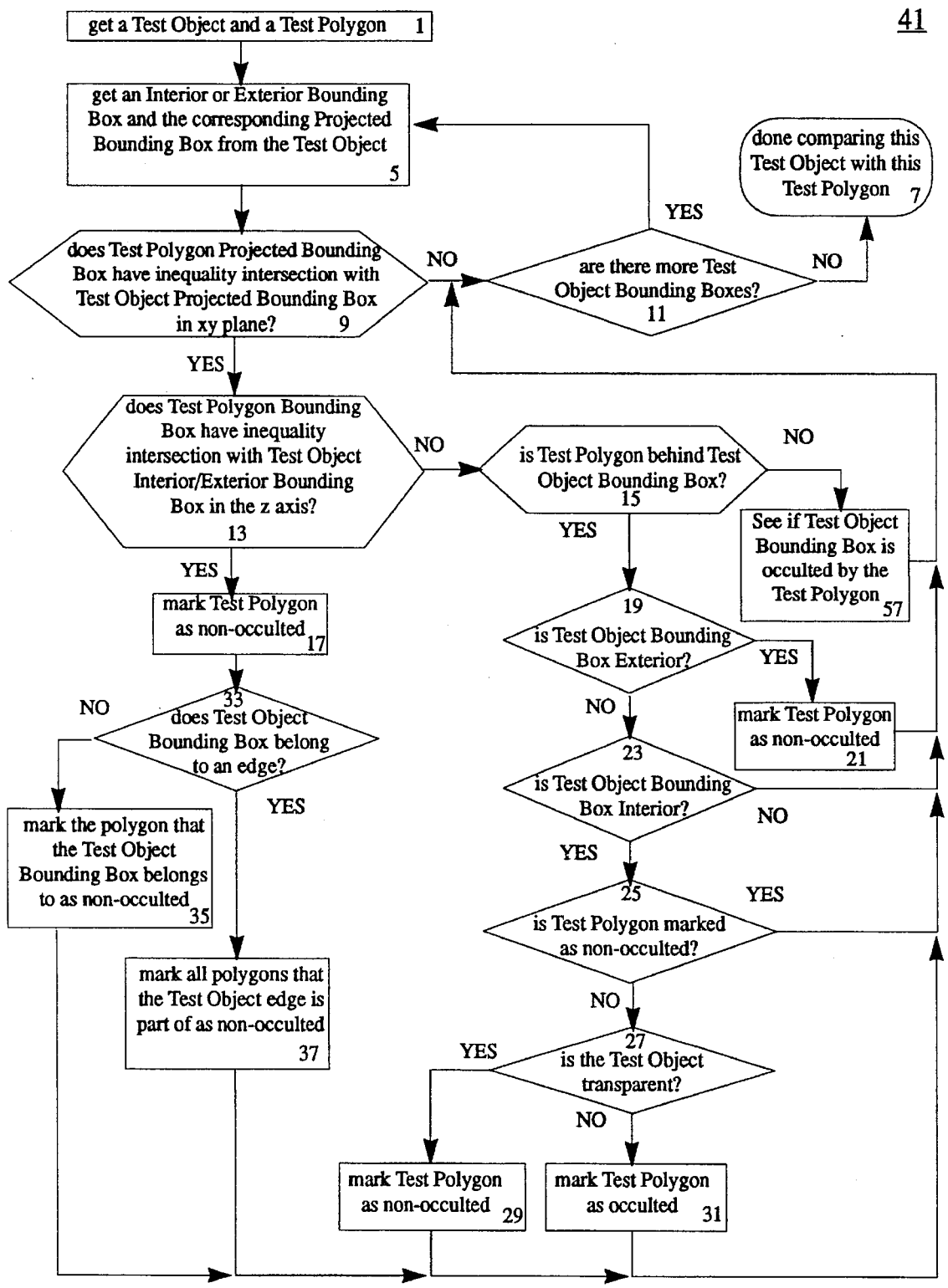
Figure 33:
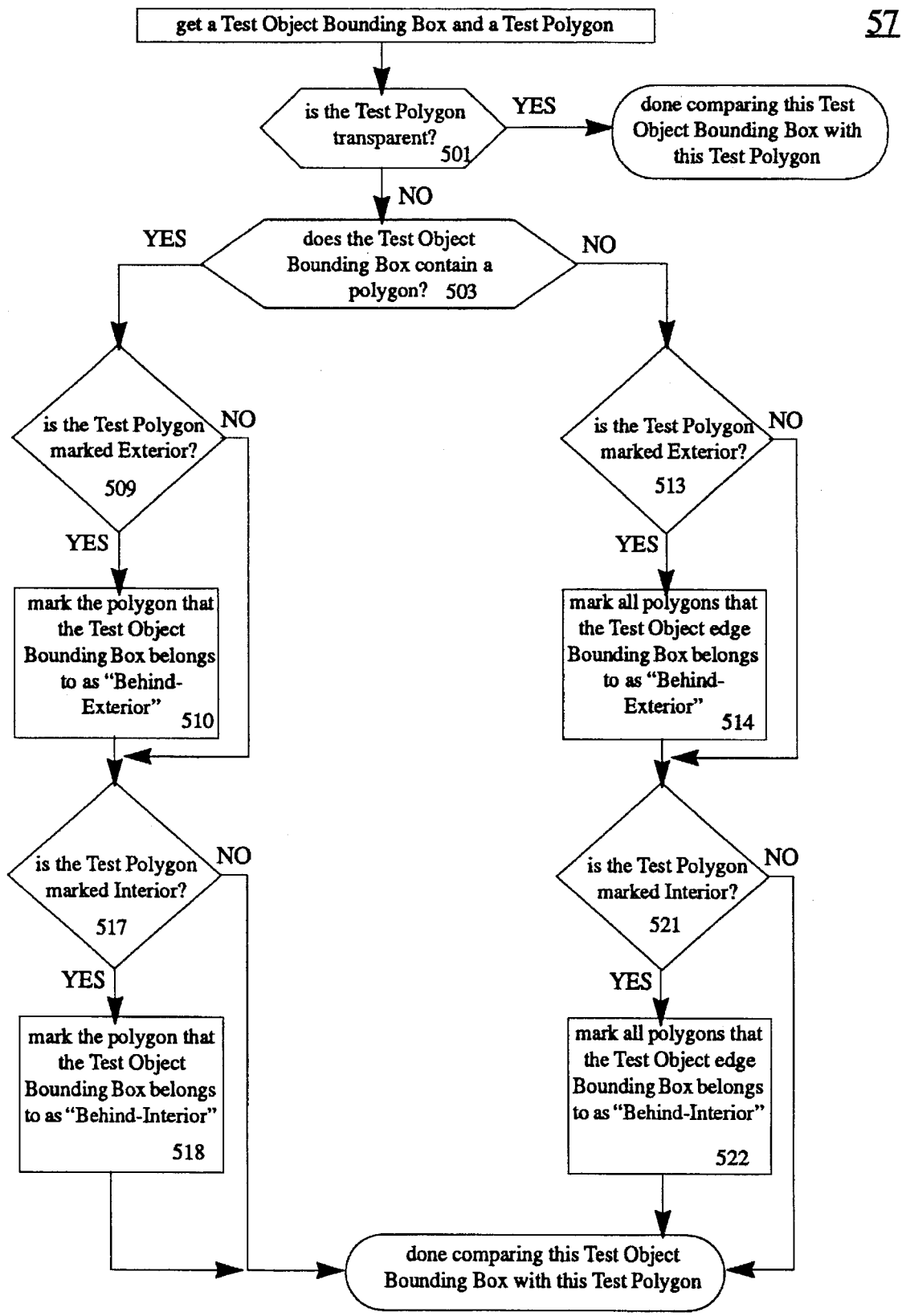

Implementation of the invention for a single Test Object and a single Test Polygon when the Test Polygon is part of another object and is represented by a single Bounding Box that contains it It is possible that the Test Polygon is part of another object that may occult some of the Test Object's polygons. In this case it is convenient to not only test for occultation of the Test Polygon by the Test Object, but also to test for possible occulation of the Test Object's polygons by the object that the Test Polygon is a part of. This is accomplished by marking not only the Test Polygon as occulted or non-occulted but also the Test Object Bounding Boxes when they are behind the Test Polygon as Behind-Interior (if the Test Polygon is from the Interior Region of its object) or Behind-Exterior (if the Test Polygon is from the Exterior Region of its object). After all of the Test Polygons from a new object have been compared to the Test Object for possible occultation, the polygons of the Test Object are marked such that the polygons that are occulted by the new object can be identified. Any polygon from the Test Object that is marked Behind-Interior but not Behind-Exterior is completely occulted by the new object from which the Test Polygons came. Any polygon from the Test Object that is unmarked or marked Behind-Exterior is not occulted. An implementation of the invention is shown in flowchart form in FIG. 32 and FIG. 33. These figures show one of many possible implementations.

The embodiment of the invention shown here cycles through a loop, obtaining a Bounding Box and the corresponding Projected Bounding Box that is part of either the Interior or Exterior Region of the Test Object 5. Note that the Test Object Bounding Box could be either a Test Object Polygon Bounding Box or a Test Object Edge Augmented Bounding Box depending on how the Exterior and Interior Regions are defined. Note also that a Test Object Bounding Box associated with a polygon edge is associated with all polygons that share that edge, whereas a Test Object Bounding Box that contains a polygon is associated with that polygon only. The Test Polygon's Projected Bounding Box is compared with the current Test Object Projected Bounding Box. If an intersection exists in the xy viewing plane 9, then the flowchart tests whether there is also an intersection in the z (depth) axis between the Test Polygon's Bounding Box and the current Test Object Bounding Box 13. If the Test Polygon Bounding Box has intersections in both the xy viewing plane and the z axis, the Test Polygon is marked as non-occulted 17 and any polygon 35 or polygons 37 that the current Test Object Bounding Box is associated with are marked as non-occulted.

If the Test Polygon Bounding Box is in front of the Test Object Bounding Box 15, then the flowchart determines if the polygon(s) associated with the Test Object Bounding Box might be occulted by the new object that the Test Polygon is part of 57. Assuming the Test Polygon is not transparent 501, then there are four possibilities depending on whether the Test Object Bounding Box is associated with a polygon or an edge 503 and whether the Test Polygon Bounding Box is Interior 517, 521 or Exterior 509, 513. In the case that the Test Polygon Bounding Box is Interior, the polygon(s) that the Test Object Bounding Box is associated with is marked "behind Interior" 518, 522. In the case that the Test Polygon Bounding Box is Exterior, the polygon(s) that the Test Object Bounding Box is associated with is marked "behind Exterior" 510, 514.

If the Test Polygon Bounding Box is behind an Exterior Region Bounding Box from the Test Object 19, then the Test Polygon is marked as non-occulted 21. If the Test Object Bounding Box is behind an Interior Region Bounding Box from the Test Object 23 and the Test Polygon has not yet been marked as non-occulted 25 and the Test Object is not transparent 27 then the Test Polygon is marked as occulted 31. If the Test Object is transparent, then the Test Polygon is marked as non-occulted 29. Bounding Boxes from the Test Object's Interior and Exterior Regions are compared with the Test Polygon Bounding Box until there are no more Test Object Bounding Boxes left 7. The Test Polygon is completely occulted by the Test Object if it is only marked as occulted at the end of processing. The Test Object cannot be said to completely occult the Test Polygon if it is unmarked or marked as non-occulted.

Figure 34:
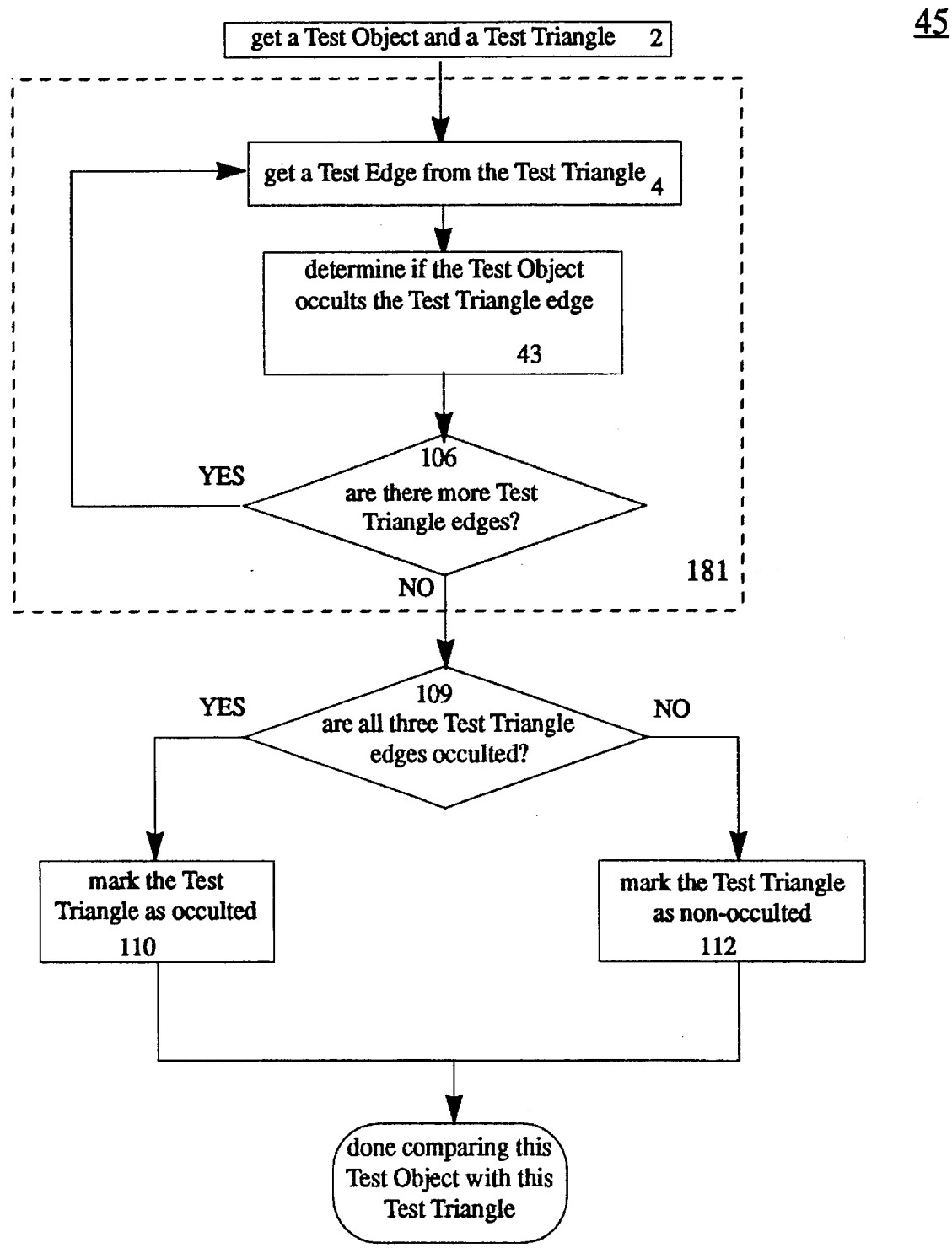
Figure 35:
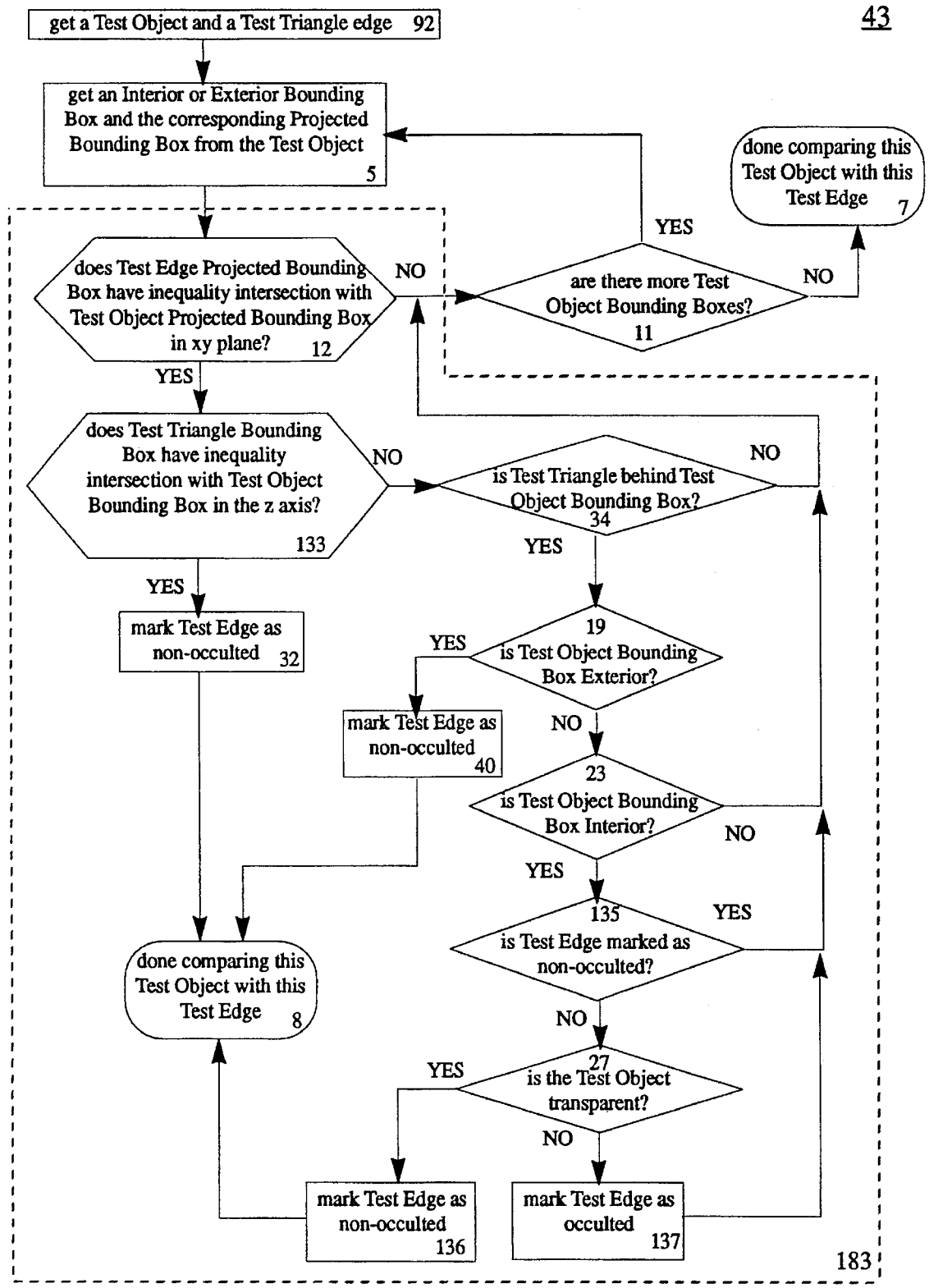

Implementation of the invention for a single Test Object and a single Test Triangle when the Test Triangle is represented by three Bounding Boxes that contain it's three edges A flowchart that shows an implementation of the invention for determining if a Test Object completely occults a Test Triangle is shown in FIG. 34 and FIG. 35 for the case that the Test Triangle is represented by a three Bounding Box that contains it's three edges. These figures show one of many possible implementations.

Figure 36:
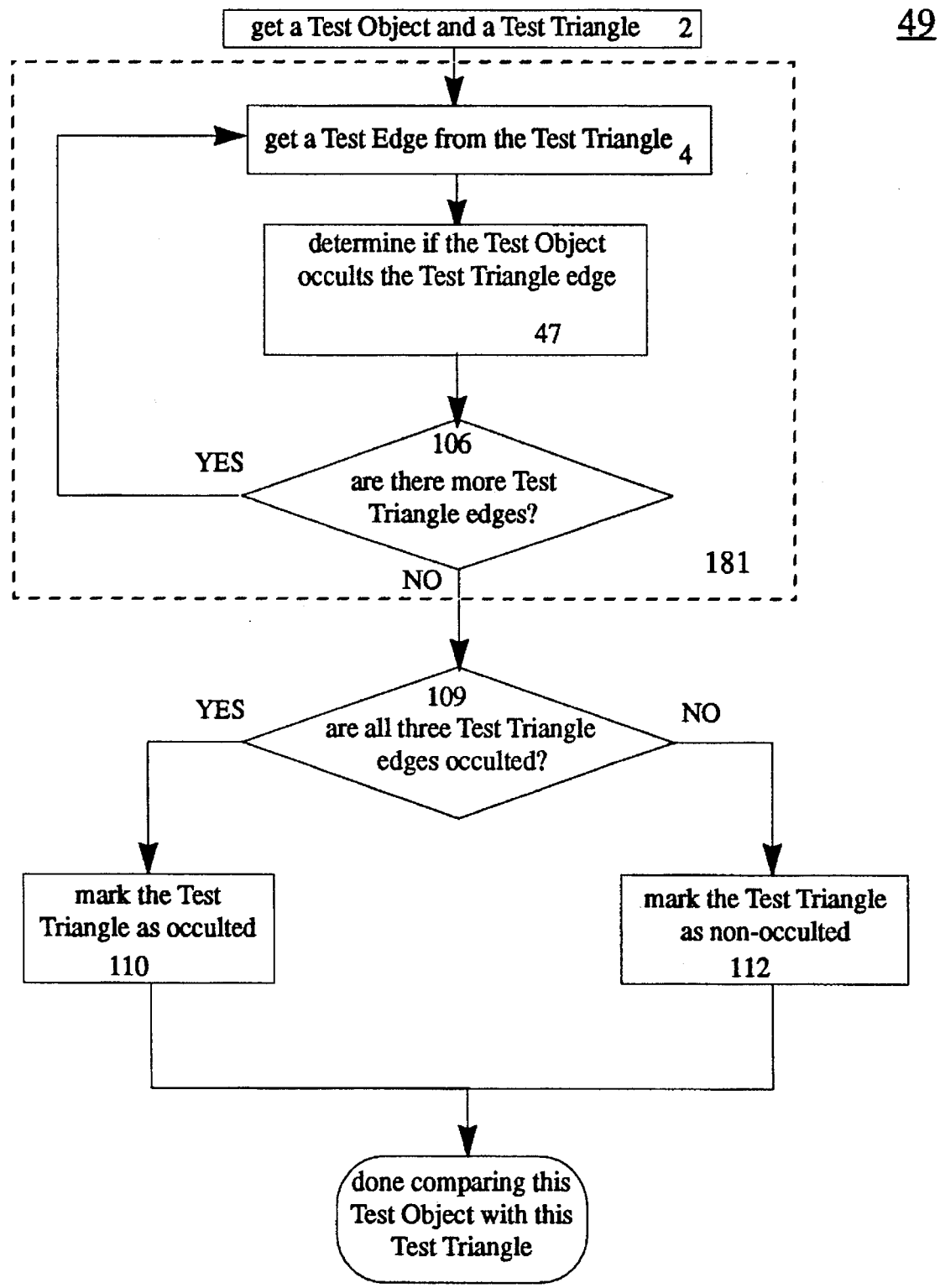
Figure 37:
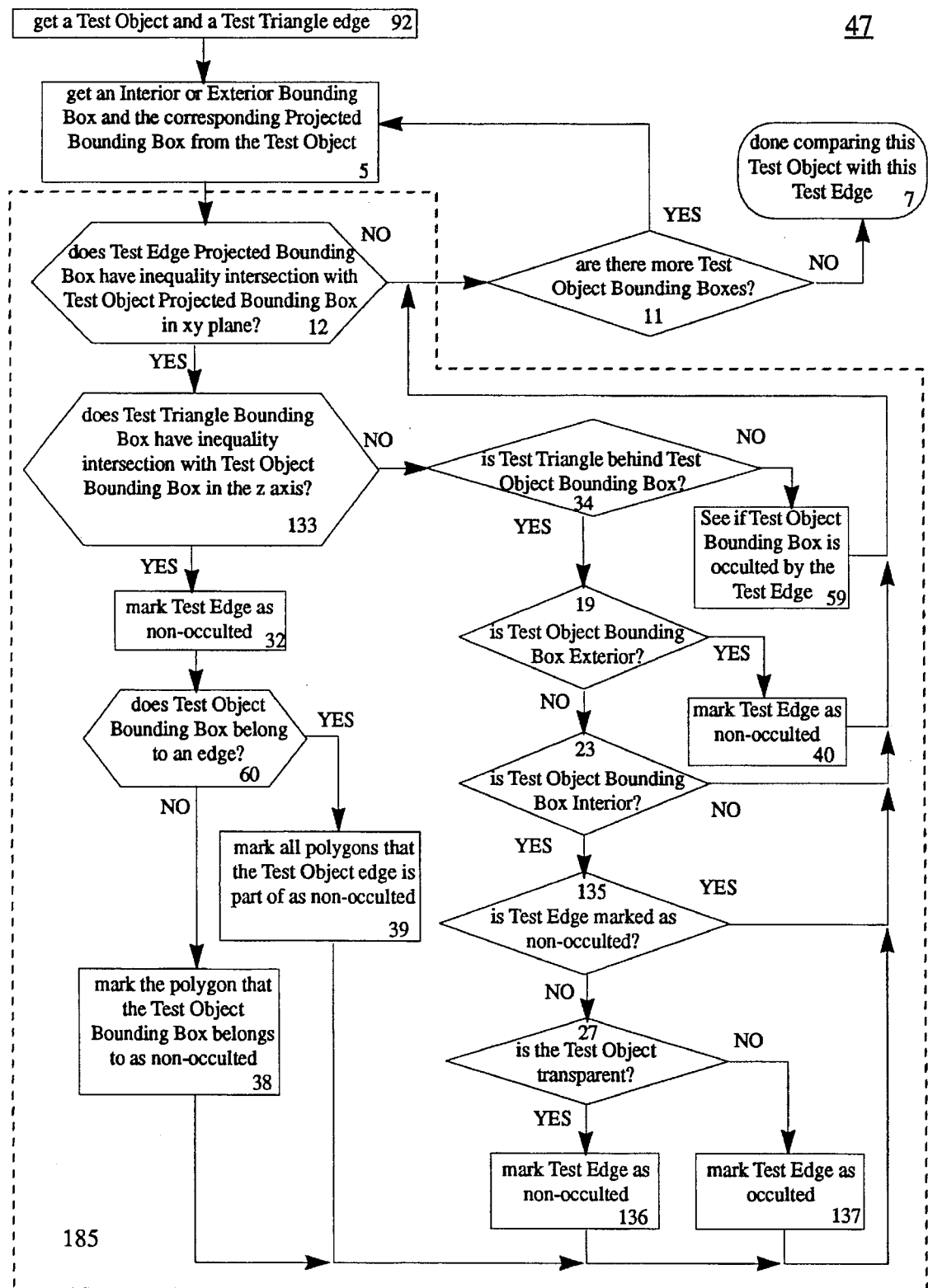
Figure 38:
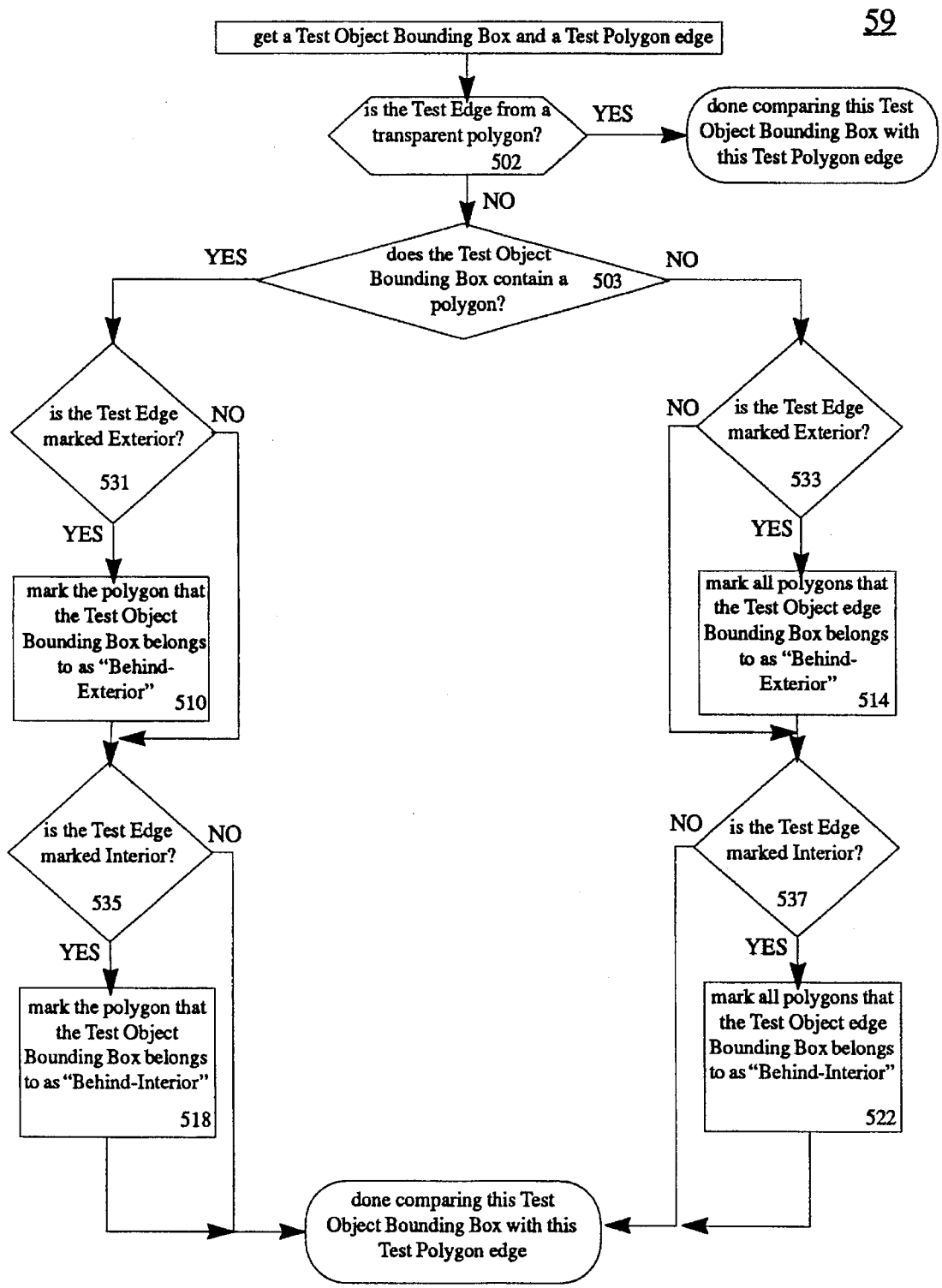

This embodiment of the invention performs three cycles through a loop 181, each cycle corresponding to one of the Test Triangle edges. During each cycle of the loop, a new Test Triangle edge is obtained 4 and a determination is made as to whether the Test Object occults the edge 43. An inner loop 183 obtains a new Test Object Bounding Box (which is part of either the Interior or Exterior Region of the Test Object) and the corresponding Projected Bounding Box each cycle 5. Note that the Test Object Bounding Box could be either a Test Object Polygon Bounding Box or a Test Object Edge Augmented Bounding Box depending on how the Exterior and Interior Regions are defined. A comparison is made between the Test Triangle edge's Projected Bounding Box and the current Test Object Projected Bounding Box. If an intersection exists in the xy viewing plane 12, then a test is performed to determine whether there is also an intersection between the Test Triangle Bounding Box and the current Test Object Bounding Box in the z (depth) axis 133 or whether the Test Triangle is behind or in front of the Test Object Bounding Box 34. If the polygon Bounding Box intersects the current Test Object Bounding Box in both the xy viewing plane and the z axis, the Test Triangle edge is marked as non-occulted 32. If the Test Triangle edge Bounding Box is behind an Exterior Region Bounding Box from the Test Object 19, then the Test Triangle edge is marked as non-occulted 40. If the Test Object Bounding Box is behind an Interior Region Bounding Box from the Test Object 23 and the Test Triangle edge has not yet been marked as non-occulted 135 and the Test Object is not transparent 27 then the Test Triangle edge is marked as occulted 137. If the Test Object is transparent, then the Test Triangle edge is marked as non-occulted 136. Bounding Boxes from the Test Object's Interior and Exterior Regions are compared with the Test Triangle edge Bounding Box until either the Test Triangle edge is found to be non-occulted 8 or there are no more Test Object Bounding Boxes left 7. The Test Triangle edge is completely occulted by the Test Object if it is only marked as occulted at the end of processing. The Test Object cannot be said to completely occult the Test Triangle edge if it is unmarked or marked as non-occulted. The flowchart examines whether all three Test Triangle edges are occulted 109. If so, then the Test Triangle is marked as occulted 110. Otherwise, the Test Triangle is marked as non-occulted 112. Implementation of the invention for a single Test Object and a single Test Triangle when the Test Triangle is part of another object and is represented by three Bounding Boxes that contain it's three edges It is possible that the Test Triangle is part of another object that may occult some of the Test Object's polygons. In this case it is convenient to not only test for occultation of the Test Triangle by the Test Object, but also to test for possible occultation of the Test Object's polygons by the object that the Test Triangle is a part of. This is accomplished by marking not only the Test Triangle as occulted or non-occulted but also the Test Object Bounding Boxes when they are behind the Test Triangle as Behind-Interior (if the Test Triangle edge is from the Interior Region of its object) or Behind-Exterior (if the Test Triangle edge is from the Exterior Region of its object). After all of the Test Triangles from a new object have been compared to the Test Object for possible occultation, the polygons of the Test Object are marked such that the polygons that are occulted by the new object can be identified. Any polygon from the Test Object that is marked Behind-Interior but not Behind-Exterior is completely occulted by the new object from which the Test Triangles came. Any polygon from the Test Object that is unmarked or marked Behind-Exterior is not occulted. This implementation of the invention is shown in flowchart form in FIG. 36, FIG. 37 and FIG. 38. These figures show one of many possible implementations.

This embodiment of the invention performs three cycles through a loop 181, each cycle corresponding to one of the Test Triangle edges. During each cycle of the loop, a new Test Triangle edge is obtained 4 and a determination is made as to whether the Test Object occults the edge 47. An inner loop 185 obtains a new Test Object Bounding Box (which is part of either the Interior or Exterior Region of the Test Object) and the corresponding Projected Bounding Box during each cycle 5. Note that the Test Object Bounding Box could be either a Test Object Polygon Bounding Box or a Test Object Edge Augmented Bounding Box depending on how the Exterior and Interior Regions are defined. Note also that a Test Object Bounding Box associated with a polygon edge is associated with all polygons that share that edge, whereas a Test Object Bounding Box that contains a polygon is associated with that polygon only. The Test Triangle edge's Projected Bounding Box and is compared with the current Test Object Projected Bounding Box. If an intersection exists in the xy viewing plane 12, then a test is performed which determines whether there is also an intersection between Test Triangle Bounding Box and the current Test Object Bounding Box in the z (depth) axis 133. If the Test Triangle Bounding Box and the current Test Object Bounding Box intersect in both the xy viewing plane and the z axis, the Test Triangle edge is marked as non-occulted 32 and any polygon 38 or polygons 39 that the current Test Object Bounding Box is associated with are marked as non-occulted.

If the Test Triangle Bounding Box is in front of the Test Object Bounding Box 34, then it must be determined if the polygon(s) associated with the Test Object Bounding Box might be occulted by the new object that the Test Triangle is part of 59. Assuming the Test Triangle is not transparent 502, then there are four possibilities depending on whether the Test Object Bounding Box is associated with a polygon or an edge 503, and whether the Test Triangle edge Bounding Box is Interior 535, 537 or Exterior 531, 533. In the case that the Test Triangle edge Bounding Box is Interior, the polygon(s) that the Test Object Bounding Box is associated with is marked "behind Interior" 518, 522. In the case that the Test Triangle edge Bounding Box is Exterior, the polygon(s) that the Test Object Bounding Box is associated with is marked "behind Exterior" 510, 514.

If the Test Triangle edge Bounding Box is behind an Exterior Region Bounding Box from the Test Object 19, then the Test Triangle edge is marked as non-occulted 40. If the Test Object Bounding Box is behind an Interior Region Bounding Box from the Test Object 23 and the Test Triangle edge has not yet been marked as non-occulted 135 and the Test Object is not transparent 27 then the Test Triangle edge is marked as occulted 137. If the Test Object is transparent, then the Test Triangle edge is marked as non-occulted 136. The process of comparing Bounding Boxes from the Test Object's Interior and Exterior Regions with the Test Triangle edge Bounding Box until there are no more Test Object Bounding Boxes left 7. The Test Triangle edge is completely occulted by the Test Object if it is only marked as occulted at the end of processing. The Test Object cannot be said to completely occult the Test Triangle edge if it is unmarked or marked as non-occulted. All three Test Triangle edges are examined for to see if they are occulted 109. If so, then the Test Triangle is marked as occulted 110. Otherwise, the Test Triangle is marked as non-occulted 112.

Figure 39:
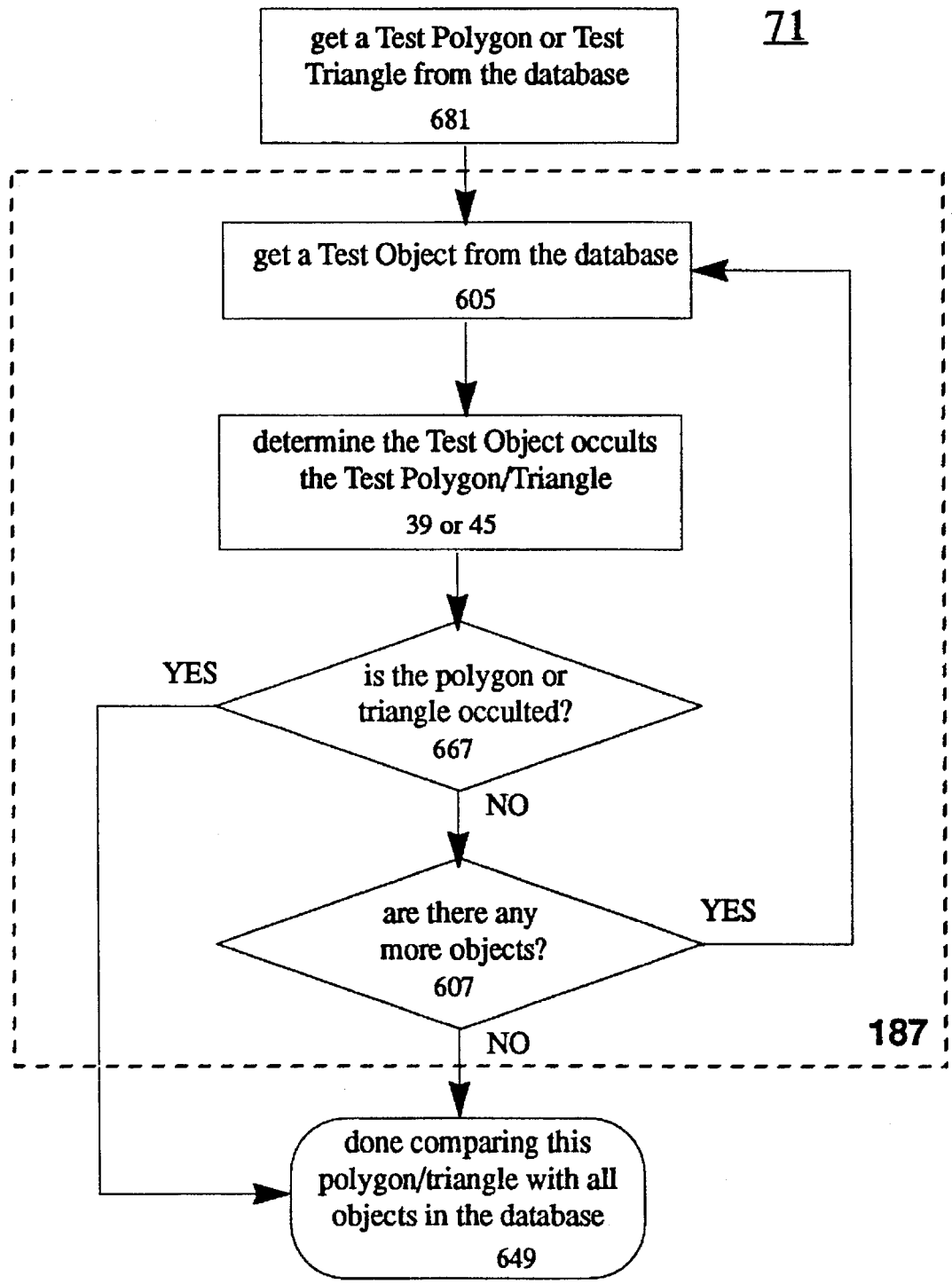

Determining if a Test Polygon or Test Triangle is occulted by any object in a database An implementation of the invention that compares a Test Polygon or Test Triangle with objects in a database to see if any of the objects occult the Test Polygon or Test Triangle is illustrated in FIG. 39. Other implementations are also possible. This embodiment of the invention cycles through a loop 187 that examines each object in the database to see if it occults The Test Polygon 39 or Test Triangle 45. If at any time the Test Polygon or Test Triangle is occulted, then the process is complete 649. Otherwise the process continues until all objects in the database have been examined 607.

Figure 40:
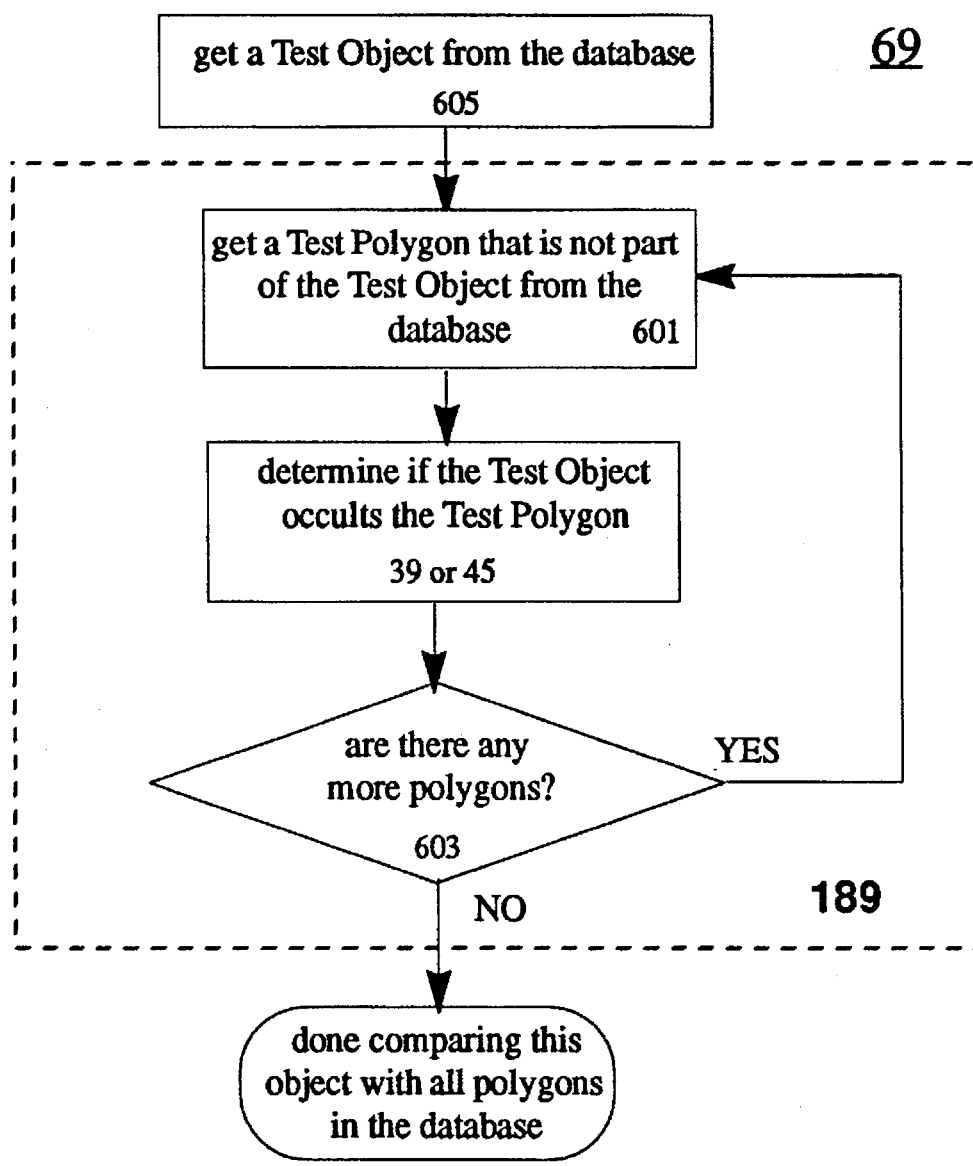

Determining if a Test Object occults polygons from any other objects in a database An implementation of the invention that compares a Test Object from a database to the other objects in the database to determine which polygons from the other objects are occulted by the Test Object is shown in FIG. 40. Other implementations are also possible. This embodiment of the invention cycles through a loop 189; for each cycle, a Test Polygon 39 or Test Triangle 45 from another object in the database is examined to determine whether the Test Polygon or Test Triangle is occulted by the Test Object. A Test Polygon or Test Triangle is completely occulted if it is only marked as occulted at the end of processing. A Test Polygon or Test Triangle cannot be said to be completely occulted if it is unmarked or marked as non-occulted.

Figure 41:
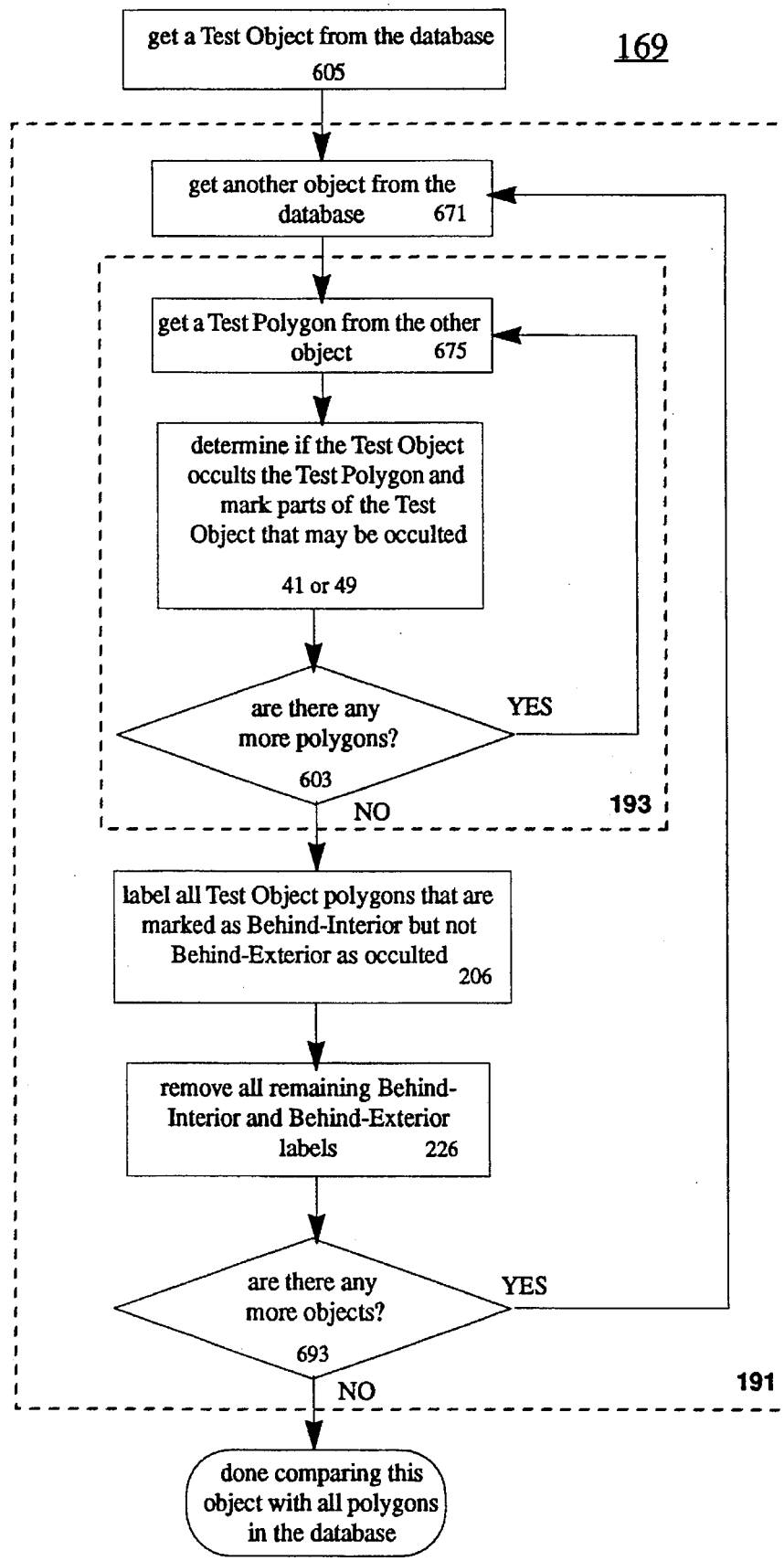

Determining if a Test Object occults polygons from other objects in a database and whether any of the Test Object's polygons are occulted by the other objects An implementation of the invention that compares a Test Object from a database to all other objects in the database to determine which polygons from the other objects are occulted by the Test Object and which polygons of the Test object are occulted by the other objects is shown in FIG. 41. Other implementations are also possible. This embodiment of the invention cycles through a loop 191; for each cycle, an object (other than the Test Object) is selected from the database. There is also an inner nested loop 193; for each cycle of the inner loop a Test Polygon 41 or Test Triangle 49 from the current object is examined to determine whether the Test Polygon or Test Triangle is occulted by the Test Object and whether the current object might occult some of the polygons of the Test Object. At the conclusion of the inner loop, all those Test Object polygons have been labeled Behind-Interior but not Behind-Exterior are labeled as occulted 206 and all Behind-Interior and Behind-Exterior labels are removed 226 in preparation for the next object to be compared to the Test Object by the outer loop. The process is complete when the outer loop finishes examining the last object in the database. A Test Polygon or Test Triangle is completely occulted if it is only marked as occulted at the end of processing. A Test Polygon or Test Triangle cannot be said to be completely occulted if it is unmarked or marked as non-occulted.

Figure 42:
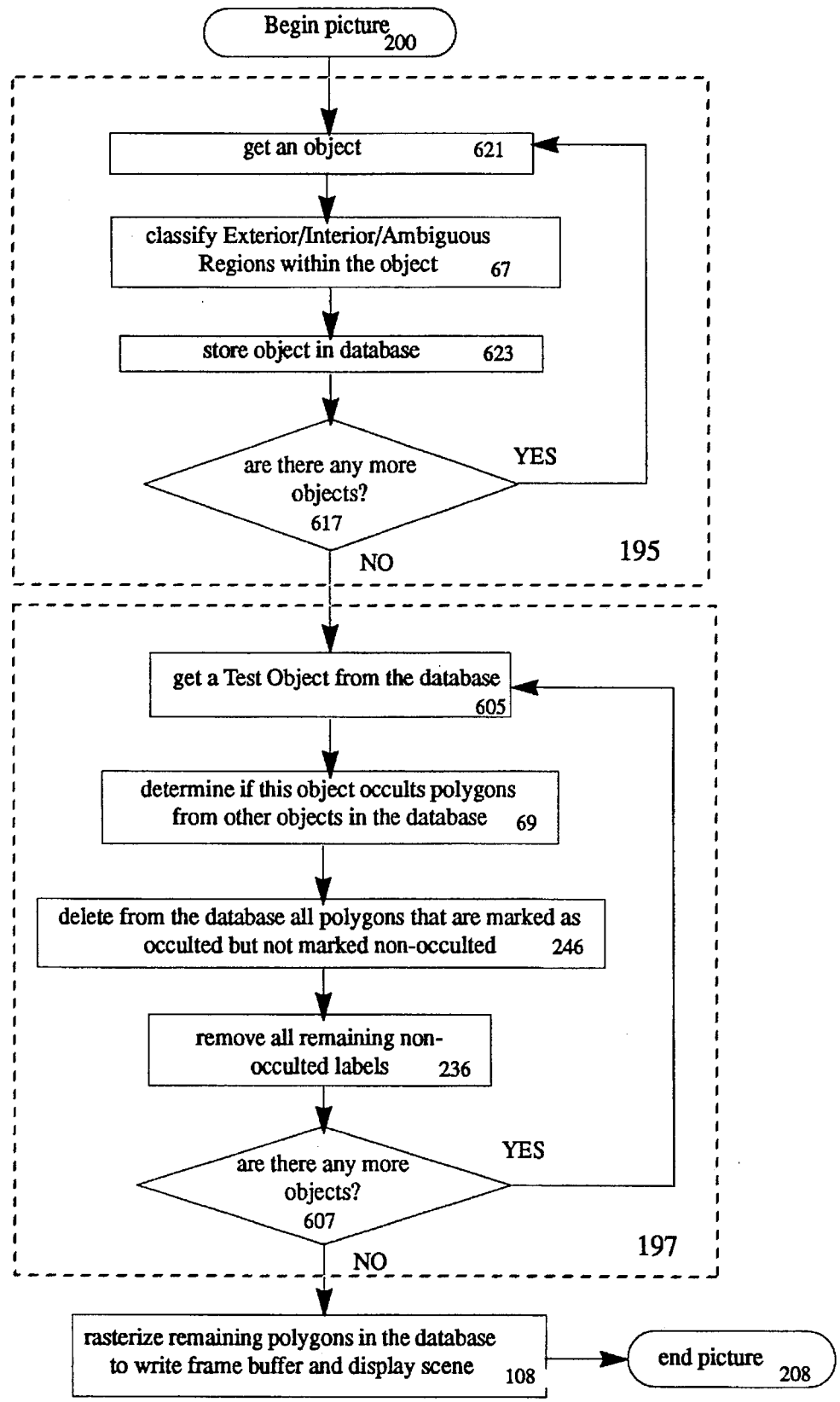

Finding and deleting occulted polygons from all objects in a database by unidirectional Test Object/Test Polygon comparison Given a database of objects composed of planar polygons, the invention can be used to detect and delete occulted polygons in the database through a unidirectional comparison of each object with the polygons of all other objects in the database. The number of comparisons required is proportional to the square of the number of objects in the database. An implementation of the invention for this purpose is shown in the flowchart of FIG. 42. Other implementations are also possible. It is assumed that transformation to eye coordinates, view volume filtering, perspective projection and translation, and back-face culling on all objects have already been performed. A preprocessing loop 195 cycles through all of the objects and classifies the Exterior, Interior and Ambiguous Regions within the current object 67. Assuming the current object is not already stored in the database, it is stored at this time 623. A second comparison loop 197 cycles though all the objects in the database. For each cycle, the current Test Object is compared to the polygons from all other objects in the database 69 to determine if the current Test Object occults any of these polygons. All polygons that are marked as occulted but not non-occulted are removed from the database 246. The remaining non-occulted labels are then removed from all polygons 236 in preparation for processing the next Test Object 605. When all objects in the database have been examined to determine if they occult polygons from other objects in the database and all of the polygons found to be occulted have been deleted from the database, all remaining polygons in the database may be rasterized, written to the frame buffer and stored or displayed on a two-dimensional viewing screen 108.

Figure 43:
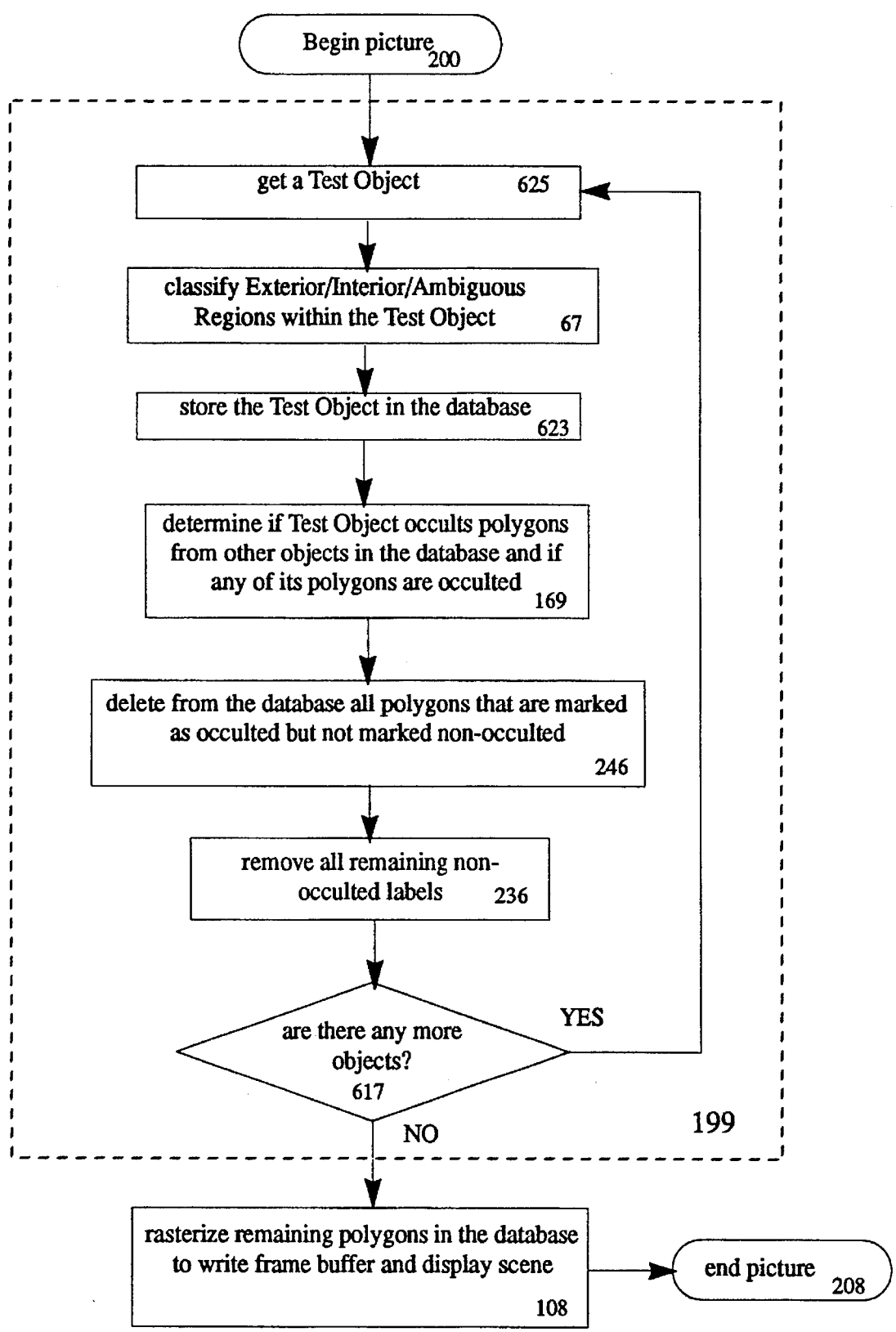

Finding and deleting occulted polygons from all objects in a database by bidirectional Test Object/Test Polygon comparison Given a database of objects composed of planar polygons, the invention can be used to detect and delete occulted polygons in the database through a bidirectional comparison of each object with the polygons of all other objects in the database. This method is more efficient than the method described in the previous section because the number of comparisons required is proportional to the number of objects in the database. An implementation of the invention for this purpose is shown in the flowchart of FIG. 43. Other implementations are also possible. It is assumed that transformation to eye coordinates, view volume filtering, perspective projection and translation, and back-face culling on all objects have already been performed. A processing loop 199 cycles through all of the objects and classifies the Exterior, Interior and Ambiguous Regions within the current Test Object 67. Assuming the current Test Object is not already stored in the database, it is stored at this time 623. The current Test Object is compared to the polygons from all other objects in the database on an object by object basis 169 to determine if the current object occults any of these polygons and also if any of the other objects occult polygons from the current Test Object. All polygons that are marked as occulted but not non-occulted are removed from the database 246. The remaining non-occulted labels are then removed from all polygons 236 in preparation for processing the next Test Object 625. When all objects in the database have been examined to determine if they occult polygons from other objects in the database and all of the polygons found to be occulted have been deleted from the database, all remaining polygons in the database may be rasterized, written to the frame buffer and stored or displayed on a two-dimensional viewing screen 108.

Apparatus of the Invention

General Purpose Computer

Figure 44:
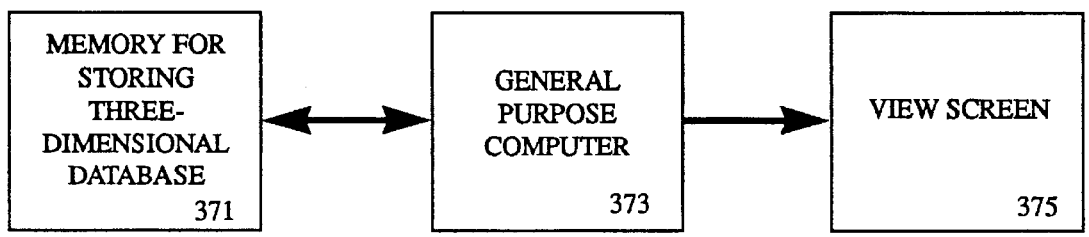

A hardware implementation of the invention is shown in FIG. 44. The three-dimensional database which contains a scene to be rendered is stored in memory 371. Much research has gone into spatial databases, and is summarized in the book "The Design and Analysis of Spatial Data Structures" by Hanan Sarnet, published by Addison-Wesley Publishing Company, ISBN 0-201-50255-0, and is incorporated herein by reference. A general purpose computer 373 runs a software program that controls the steps of transformation to eye coordinates, view volume filtering, perspective projection and translation, back-face culling and depth complexity reduction. The depth complexity reduction step could be realized by programming the general purpose computer to execute the steps of the flowchart in FIG. 42 (which finds and deletes occulted polygons from all objects in a database by unidirectional Test Object/Test Polygon comparison) or the steps of the flowchart in FIG. 43 (which finds and deletes occulted polygons from all objects in a database by bidirectional Test Object/Test Polygon comparison). All of these steps require writing and reading data to and from one or several spatial databases. After the depth complexity reduction step has reduced the number of polygons to be rasterized, rasterization, writing to the frame buffer and display of the two-dimensional image on a view screen 375 are executed. Examples of general purpose computers include: IBM PC compatibles and UNIX workstations from Sun Microsystems, Silicon Graphics, and Hewlett-Packard. Generally, these computers have a single CPU, but, in some cases, several CPUs working together.

Parallel Computers

Figure 45:
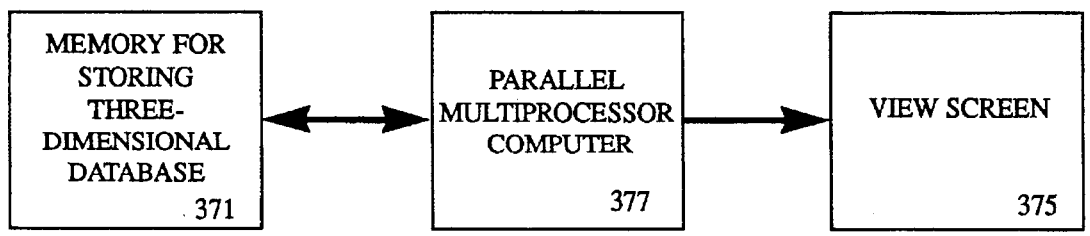

Another hardware implementation of the invention is shown in FIG. 45. In this figure, the general purpose computer 373 is replaced by a parallel multiprocessor computer 377. These types of computers are still programmable, and are sometimes designed specifically for high speed graphics applications. Many of these types of computers exist, and an overview is found on pages 17 through 65 of the book "Multiprocessor Methods for Computer Graphics Rendering" by Scott Whitman, published by Jones and Bartlett Publishers, ISBN 0-86720-229-7, and is incorporated herein by reference.

The three dimensional database which containing a scene to be rendered is stored in memory 371, and a software program that controls the steps of transformation to eye coordinates, view volume filtering, perspective projection and translation, back-face culling and depth complexity reduction. The depth complexity reduction step could be realized by programming the parallel multiprocessor computer to execute the steps of the flowchart in FIG. 42 (which finds and deletes occulted polygons from all objects in a database by unidirectional Test Object/Test Polygon comparison) or the steps of the flowchart in FIG. 43 (which finds and deletes occulted polygons from all objects in a database by bidirectional Test Object/Test Polygon comparison). After the depth complexity reduction step has reduced the number of polygons to be rasterized, rasterization, writing to the frame buffer and display of the two-dimensional image on a view screen 375 are executed.

Special Purpose Hardware and Content Addressable Memory

Figure 46:
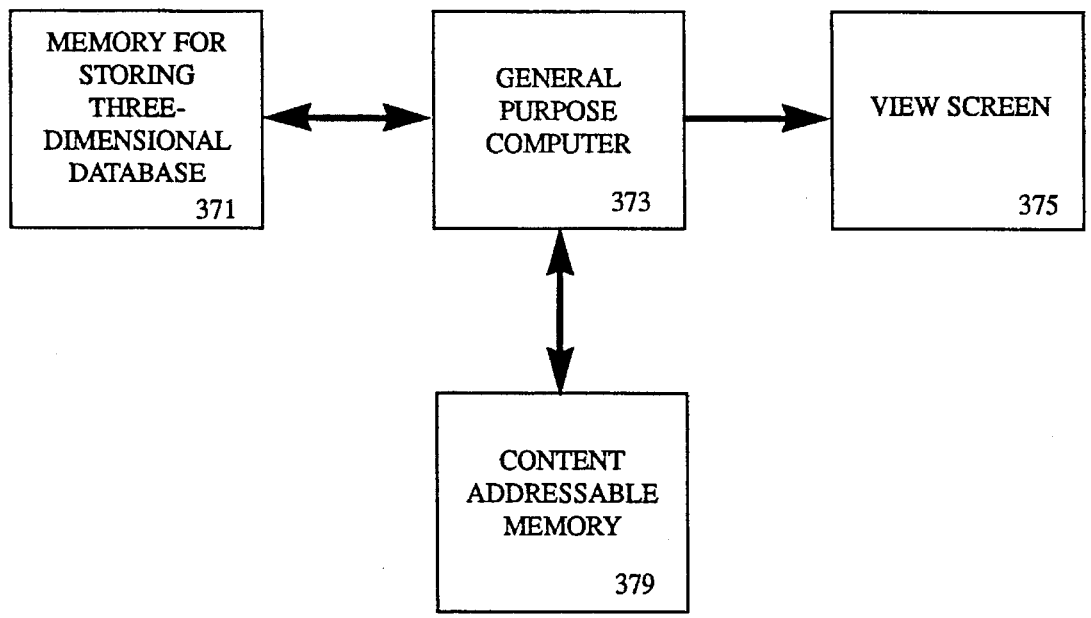

A third hardware implementation is done with special purpose hardware, which can include, specifically, content addressable memory (CAM) 379. A CAM 379 is used to store portions or all of the spatial database, thus accelerating searching of the database. A system which includes a general purpose computer and a CAM 379 is shown in FIG. 46. The depth complexity reduction step could be realized by programming the general purpose computer and CAM to execute the steps of the flowchart in FIG. 42 (which finds and deletes occulted polygons from all objects in a database by unidirectional Test Object/Test Polygon comparison) or the steps of the flowchart in FIG. 43 (which finds and deletes occulted polygons from all objects in a database by bidirectional Test Object/Test Polygon comparison). In FIG. 46, the CAM 379 is functioning a "co-processor" in the sense that it is performing specific spatial database functions, while the general purpose processor is performing all other tasks. For an implementation of this invention which uses Bounding Boxes to approximate the Test Object and Test Polygon, many numerical comparisons are required to determine if the Bounding Boxes intersect. A CAM 379 which is designed specifically to perform numerical comparisons is disclosed in U.S. Pat. No. 4,996,666, entitled "Content-Addressable Memory System Capable of Fully Parallel Magnitude Comparisons", by Jerome F. Duluk, Jr., and is incorporated herein by reference. When such a CAM 379 is used, vertices or Bounding Box corners are each stored in one word of CAM 379, and each CAM 379 word needs at least three subfields: one for each dimension (X, Y, and Z) of the space. When a Bounding Box or the vertices of an edge or polygon is input to the CAM 379 for query operations, the coordinates in the input are compared to the all coordinates in the CAM 379, and Bounding Box intersection queries can be performed. The advantage of using CAM as a co-processor is that CAM performs multiple comparisons simultaneously, which greatly speeds the process of searching of the database in depth complexity reduction. CAM can also be added to a parallel multiprocessor computer 377. The CAM can be either shared by all the processors, or each processor can have its own CAM.

The following is claimed:

1. A method for generating an image from a database including a plurality of three-dimensional objects, each said three-dimensional object comprising at least one polygon having at least one edge and allowing for each said object to have an unlimited number of said polygons and edges, and for successively determining whether a particular selected one of said at least one polygon designated a current test polygon is not visible to an observer located at a predetermined eyepoint coordinate location by virtue of being hidden by previously selected ones of said three-dimensional objects in said database designated as test objects and therefore said test polygon does not need to be rendered by a renderer; said method comprising the steps of:

(A) selecting a particular one of said plurality of three-dimensional object as a current test object from among said plurality of three-dimensional objects in said database, said selecting being performed on said plurality of three-dimensional objects in arbitrary order without pre-sorting said three-dimensional geometry of objects according to a z coordinate distance from said predetermined eyepoint coordinate location prior to said selection;

(B) selecting, for each said selected particular three-dimensional current test object, each one of said polygons within said selected three-dimensional test object as said current test polygon;

(C) for each said selected current test polygon, determining whether said current test polygon is not visible to an observer located at a predetermined eyepoint coordinate location by virtue of being hidden by ones of said test objects that have been previously selected; said step of determining whether said current test polygon is not visible to an observer including the steps of;

(1) determining the exterior region of said current test object as the union of bounding boxes of exterior polygons, where said exterior polygons are identified by successively comparing each edge in each polygon of said current test object with the edges in all other polygons of said same current test object and said comparisons identify either an edge shared with a back facing polygon or an edge that is not shared by any another polygon, wherein a polygon is a back facing polygon of said test object when said test object is topologically closed and when said polygon is located on a far side of said test object relative to said predetermined observer eyepoint coordinate location;

(2) determining the interior region of said test object as the union of bounding boxes of interior polygons, where a said interior polygon is identified by being neither a said exterior polygon nor as a polygon having its projected bounding box overlap with a projected bounding box of a said exterior polygon, said overlap being the sharing of a common region between each of two projected bounding boxes, said common region including a one-dimensional edge and a two-dimensional area;

(3) testing for said overlap between the projected bounding box of said test polygon and the projected bounding boxes of said exterior polygons and the projected bounding boxes of said interior polygons;

(4) determining that said test polygon is not visible if;
 (a) any of said overlaps occur between said projected bounding box of said test polygon and said bounding boxes of said interior polygons, and
 (b) said overlaps do not occur between said projected bounding box of said test polygon and said bounding boxes of said exterior polygons, and
 (c) for all said occurring overlaps between said projected bounding box of said test polygon and a said bounding box of a said interior polygon, the Z coordinate values of said bounding box of said test polygon are all farther from said predetermined eyepoint coordinate location of said observer than the Z coordinate values of the said bounding box of said interior polygon;

(5) discarding any of said test polygons that are determined to be not visible from said predetermined eyepoint location and rendering any of said test polygons that are not determined to be hidden by said test objects and may be visible and not hidden by said test objects; and (6) retaining each said test polygon that may be visible and has not been discarded, and using each said retained polygon as a polygon of its corresponding three-dimensional object when said object is processed as a previously selected test object; and (D) repeating steps (A) through (C) with each said three-dimensional object in said database as said current test object; and (E) directing a display process to perform or omit displaying each said test polygon on a display device depending on whether each said test polygon is determined to be visible or hidden.

2. A method as in claim 1 where said test polygon is a compound polygon, said compound polygon comprised of a multiplicity of smaller polygons, the bounding box of said compound polygon being the bounding box around a union of bounding boxes of the said smaller polygons, and wherein all said smaller polygons for a particular one of said compound polygons are discarded if said compound polygon is determined to be hidden by a said test object.

3. A method as in claim 2, wherein said step of testing for said overlaps is performed in a content addressable memory, said content addressable memory comprising:

(1) means for storing a plurality of data words, each of said data words including a plurality of data subfields, each of said data subfields being divided into a plurality of data bits;

(2) means for providing an input field comprising a plurality of input subfields matching some of said data subfields, and each said input subfield divided into input bits so as to have a one-to-one bit correspondence to the said data bits in said data subfields in said words;

(3) query means for simultaneously comparing said plurality of input subfields to all said words, with simultaneous subfield comparisons such that each said data subfield is compared to its corresponding said input subfield, and generation of a one bit query result for each said word which is true when all said data subfields within said word which are compared to one of said input subfields compare favorably to each corresponding said input subfield; and (4) flag memory means for storing a flag bit equal to said query result for each of said words.

4. A method as in claim 1 where said step of testing for said overlaps is performed in a content addressable memory, said content addressable memory comprising:

(1) means for storing a plurality of data words, each of said data words including a plurality of data subfields, each of said data subfields being divided into a plurality of data bits;

(2) means for providing an input field comprising a plurality of input subfields matching some of said data subfields, and each said input subfield divided into input bits so as to have a one-to-one bit correspondence to the said data bits in said data subfields in said words;

(3) query means for simultaneously comparing said plurality of input subfields to all said words, with simultaneous subfield comparisons such that each said data subfield is compared to its corresponding said input subfield, and generation of a one bit query result for each said word which is true when all said data subfields within said word which are compared to one of said input subfields compare favorably to each corresponding said input subfield; and (4) flag memory means for storing a flag bit equal to said query result for each of said words.

5. The method in claim 1, wherein said step of determining the interior region of said test object as the union of bounding boxes of interior polygons, where a said interior polygon is identified by being neither a said exterior polygon nor as a polygon having its projected bounding box overlap with more than one projected bounding box of a said exterior polygon, said overlap being the sharing of a common region between each of two projected bounding boxes, said common region including a one-dimensional edge and a two-dimensional area.

6. A method for generating an image from a database including a plurality of three-dimensional objects, each said three-dimensional object comprising at least one polygon having at least one edge and allowing for each said object to have an unlimited number of said polygons and edges, and for successively determining whether a particular selected one of said at least one polygon designated a current test polygon is not visible to an observer located at a predetermined eyepoint coordinate location by virtue of being hidden by previously selected ones of said three-dimensional objects in said database designated as test objects and therefore said test polygon does not need to be rendered by a renderer; said method comprising the steps of:

(A) selecting a particular one of said plurality of three-dimensional object as a current test object from among said plurality of three-dimensional objects in said database, said selecting being performed on said plurality of three-dimensional objects in arbitrary order without pre-sorting said three-dimensional geometry of objects according to a z coordinate distance from said predetermined eyepoint coordinate location prior to said selection;

(B) selecting, for each said selected particular three-dimensional current test object, each one of said polygons within said selected three-dimensional test object as said current test polygon;

(C) for each said selected current test polygon, determining whether said current test polygon is not visible to an observer located at a predetermined eyepoint coordinate location by virtue of being hidden by ones of said test objects that have been previously selected; said step of determining whether said current test polygon is not visible to an observer including the steps of:

(1) determining the exterior region of said current test object as the union of bounding boxes of exterior edges, where said exterior edges are polygon edges identified by successively comparing each edge in each polygon of said current test object with the edges in all other polygons of said same current test object and said comparisons identify either an edge shared by a front facing polygon and a back facing polygon or an edge that is not shared by any another polygon, wherein a polygon is a back facing polygon of said test object when said test object is topologically closed and when said polygon is located on a far side of said test object relative to said predetermined observer eyepoint coordinate location, and wherein a polygon is a front facing polygon of said test object when said test object is topologically closed and when said polygon is located on a near side of said test object relative to said predetermined observer eyepoint coordinate location;

(2) determining the interior region of said test object as the union of bounding boxes of interior edges, where a said interior edge is identified by
being neither a said exterior edge nor as an edge having its projected bounding box overlap with a projected bounding box of a said exterior edge, said overlap being the sharing of a common region between each of two projected bounding boxes, said common region including a one-dimensional edge and a two-dimensional area;

(3) testing for said overlap between the projected bounding boxes of the edges of said test polygon and the projected bounding boxes of said exterior edges and the projected bounding boxes of said interior edges;

(4) determining that said test polygon is not visible if:
(a) any of said overlaps occur between said projected bounding box of the edges of said test polygon and said bounding boxes of said interior edges, and
(b) said overlaps do not occur between said projected bounding boxes of the edges of said test polygon and said bounding boxes of said exterior edges, and
(c) for all said occurring overlaps between said projected bounding box of an edge of said test polygon and a said projected bounding box of a said interior edge, the Z coordinate values of said bounding box of an edge of said test polygon are all farther from said predetermined eyepoint coordinate location of said observer than the Z coordinate values of said projected bounding box of said interior edge;

(5) discarding any of said test polygons that are determined to be not visible from said predetermined eyepoint location and rendering any of said test polygons that are not determined to be hidden by said test objects and may be visible and not hidden by said test objects; and (6) retaining each said test polygon that may be visible and has not been discarded, and using each said retained polygon as a polygon of its corresponding three-dimensional object when said object is processed as a previously selected test object; and (D) repeating steps (A) through (C) with each said three-dimensional object in said database as said current test object; and (E) directing a display process to perform or omit displaying said test polygon on a display device depending on whether said test polygon is determined to be visible or hidden.

7. A method as in claim 6 where said step of testing for overlaps is performed in a content addressable memory, said content addressable memory including:

(1) means for storing a plurality of data words, each of said data words including a plurality of data subfields, each of said data subfields being divided into a plurality of data bits;

(2) means for providing an input field comprising a plurality of input subfields matching some of said data subfields, and each said input subfield divided into input bits so as to have a one-to-one bit correspondence to the said data bits in said data subfields in said words;

(3) query means for simultaneously comparing said plurality of input subfields to all said words, with simultaneous subfield comparisons such that each said data subfield is compared to its corresponding said input subfield, and generation of a one bit query result for each said word which is true when all said data subfields within said word which are compared to one of said input subfields compare favorably to each corresponding said input subfield; and (4) flag memory means for storing a flag bit equal to said query result for each of said words.

8. The method in claim 6, wherein said step of determining the interior region of said test object as the union of bounding boxes of interior edges, where a said interior edge is identified by being neither as a said exterior edge nor as an edge having its projected bounding box overlap with more than one projected bounding box of a said exterior edge, said overlap being the sharing of a common region between each of two projected bounding boxes, said common region including a one-dimensional edge and a two-dimensional area.

9. A method for generating an image from a database including a plurality of three-dimensional objects, each said three-dimensional object comprising at least one polygon having at least one edge and allowing for each said object to have an unlimited number of said polygons and edges, and for successively determining whether a particular selected one of said at least one compound polygon comprised of a multiplicity of smaller polygons and designated a current test polygon is not visible to an observer located at a predetermined eyepoint coordinate location by virtue of being hidden by previously selected ones of said three-dimensional objects in said database designated as test objects and therefore said test polygon does not need to be rendered by a renderer, said method comprising the steps of:

(A) selecting a particular one of said plurality of three-dimensional object as a current test object from among said plurality of three-dimensional objects in said database, said selecting being performed on said plurality of three-dimensional objects in arbitrary order without pre-sorting said three-dimensional geometry of objects according to a z coordinate distance from said predetermined eyepoint coordinate location prior to said selection;

(B) selecting, for each said selected particular three-dimensional current test object, each one of said polygons within said selected three-dimensional test object as said current test polygon;

(C) for each said selected current test polygon, determining whether said current test polygon is not visible to an observer located at a predetermined eyepoint coordinate location by virtue of being hidden by ones of said test objects that have been previously selected; said step of determining whether said current test polygon is not visible to an observer including the steps of:

(1) determining the exterior region of said current test object as the union of bounding boxes of exterior polygons, the bounding box of said compound polygon being the bounding box around a union of bounding boxes of the said smaller polygons, where said exterior polygons are identified by successively comparing each edge in each polygon of said current test object with the edges in all other polygons of said same current test object and said comparisons identify either an edge shared with a back facing polygon or an edge that is not shared by any another polygon, wherein a polygon is a back facing polygon of said test object when said test object is topologically closed and when said polygon is located on a far side of said test object relative to said predetermined observer eyepoint coordinate location;

(2) determining the interior region of said test object as the union of bounding boxes of interior polygons, where a said interior polygon is identified by being neither a said exterior polygon nor as a polygon having its projected bounding box overlap with a projected bounding box of a said exterior polygon, said overlap being the sharing of a common region between each of two projected bounding boxes, said common region including a one-dimensional edge and a two-dimensional area;

(3) testing for said overlap between the projected bounding box of said test polygon and the projected bounding boxes of said exterior polygons and the projected bounding boxes of said interior polygons; said testing for said overlap including the steps of:

(a) storing a plurality of data words in a data structure, each of said data words including a plurality of data subfields, each of said data subfields being divided into a plurality of data bits;

(b) providing an input field comprising a plurality of input subfields matching some of said data subfields, and each said input subfield divided into input bits so as to have a one-to-one bit correspondence to the said data bits in said data subfields in said words;

(c) simultaneously comparing said plurality of input subfields to all said words, with simultaneous subfield comparisons such that each said data subfield is compared to its corresponding said input subfield, and generation of a one bit query result for each said word which is true when all said data subfields within said word which are compared to one of said input subfields compare favorably to each corresponding said input subfield; and
   (d) storing a flag bit equal to said query result for each of said words; and
(4) determining that said test polygon is not visible if:
   (a) any of said overlaps occur between said projected bounding box of said test polygon and said bounding boxes of said interior polygons, and
   (b) said overlaps do not occur between said projected bounding box of said test polygon and said bounding boxes of said exterior polygons, and
   (c) for all said occurring overlaps between said projected bounding box of said test polygon and a said bounding box of a said interior polygon, the z-coordinate values of said bounding box of said test polygon are all farther from said predetermined eyepoint coordinate location of said observer than the z-coordinate values of the said bounding box of said interior polygon;
(5) discarding any of said test polygons including all said smaller polygons associated with a particular one of said compound polygons that are determined to be not visible from said predetermined eyepoint location and rendering any of said test polygons that are not determined to be hidden by said test objects and may be visible and not hidden by said test objects; and
(6) retaining each said test polygon that may be visible and has not been discarded, and using each said retained polygon as a polygon of its corresponding three-dimensional object when said object is processed as a previously selected test object; and (D) repeating steps (A) through (C) with each said three-dimensional object in said database as said current test object; and (E) directing a display process to perform or omit displaying each said test polygon on a display device depending on whether each said test polygon is determined to be visible or hidden.

* * * * *